(12) United States Patent
Fine

(10) Patent No.: US 9,221,486 B2
(45) Date of Patent: Dec. 29, 2015

(54) CART

(71) Applicant: Ami Amos Fine, Hadera (IL)

(72) Inventor: Ami Amos Fine, Hadera (IL)

(*) Notice: Subject to any disclaimer, the term of this patent is extended or adjusted under 35 U.S.C. 154(b) by 0 days.

(21) Appl. No.: 14/452,540

(22) Filed: Aug. 6, 2014

(65) Prior Publication Data

US 2014/0346757 A1 Nov. 27, 2014

Related U.S. Application Data

(63) Continuation-in-part of application No. 13/439,876, filed on Apr. 5, 2012, now abandoned, which is a continuation-in-part of application No. 12/382,410, filed on Mar. 16, 2009, now Pat. No. 8,172,256.

(51) Int. Cl.
| | | |
|---|---|---|
| B62B 1/00 | (2006.01) | |
| B62B 5/00 | (2006.01) | |
| B62B 3/02 | (2006.01) | |
| B62B 7/10 | (2006.01) | |

(52) U.S. Cl.
CPC ............. *B62B 5/0003* (2013.01); *B62B 3/027* (2013.01); *B62B 7/105* (2013.01); *B62B 2205/20* (2013.01); *B62B 2206/06* (2013.01)

(58) Field of Classification Search
CPC ........... B62B 3/00; B62B 3/02; B62B 3/022; B62B 3/027; B62B 3/14; B62B 5/0003; B62B 2205/20; B62B 2206/06
USPC ......... 280/651, 638, 639, 33.991, 33.992, 38, 280/47.34
See application file for complete search history.

(56) References Cited

U.S. PATENT DOCUMENTS

| | | | |
|---|---|---|---|
| 2,877,047 A | | 3/1959 | Weil |
| 3,082,016 A | * | 3/1963 | Pratt .............................. 280/641 |
| 3,115,975 A | * | 12/1963 | Thompson .............. B62B 3/148 186/64 |
| 3,118,553 A | * | 1/1964 | Rosenzweig .................. 414/469 |
| 3,311,197 A | * | 3/1967 | Lachance ................ A47F 9/045 186/64 |
| 3,924,709 A | * | 12/1975 | Swanson .................. B62B 3/148 186/64 |
| 4,199,170 A | * | 4/1980 | Hubner et al. ................. 280/641 |
| 4,251,178 A | | 2/1981 | Bourgraf |
| 4,941,797 A | * | 7/1990 | Smillie, III ................ B60R 5/04 187/269 |
| 5,301,992 A | * | 4/1994 | Whitmore .................. B60R 5/04 224/542 |
| 5,413,448 A | * | 5/1995 | Peshkin ................ B65F 1/1468 414/338 |
| 5,503,424 A | * | 4/1996 | Agopian ........................ 280/651 |
| 5,533,361 A | | 7/1996 | Halpern |
| 5,649,718 A | * | 7/1997 | Groglio .......................... 280/641 |

(Continued)

FOREIGN PATENT DOCUMENTS

DE    19611542    9/1997

OTHER PUBLICATIONS

International Search Report for PCT/IB2010/051009 mailed on Sep. 23, 2010.

(Continued)

*Primary Examiner* — James M Dolak
(74) *Attorney, Agent, or Firm* — Eitan, Mehulal & Sadot

(57) ABSTRACT

A collapsible or foldable cart, shopping cart, utility cart or supermarket cart. The cart includes: a basket mounted on top of a plurality of wheels; and a bridge element to engage with an edge of a vehicular trunk. The bridge element is connected at a point located between the basket and the wheels. The bridge element is moveable on one or more fixed rails that are connected within the cart underneath the basket substantially in parallel to an axis of the basket. The rails are an integral part of the cart and are not fixedly attached to the vehicular trunk.

8 Claims, 55 Drawing Sheets

(56) References Cited

U.S. PATENT DOCUMENTS

| | | | | |
|---|---|---|---|---|
| 6,024,527 A * | 2/2000 | Soriano | ............... | 414/345 |
| 6,045,150 A * | 4/2000 | Al-Toukhi | ............... | 280/641 |
| 6,070,899 A * | 6/2000 | Gines | ............... | 280/651 |
| 6,338,518 B1 | 1/2002 | D'Annunzio | | |
| 6,495,756 B1 | 12/2002 | Burke | | |
| 6,575,491 B2 * | 6/2003 | Miller | ............... | B62B 3/027 280/43.17 |
| 6,766,931 B2 | 7/2004 | Wolf | | |
| 7,080,844 B2 * | 7/2006 | Espejo | ............... | 280/33.995 |
| 7,188,847 B1 | 3/2007 | Friedman | | |
| 7,380,803 B2 | 6/2008 | Thomas | | |
| 8,075,016 B2 * | 12/2011 | Silberberg | ............... | 280/641 |
| 8,172,256 B2 * | 5/2012 | Fine | ............... | 280/651 |
| 8,408,581 B1 * | 4/2013 | Hunter | ............... | 280/651 |
| 8,540,273 B2 * | 9/2013 | Dobrachinski | ............... | 280/651 |
| 9,126,610 B1 * | 9/2015 | Abiri | ............... | B62B 5/0003 |
| 2005/0279608 A1 | 12/2005 | Konstant | | |
| 2008/0203704 A1 | 8/2008 | McCracken | | |
| 2009/0283989 A1 | 11/2009 | Abecassis | | |
| 2010/0140887 A1 | 6/2010 | Yehiav | | |

OTHER PUBLICATIONS

European Search Report for EP10753192.3 mailed on Nov. 25, 2013.

* cited by examiner

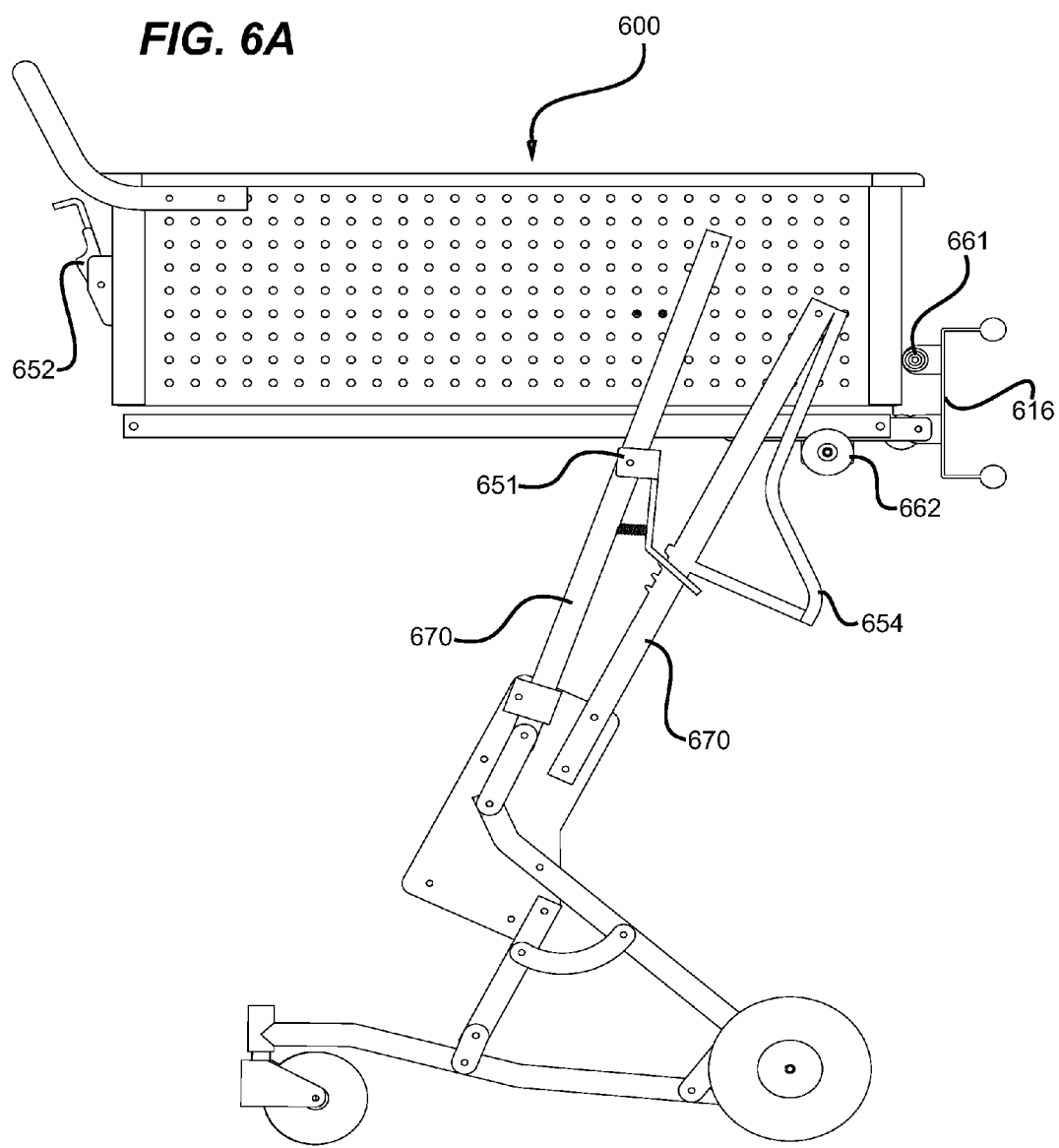

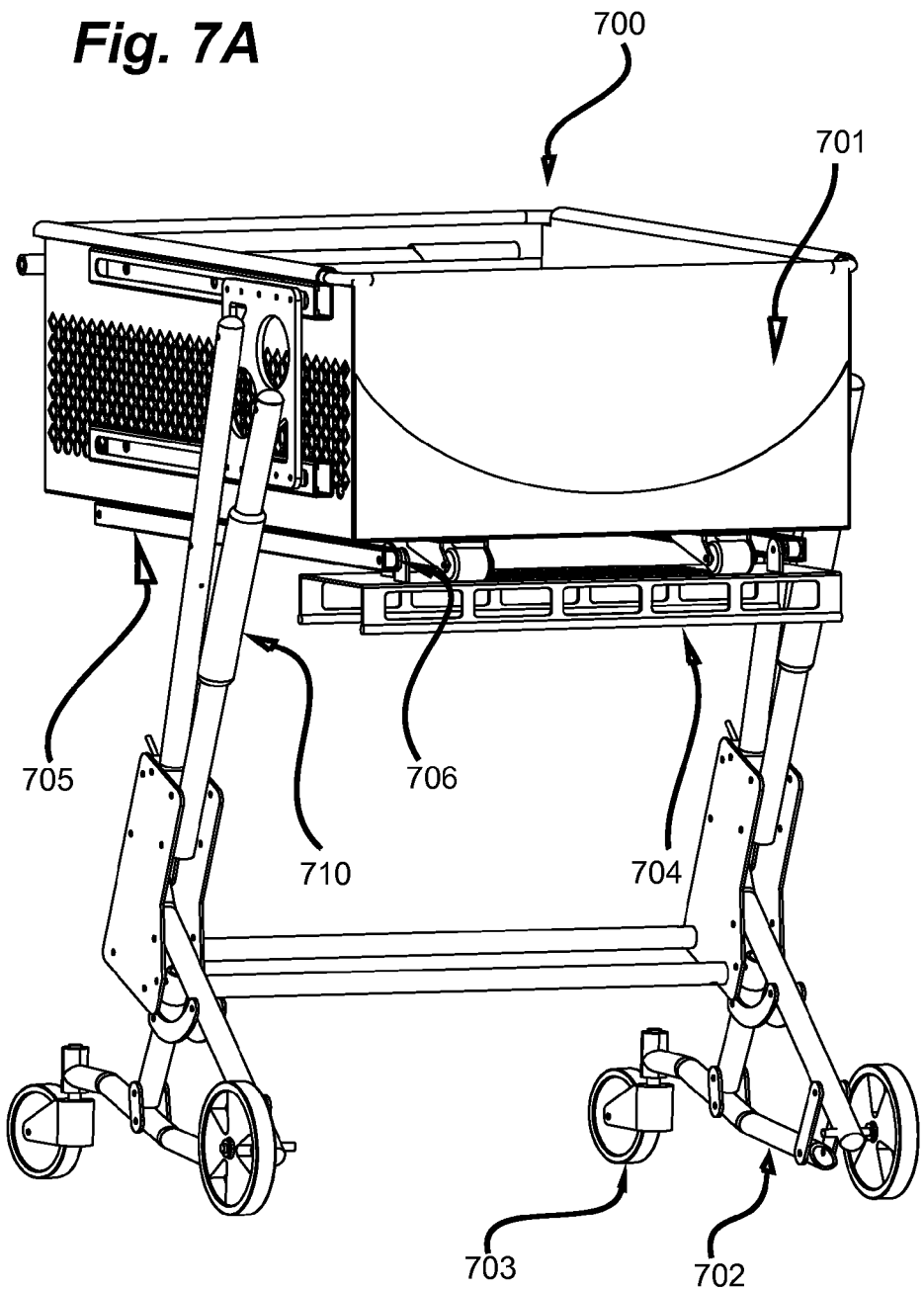

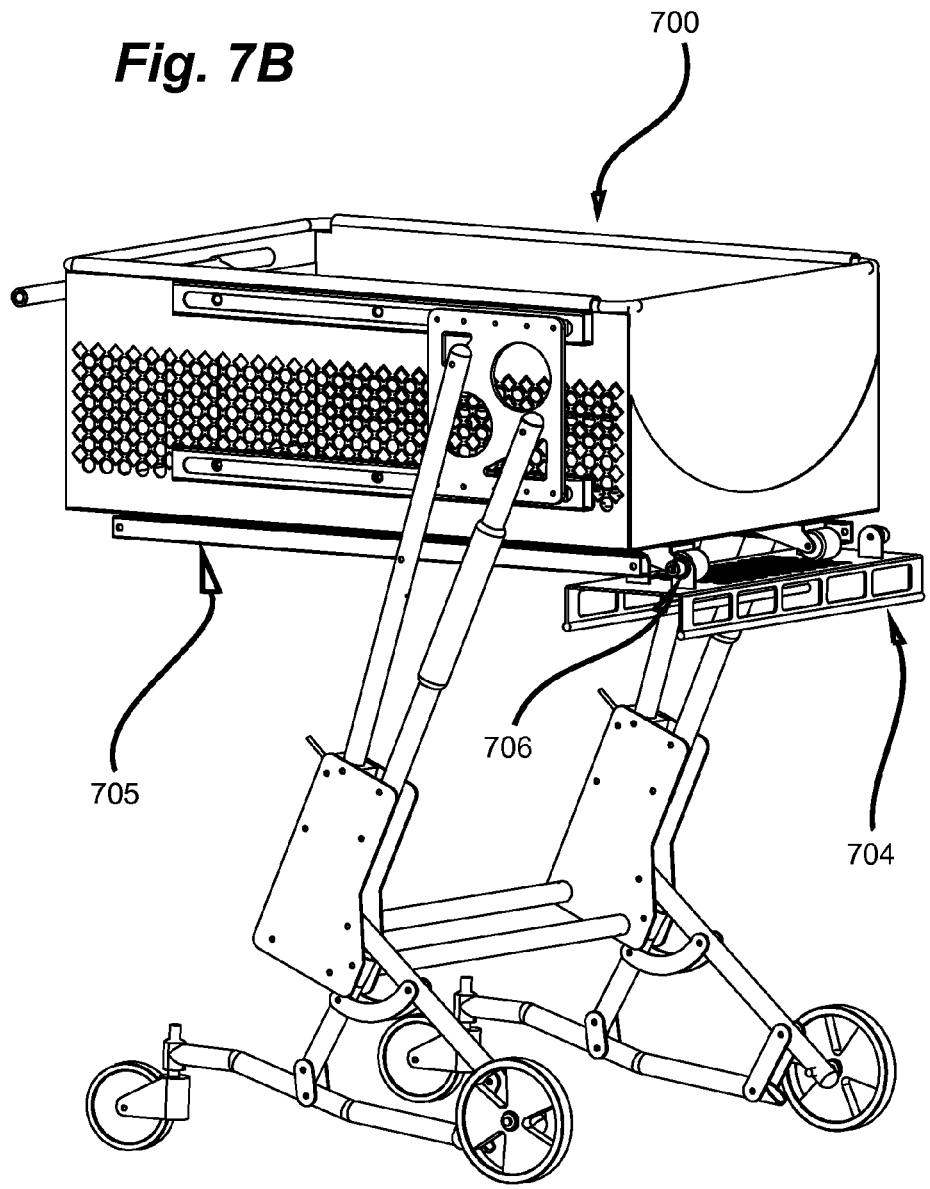

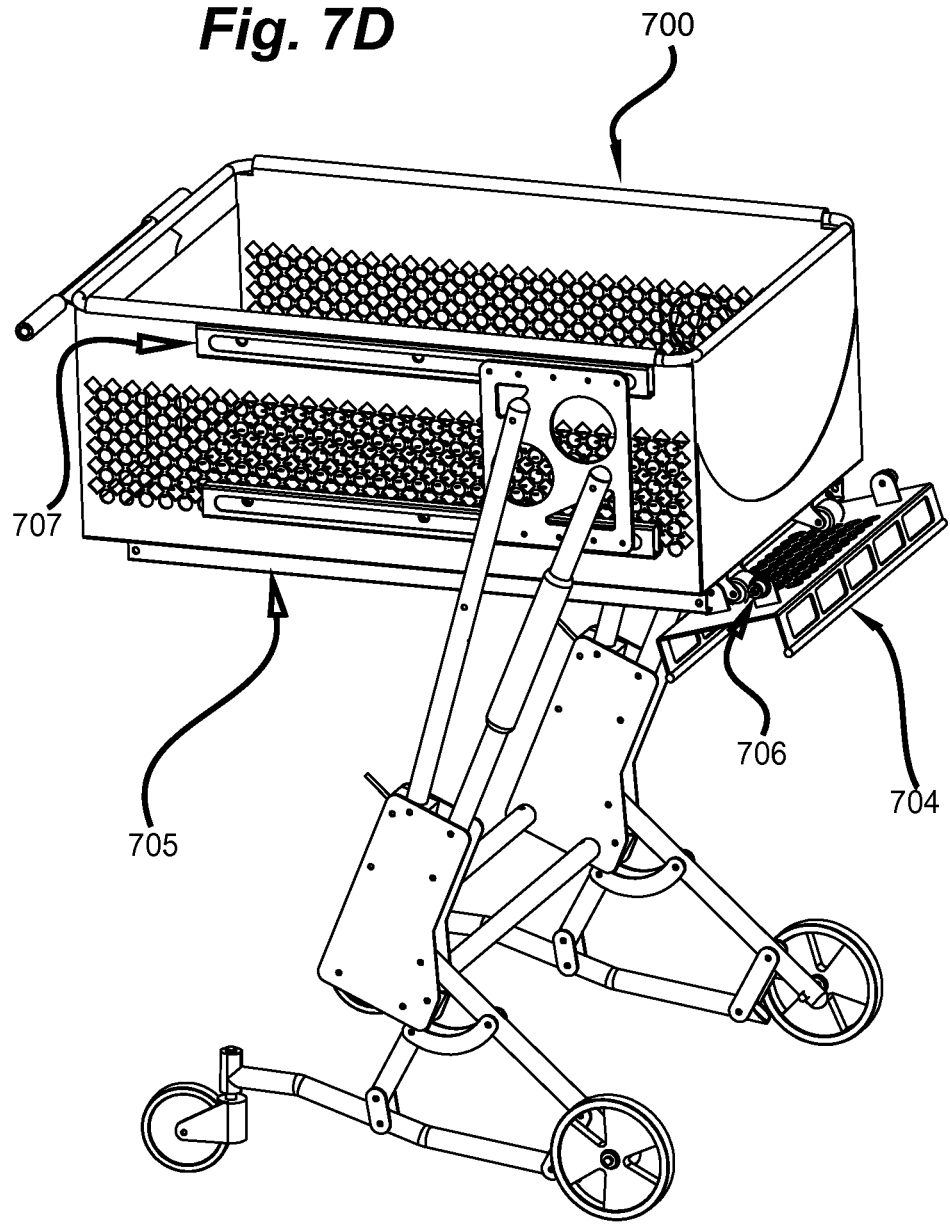

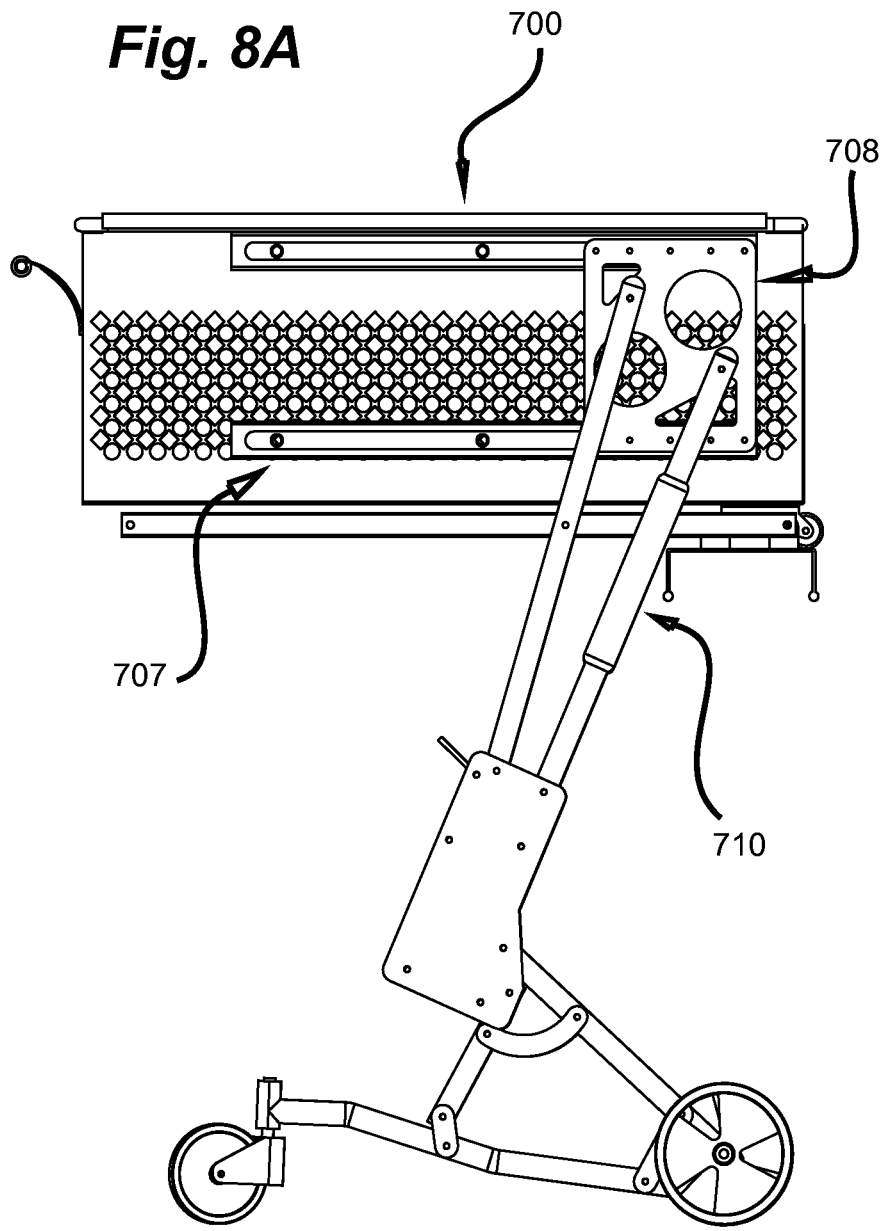

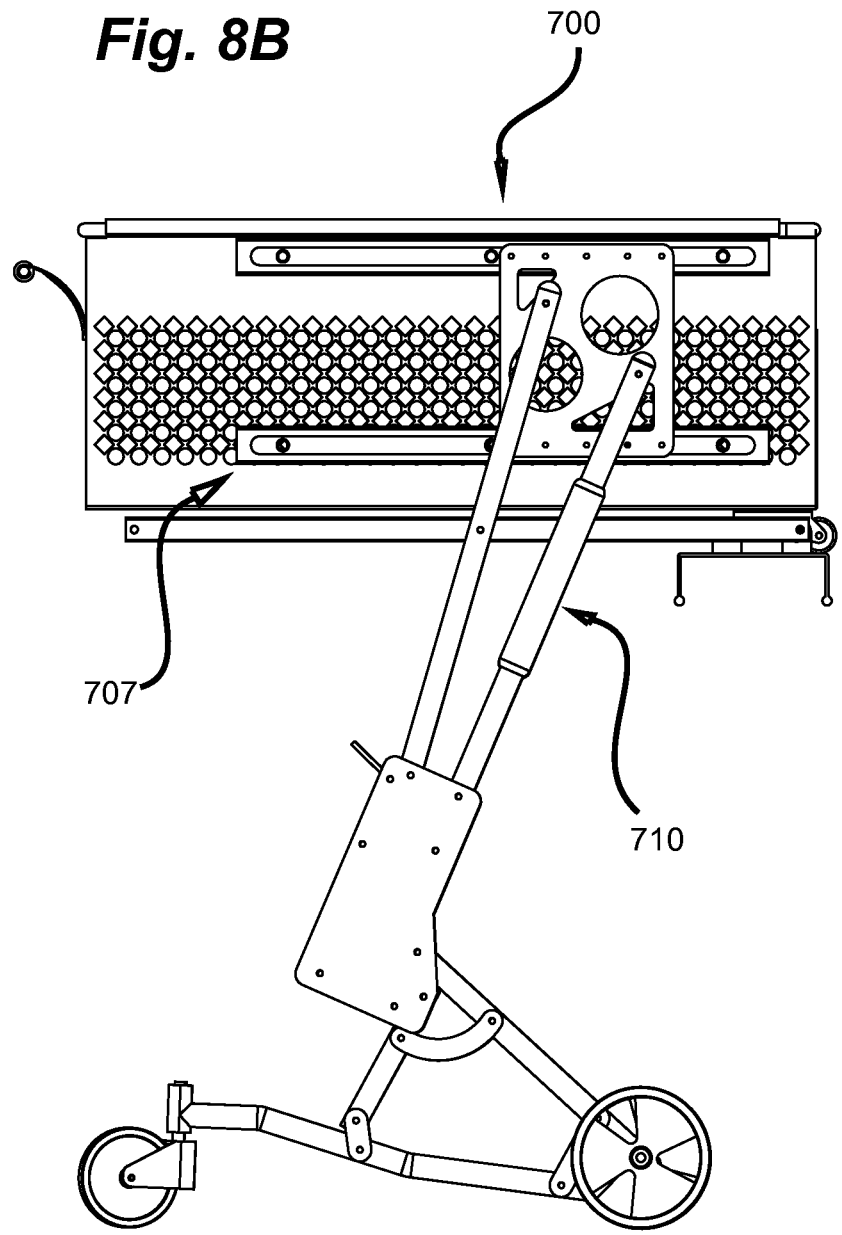

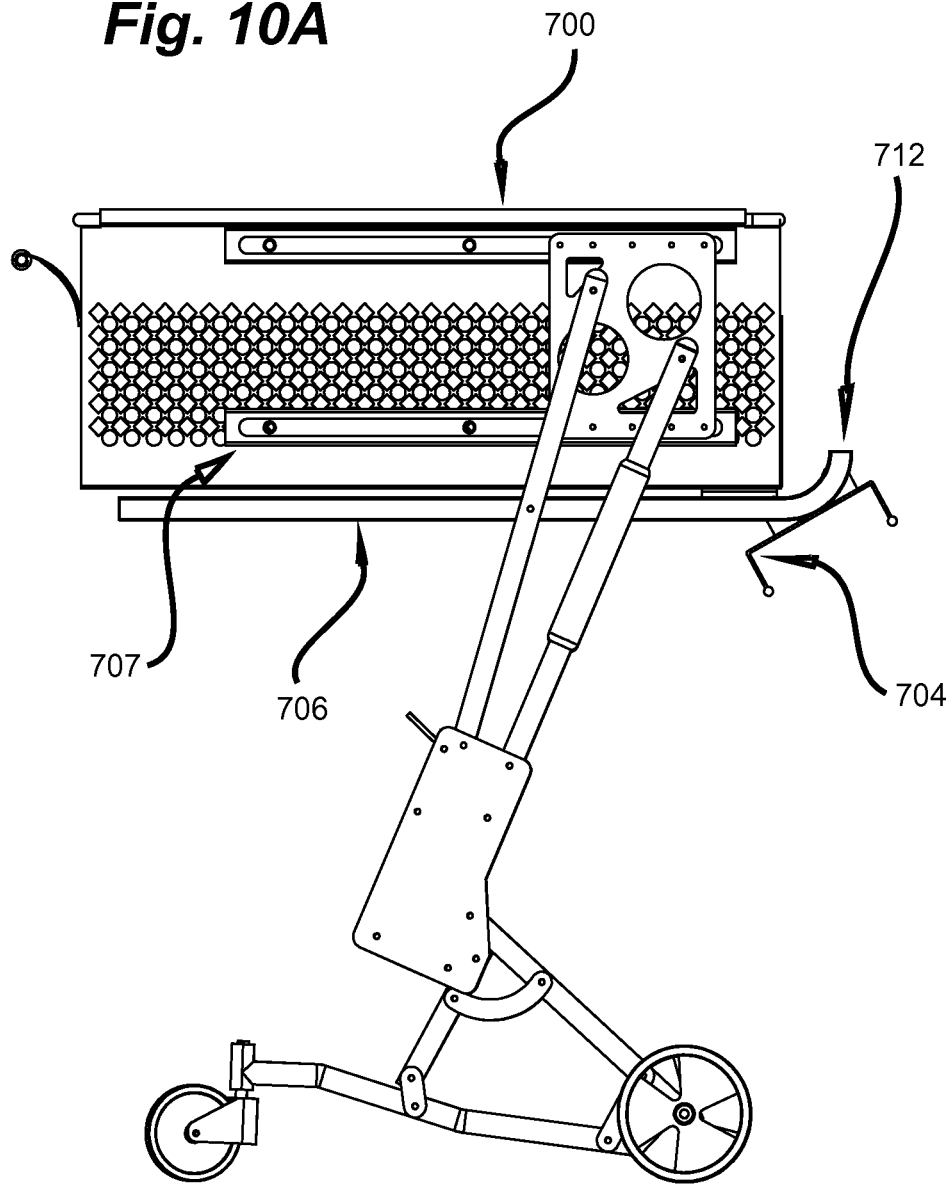

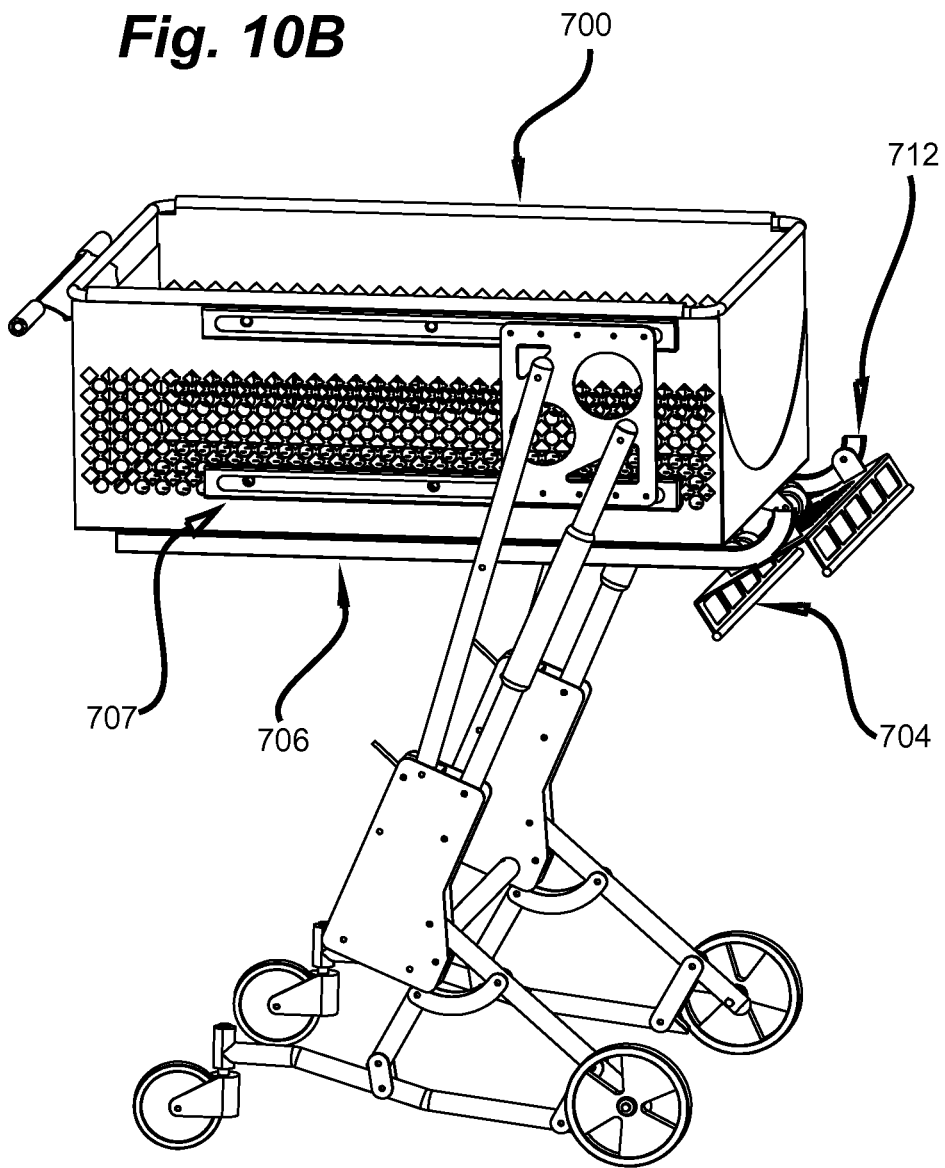

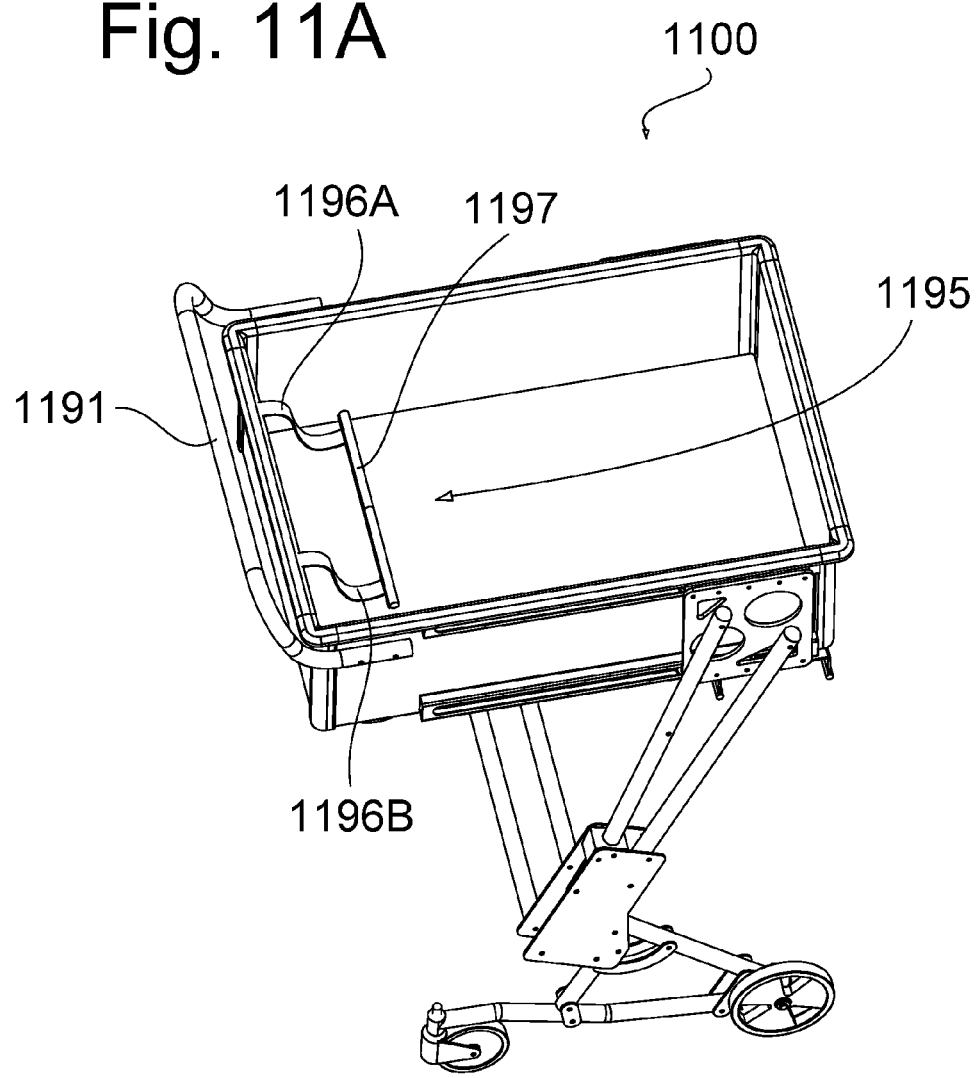

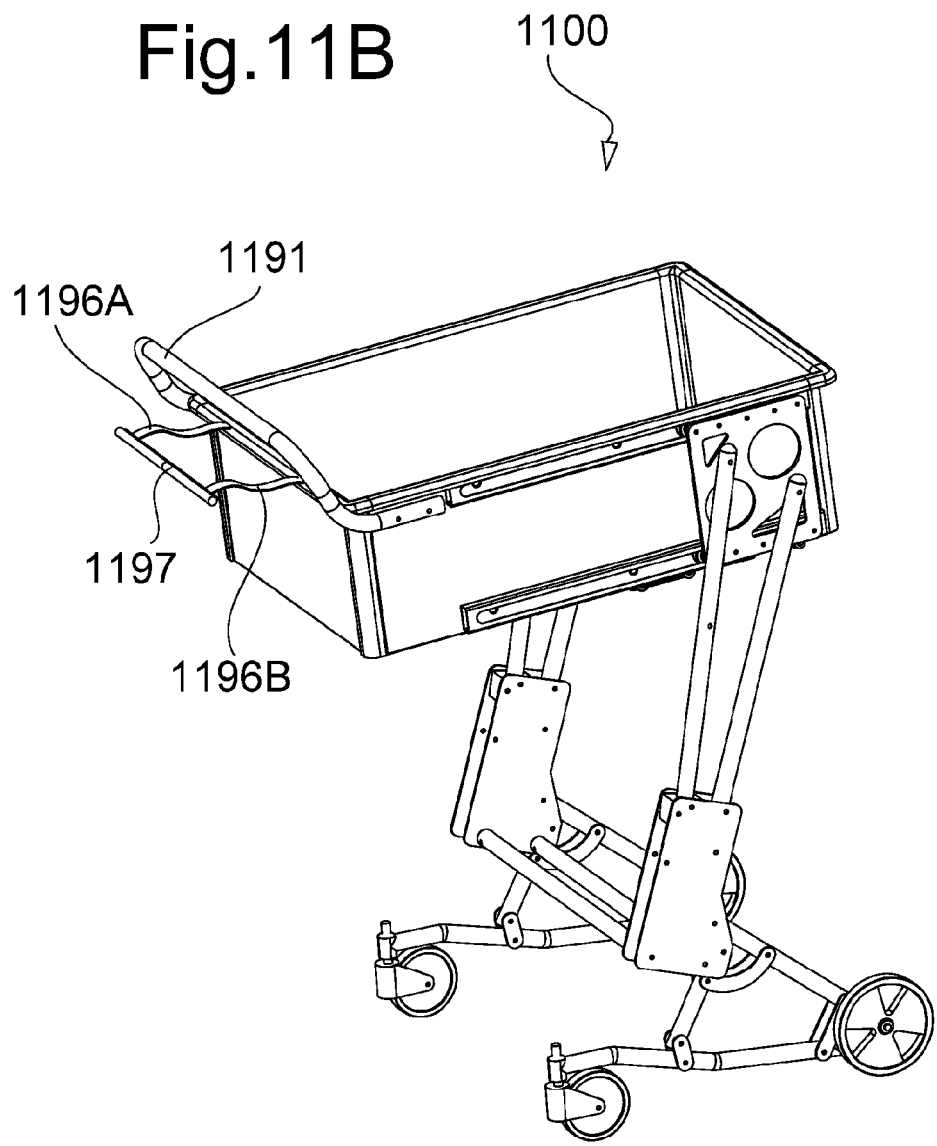

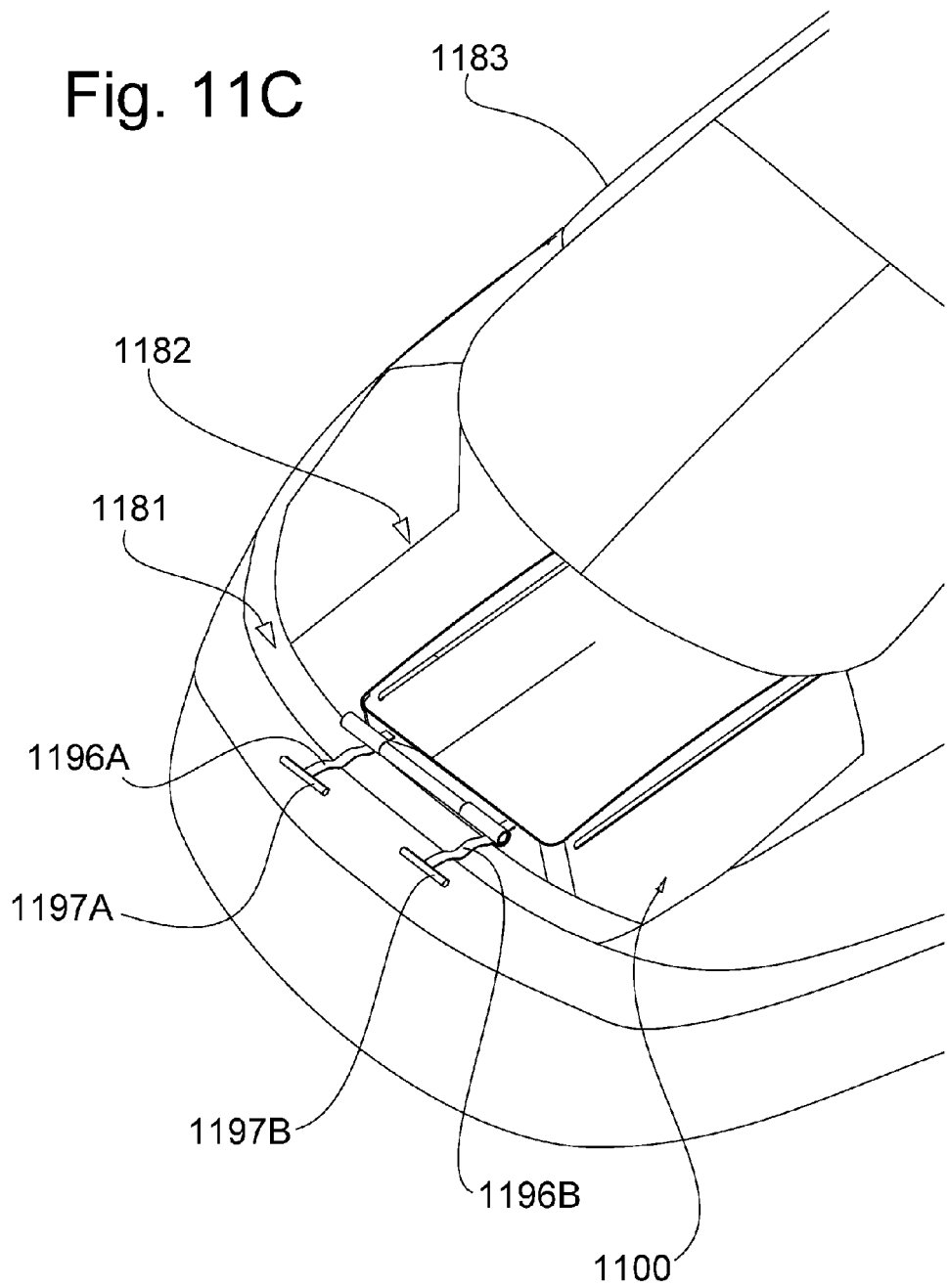

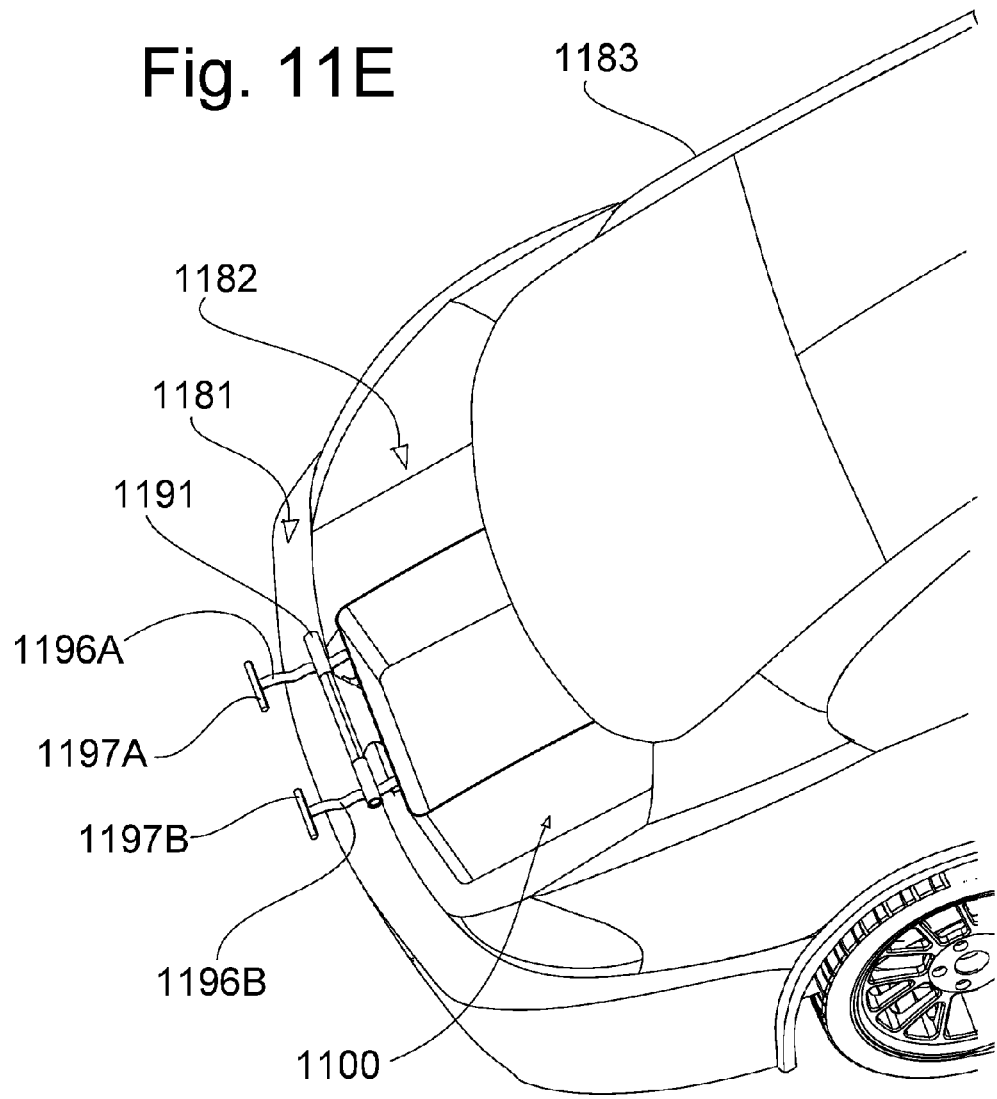

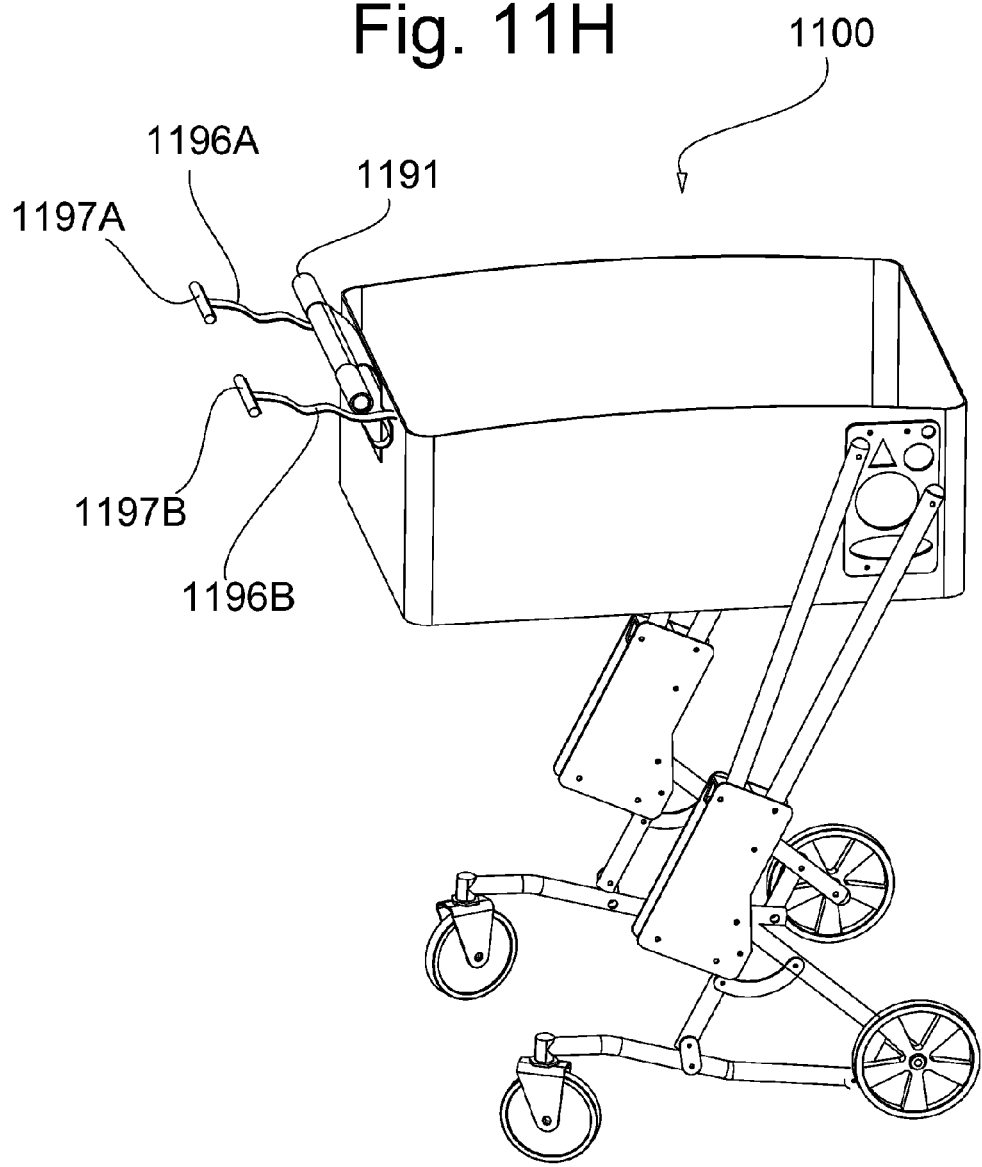

1300

1300

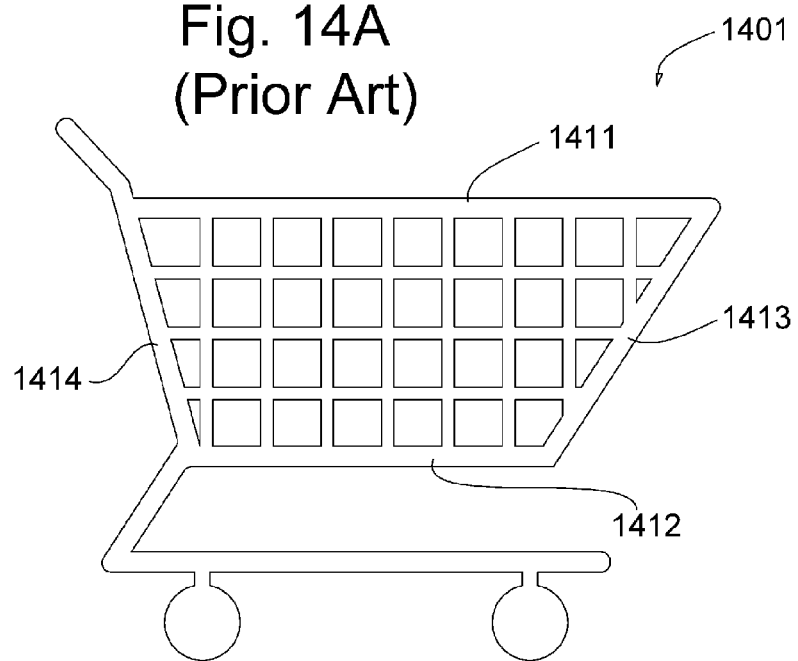
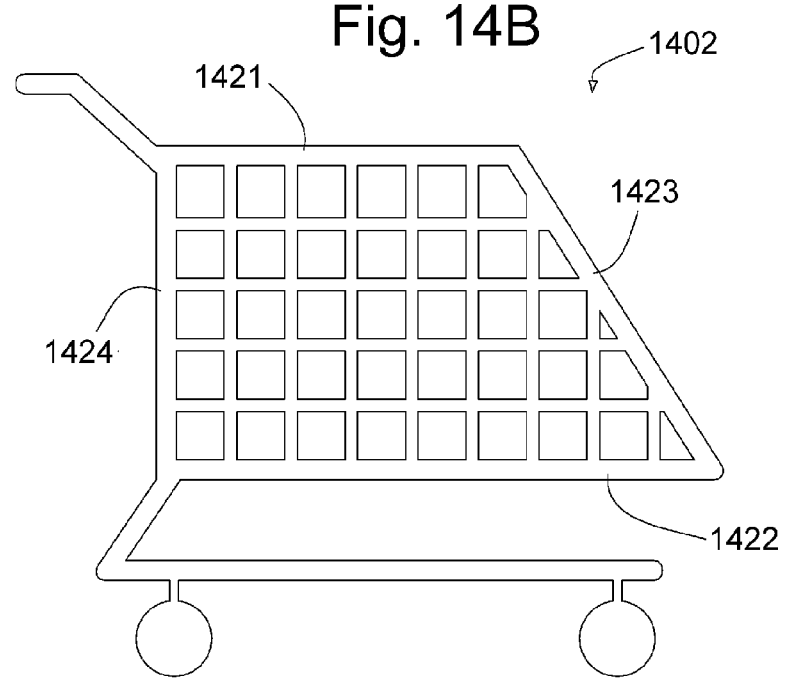

CART

CROSS-REFERENCE TO RELATED APPLICATIONS

This application is a Continuation-in-Part (CIP) of U.S. patent application Ser. No. 13/439,876, titled "Cart", filed on Apr. 5, 2012, which is hereby incorporated by reference in its entirety; which was a Continuation in Part (CIP) of U.S. patent application Ser. No. 12/382,410, titled "Cart", filed on Mar. 16, 2009, now U.S. Pat. No. 8,172,256, which is incorporated herein by reference in its entirety.

FIELD

The present invention is related to the field of carts, and more particularly to shopping carts.

BACKGROUND

Many stores and supermarkets provide shopping carts which may be used by customers. For example, a shopping cart includes an open basket which is rigidly connected to a bottom frame having four wheels. The customer puts inside the shopping cart items that the customer wishes to purchase. At the checkout point, the customer takes the items out from the shopping cart, and allows the cashier to scan the items so that the customer may pay for the purchase. Then, the purchased items are placed back into the shopping cart, either directly or optionally using one or more shopping bags.

Unfortunately, some stores do not allow the customer to take the shopping cart out of the store, for example, towards the customer's vehicle which may be parked outside the store or in a nearby parking lot. Accordingly, the customer may be required to hand-carry the purchased items, which may be heavy or cumbersome to carry, from the checkout point within the store to the vehicle.

Some stores allow the customer to take the shopping cart out of the store, for example, towards the customer's vehicle. Unfortunately, once the customer arrives at his vehicle, the customer has to manually unload the shopping cart, by transferring each purchased item (or each bag containing one or more purchased items) from the shopping cart to the customer's vehicle, e.g., to the trunk or compartment of the vehicle. This process may be inconvenient, effort consuming and/or time-consuming, particularly when the customer purchases a relatively large number of items or one or more relatively heavy items.

SUMMARY

Some embodiments include, for example, carts, collapsible carts and/or foldable carts, In some embodiments, for example, a cart includes: a collapsible or non-collapsible chassis connected to a plurality of wheels; a basket mounted on the chassis and adapted to store one or more items therein; and a bridge element adapted to fit onto an edge of a vehicular trunk, wherein the bridge element is connected at a point located between said basket and said wheels.

In some embodiments, for example, the bridge element is moveable on one or more rails connected underneath the basket substantially in parallel to a long axis of the basket.

In some embodiments, for example, the bridge element is moveable on one or more rails connected to the chassis substantially in parallel to a long axis of the basket.

In some embodiments, for example, the bridge element has a general shape of an upside-down U.

In some embodiments, for example, the basket extends forward relative to the chassis.

In some embodiments, for example, the bridge element is adapted to reach a position extending beyond the length of the chassis.

In some embodiments, for example, the cart includes: one or more wheels connected at a bottom of a front end of the basket (or at a front end of a bottom of the basket, or in proximity to the front-end of the basket and/or the bottom of the basket, or at other suitable places), to smoothly glide the basket on a bottom of the vehicular trunk.

In some embodiments, for example, the cart includes: one or more wheels connected at a front end of a bottom of the basket, to smoothly glide the basket on a bottom of the vehicular trunk.

In some embodiments, for example, the chassis comprises: a first set of one or more collapsible beams, connecting a right side of the basket with a right side of the chassis; and a second set of one or more collapsible beams, connecting a left side of the basket with a left side of the chassis.

In some embodiments, for example, the first set of collapsible beams comprises one or more pivot brackets able to collapse said first set of collapsible beams; and the second set of collapsible beams comprises one or more pivot brackets able to collapse said second set of collapsible beams.

In some embodiments, for example, at least one of the first and second sets of collapsible beams is connected through to a pullable cable adapted to collapse said at least one set of collapsible beams upon pulling of said cable.

In some embodiments, for example, an end of the cable is connected to a handle adapted to be pulled by a hand of a human being.

In some embodiments, for example, the cable passes through a one-way roll-up mechanism adapted to maintain the cable partially pulled upon release of said handle.

In some embodiments, for example, a height of the basket from the ground is user-modifiable by modifying an angle of one or more of the pivot brackets.

In some embodiments, for example, the cart includes: a multi-step locking mechanism adapted to lock the height from the ground of the basket at a particular height set by a user.

In some embodiments, for example, the multi-step locking mechanism comprises: a set of ratchets; and a sliding pole, adapted to be moveable along a downward direction along said set of ratchets, and adapted to be unmovable along an upward direction along said set of ratchets.

In some embodiments, for example, the multi-step locking mechanism is lockable to avoid folding of the chassis, and is unlockable to allow folding of the chassis.

In some embodiments, for example, the basket is detachably attached to said chassis through one or more connectors.

In some embodiments, for example, the chassis comprises an extendable rail; and the basket is adapted, upon its release from said chassis, to glide along said extendable rail into said vehicular trunk.

In some embodiments, for example, the cart includes: one or more wheels connected at a bottom of a front end of the basket, to smoothly glide the basket on a bottom of said vehicular trunk.

In some embodiments, for example, one or more rails are connected underneath the basket and are connected to said bridge element; the basket is detachable from the chassis; and the basket is forward-movable along said one or more rails and relative to said bridge element when said bridge element is positioned over the edge of said vehicular trunk.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIGS. 6A-6J are schematic illustrations of another cart, in accordance with some demonstrative embodiments of the present invention;

FIGS. 7A-7D are schematic illustrations of a cart in accordance with some other demonstrative embodiments of the present invention;

FIGS. 8A-8D are schematic illustrations of four states of a cart, in accordance with some demonstrative embodiments of the present invention;

FIGS. 10A and 10B are schematic illustrations of a right-side view and an isometric view, respectively, of another implementation of a cart, in accordance with some demonstrative embodiments of the present invention;

FIGS. 11A-11H are schematic illustrations demonstrating a cart having a motion preventing mechanism or a restraining mechanism, the cart shown separately or shown within a vehicular trunk, in accordance with some embodiments of the present invention;

FIG. 14A is a schematic illustration of a side-view of a conventional prior-art shopping cart;

FIG. 14B is a schematic illustration of or side-view of a shopping cart in accordance with some demonstrative embodiments of the present invention;

DETAILED DESCRIPTION

Figure 1A:
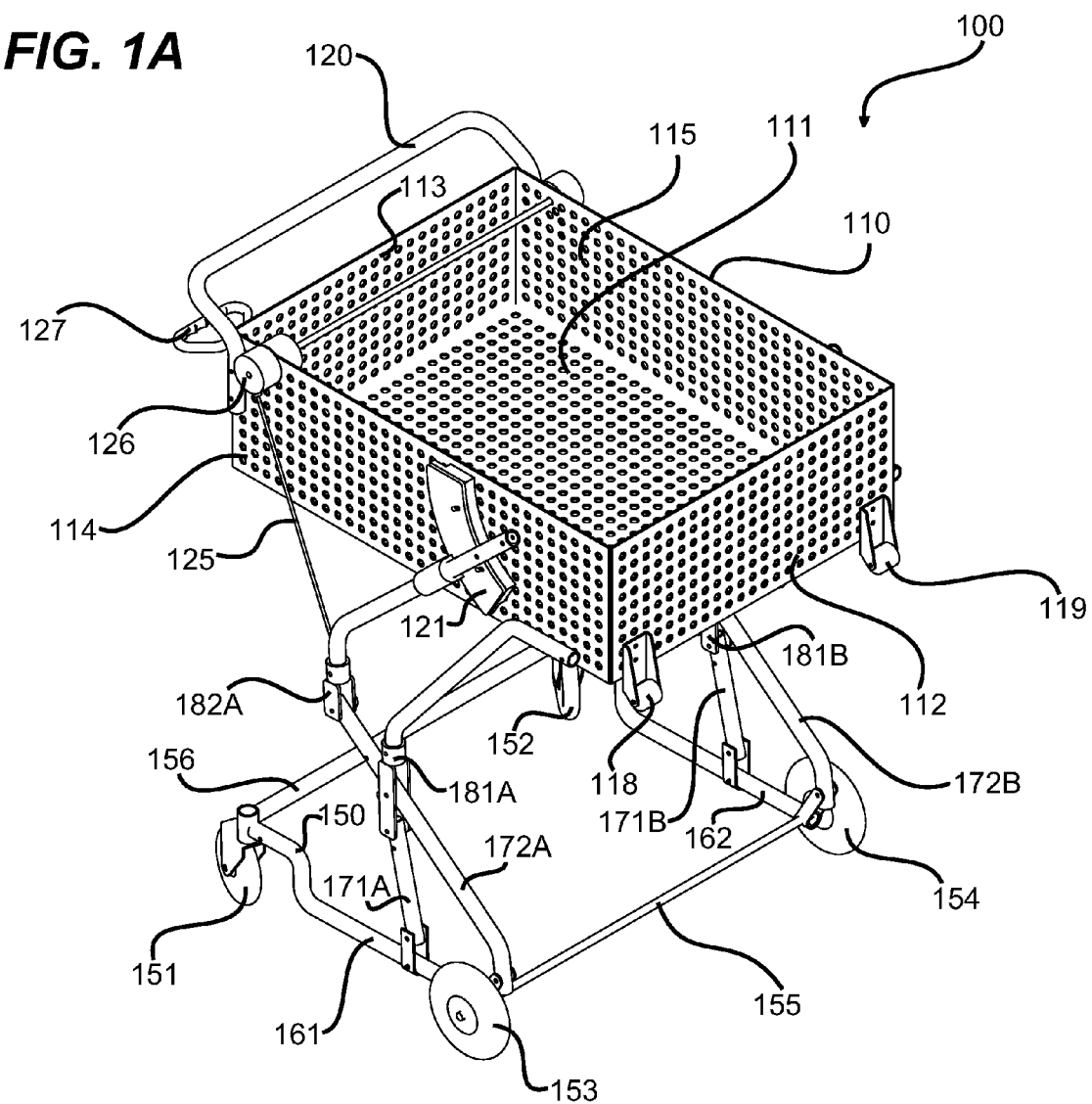
FIG. 1A is a schematic illustration of a three-dimensional isometric top-view of a cart in an unfolded state, in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Although portions of the discussion herein may relate, for demonstrative purposes, to a shopping cart or to a supermarket car, some embodiments (or some features thereof) may be used in conjunction with various other types of carts and/or devices, for example, a stroller, a baby stroller, a carriage, a baby carriage, a cart used for carrying tools, a farm cart, a cart used for carrying one or more pre-defined items, an airport cart, a cart used typically in airports or train stations or central bus stations, or the like.

As an overview, some embodiments may provide a collapsible or foldable shopping cart, which may be inserted, with a significantly small effort, into a car trunk or a car compartment while the cart is loaded with items. The cart may subsequently be unload from the car trunk with its contents, and may expand to an open position and serve to deliver the content of the cart to the final destination (e.g., a home or other residence).

In some embodiments, the cart includes two components: a collapsible chassis, and a load box or a basket able to store items therein. The basket is a generally rectangular container, and is connected to the chassis. In some embodiments, the basket is non-detachable or non-separable from the chassis, and vice versa.

In some embodiments, the cart may optionally include an (optionally collapsible) "trunk invasion component" or "trunk penetration component". When the cart is extended and erect, the trunk invasion component invades into the car trunk in order to provide support for the front side of the cart when its wheels and chassis are folded. In some embodiments, the trunk invasion component may be equipped with wheels or other sliding surfaces, for example, to reduce friction and/or to provide safe and smooth movement. The trunk invasion component may be connected to the front of the cart. In some embodiments, in a collapsed or folded state, the trunk invasion component does not extend, or only slightly extends, beyond the general outline of the cart or of the basket. In other embodiments, the trunk invasion component may extend beyond the general outline of the cart or of the basket; for example, by approximately one percent, by approximately two percent, by approximately five percent, by approximately ten percent, or by other suitable dimension ratio.

In some embodiments, for example, the bottom side of the basket may include an upside-down U-shape protective component or bridge element, which may be movable using one or more rails along the elongated axis of the basket. The protective component or bridge is attached to the bottom of the basket (or to other suitable part of the cart, for example, to the chassis beneath the basket, or to the front side of the cart) and may slide from the front to the rear side of the basket, and vice versa. In some embodiments, for example, the protective component may support the load of the basket and items stored therein; may prevent harm to the trunk or the car; and may further operate as a safety measure to prevent the cart from slipping to the ground when taking the cart out of the trunk.

In some embodiments, the chassis may include one double-leg on each side of the cart (namely, on the right side and on the left side). Each double-leg may include two (or more) beams, and may further include multiple pivot brackets or joins. In some embodiments, the two double-legs may be interconnected; and the two double-legs may be collapsed and expended from a single point.

Figure 1B:
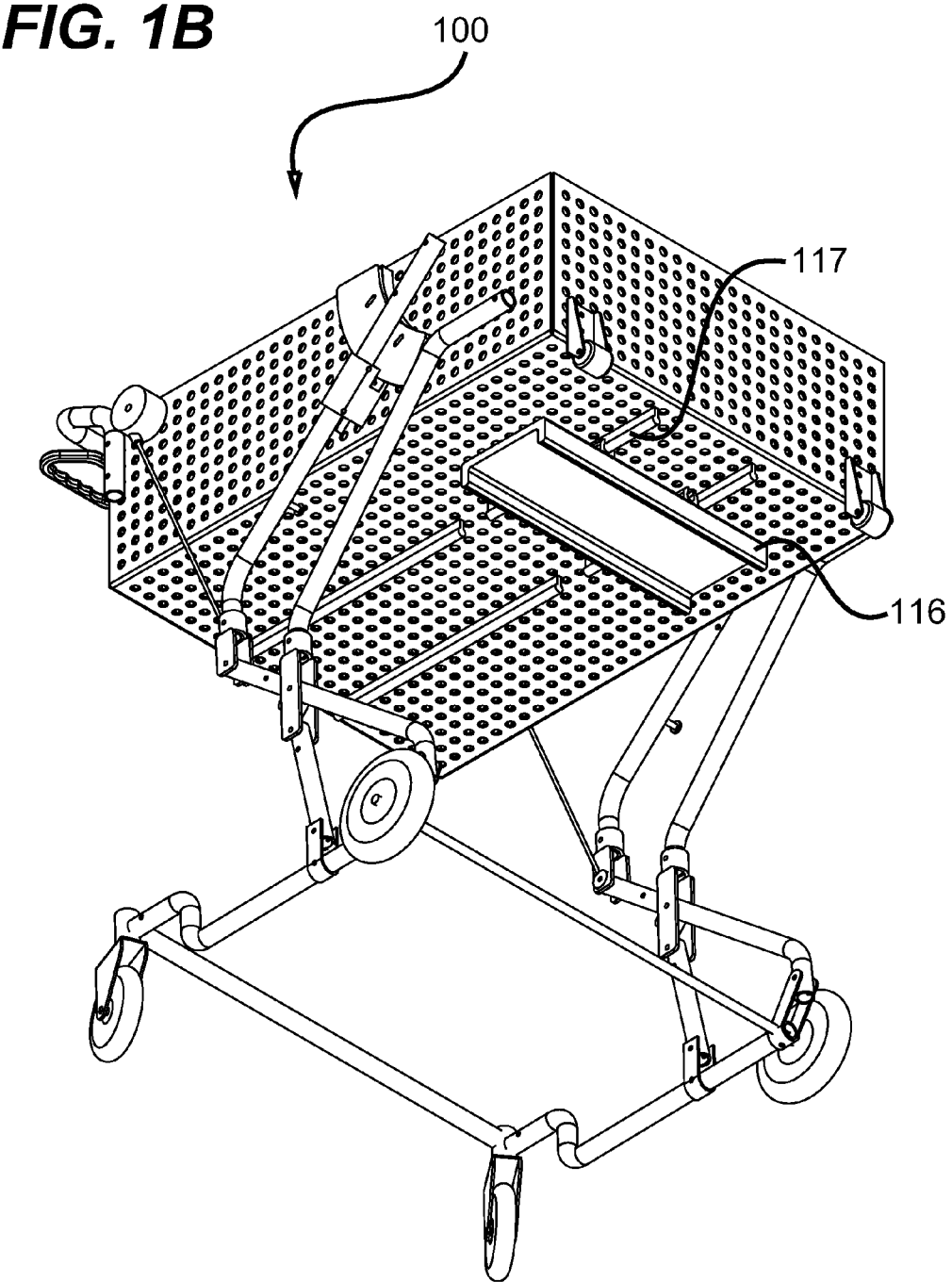
FIG. 1B is a schematic illustration of a three-dimensional isometric bottom-view of the cart in an unfolded state, in accordance with some demonstrative embodiments of the present invention.
Figure 1C:
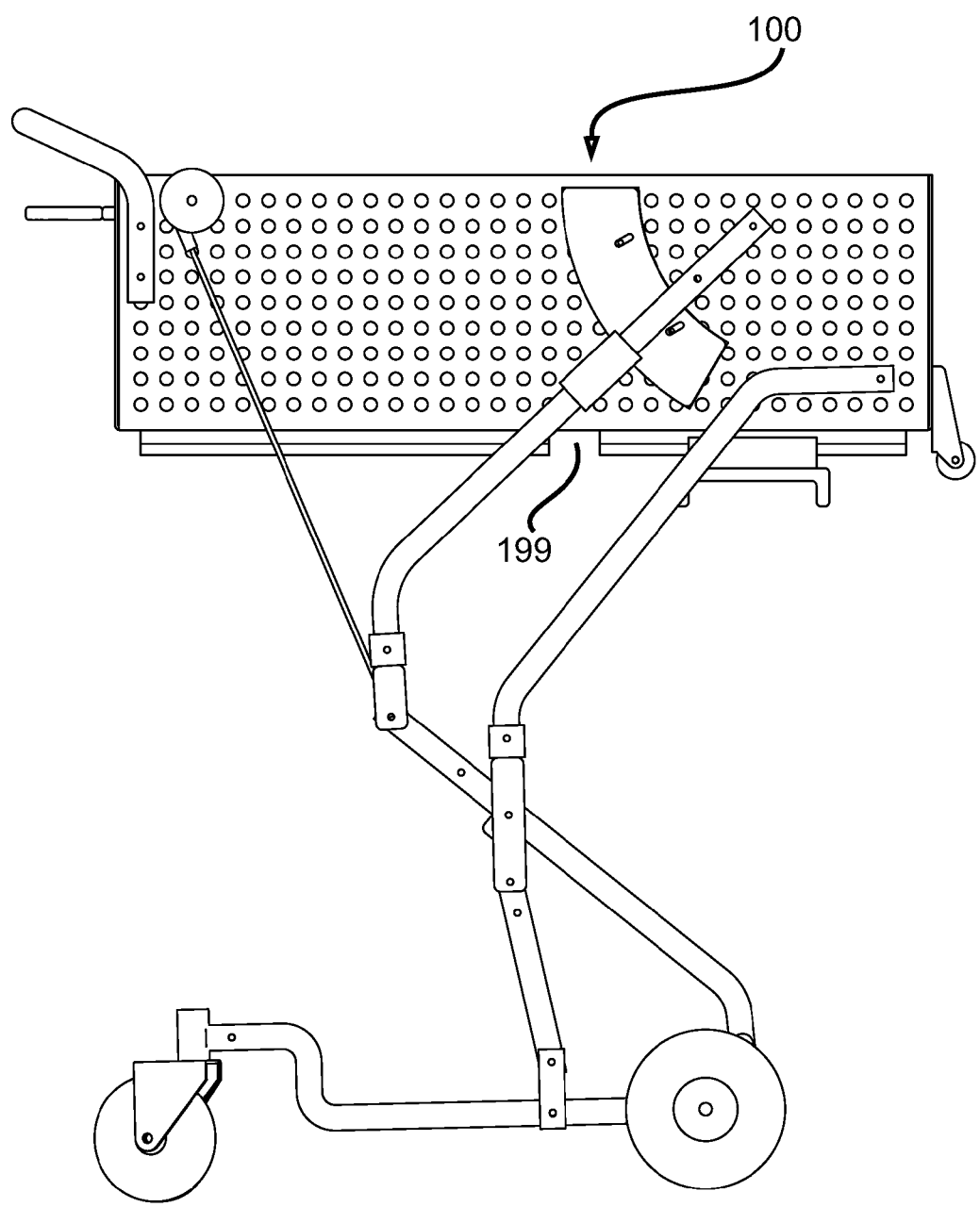
FIG. 1C is a schematic illustration of a side-view of the cart in an unfolded state, in accordance with some demonstrative embodiments of the present invention.
Figure 2A:
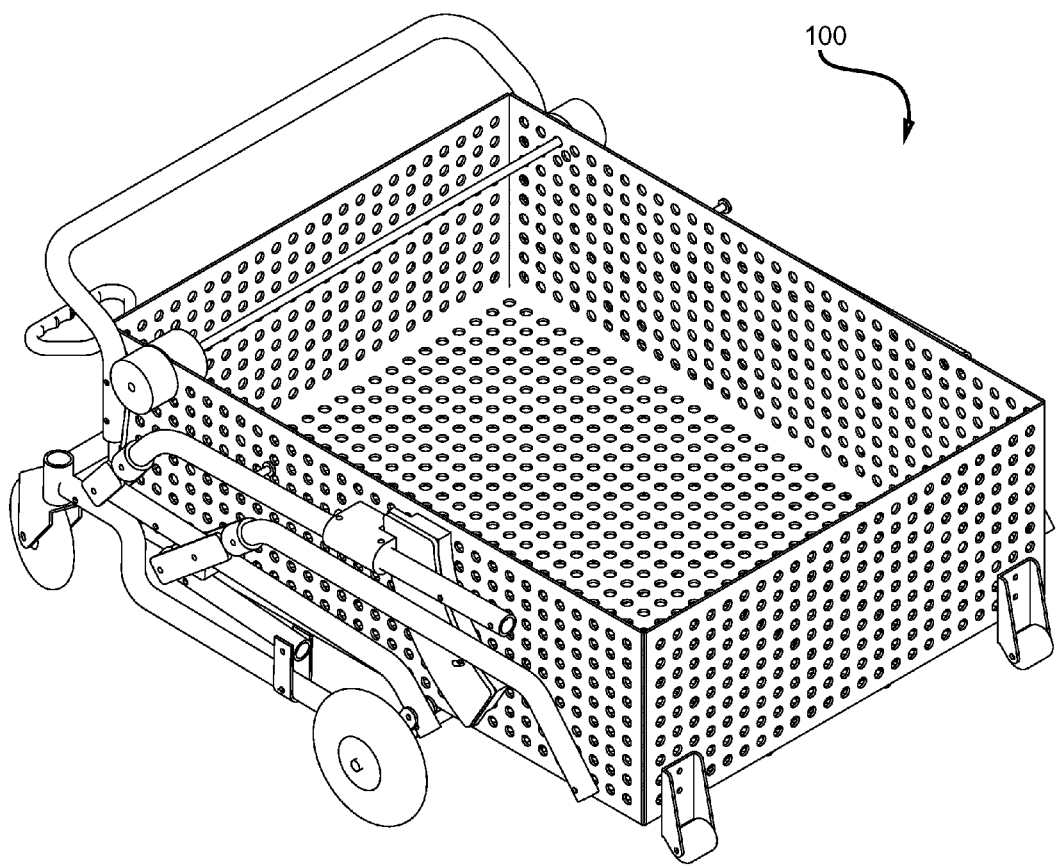
FIG. 2A is a schematic illustration of a three-dimensional isometric top-view of the cart in a folded state, in accordance with some demonstrative embodiments of the present invention.
Figure 2B:
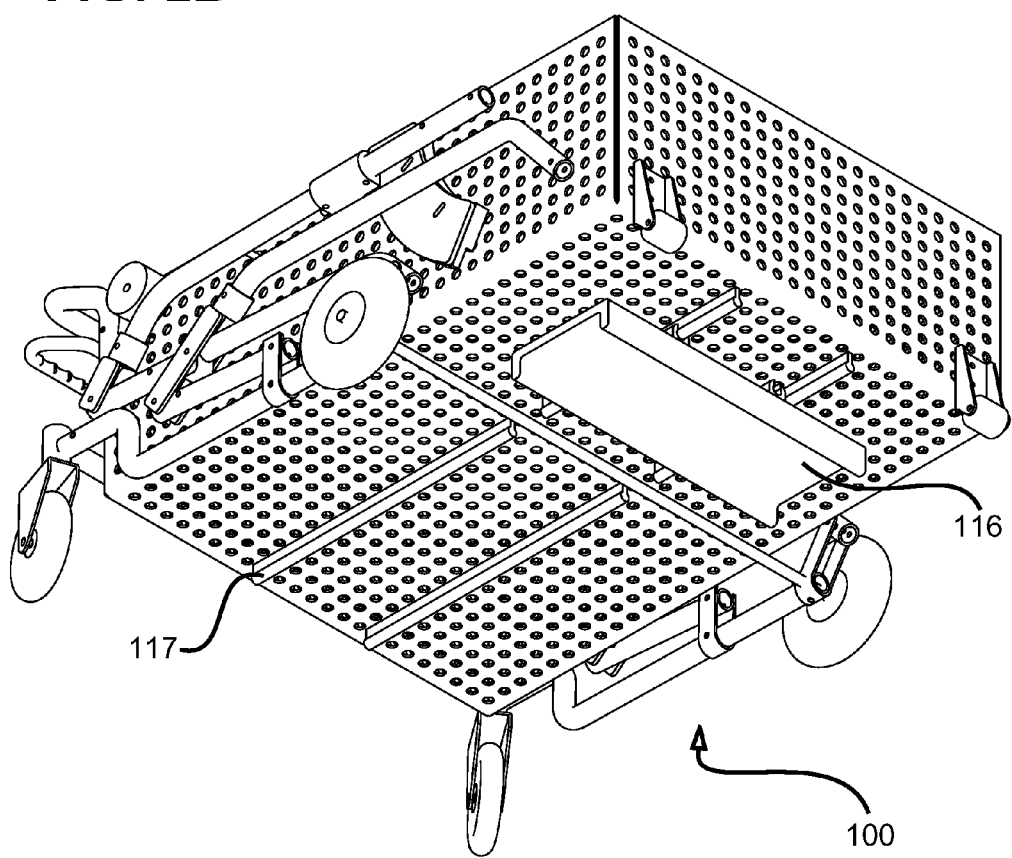
FIG. 2B is a schematic illustration of a three-dimensional isometric bottom-view of the cart in a folded state, in accordance with some demonstrative embodiments of the present invention.
Figure 2C:
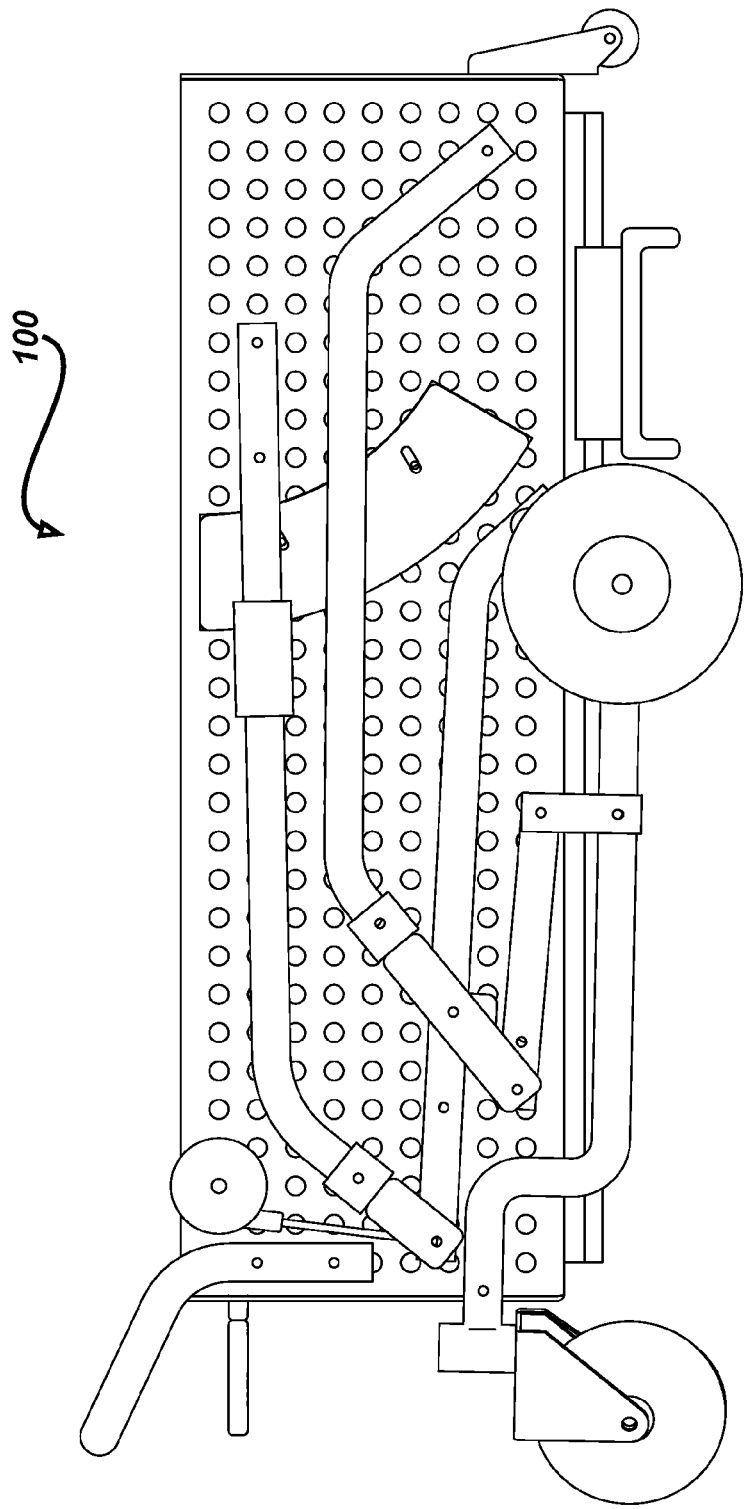
FIG. 2C is a schematic illustration of a side-view of the cart in a folded state, in accordance with some demonstrative embodiments of the present invention.

Reference is now made to FIG. 1A, which is a schematic illustration of a three-dimensional isometric top-view of a cart 100 in an unfolded state, in accordance with some demonstrative embodiments; to FIG. 1B, which is a schematic illustration of a three-dimensional isometric bottom-view of cart 100 in an unfolded state, in accordance with some demonstrative embodiments; and to FIG. 1C, which is a schematic illustration of a side-view of cart 100 in an unfolded state, in accordance with some demonstrative embodiments. Reference is further made to FIG. 2A, which is a schematic illustration of a three-dimensional isometric top-view of cart 100 in a folded state, in accordance with some demonstrative embodiments; to FIG. 2B, which is a schematic illustration of a three-dimensional isometric bottom-view of cart 100 in a folded state, in accordance with some demonstrative embodiments; and to FIG. 2C, which is a schematic illustration of a side-view of cart 100 in a folded state, in accordance with some demonstrative embodiments.

In some embodiments, cart 100 may include a basket 110, which may be connected to or mounted on a mount or a chassis 150. In some embodiments, basket 110 may be generally elongated and generally box-shaped or generally rectangular, or may have other suitable shape (e.g., oval, ellipse shaped, egg shaped, circular, a box having rounded or smooth or non-sharp corners, a hexagon, an octagon, or the like). For example, basket 110 may have a generally horizontal bottom wall 111, which may be generally parallel to the ground. Basket 110 may further have two smaller side walls 112-113, for example, a front side wall 112 and a rear side wall 113, which may be generally vertical or generally perpendicular to the ground. Basket 110 may further have two longer, or elongated, side walls 114-115, for example, a right side wall 114 and a left side wall 115, which may be generally vertical or generally perpendicular to the ground.

In some embodiments, basket 110 may have an open upper side or an open upper end, namely, basket 110 may not have a sixth wall or a cover, and may be open at its top in order to allow unobstructed insertion of items into basket 110. In other embodiments, basket 110 may optionally include, or may be associated with, a top cover which may be used to cover the top side of basket 110, or a portion thereof. For example, a removable cover may be used, or a foldable cover may be used, to allow a user to cover and uncover the top side of basket 110, e.g., in order to protect items from rain, snow, sunlight, dust, or the like. In yet other embodiments, the upper side of basket 110 may be partially covered with a removable or non-removable cover, and may be partially non-covered, in order to allow the user to store some items under the partial cover and some items without the protection of the partial cover.

In some embodiments, basket 110 may be connected to one or more handles; for demonstrative purposes, a generally horizontal handle 120 is shown. Other types of handles may be used. Handle 120 may allow the user to conveniently grip the handle 120 in order to push and/or maneuver the cart 100.

In some embodiments, basket 110 may be rigidly connected or attached to the chassis 150 such that basket 110 may not be separated or disconnected from chassis 150. In other embodiments, basket 110 may be detachably-attached to chassis 150 (or vice versa), using one or more clips or locks, such that basket 110 may optionally be detached, separated or disconnected from the chassis 150.

In some embodiments, the chassis 150 may be collapsible or foldable, as described herein. In some embodiments, the chassis 150 may include multiple wheels in order to allow the user to conveniently push, propel and/or maneuver the cart 100, by applying directional force on the handle 120. For example, two rear wheels 151-152 may be directionally locked and may be able to rotate (e.g., forward and backward, or clockwise and anti-clockwise) but may not be able to turn (e.g., left or right); whereas two front wheels 153-154 may be directionally unlocked and may be able to both rotate as well as turn.

For demonstrative purposes, four wheels 151-154 are shown; yet some embodiments may utilize other number of wheels or other configuration of wheels. In some embodiments, for example, a tricycle configuration may be used, in which a single front wheel is used (e.g., able to rotate and to directionally turn) together with two directionally-locked rear wheels. In other embodiments, six wheels may be used at the bottom part of chassis 150, e.g., similar to a six-wheel configuration of some buses or some trucks. In some embodiments, other suitable configurations may be used.

In some embodiments, front wheels 153-154 may be connected through a generally horizontal front axle 155. In some embodiments, a generally horizontal rear axle 156 may be used to connect the rear wheels 151-152.

In some embodiments, the right-front wheel 153 may be connected to the right-rear wheel 151 through a right-side bar 161; and the left-front wheel 154 may be connected to the left-rear wheel 152 through a left-side bar 162, which may be generally parallel to the right-side bar 161. In some embodiments, each one of bars 161-162 may be generally horizontal at one end (e.g., at the front end), and may have an S-shape or a J-shape at the other end (e.g., at the rear end), in order to connect to the corresponding wheel from the top of the wheel (e.g., using a horizontal pivot or axis) and thereby allowing directional movement of the wheel in addition to wheel rotation.

In some embodiments, the front side of the basket 110 may extend forward beyond the front wheels 153-154. For example, in some embodiments, approximately 25 percent or 33 percent or 40 percent of the length of basket 110 may extend forward beyond the front wheels 153-154.

The chassis 150 may include one or more generally vertical and collapsible or foldable beams. For demonstrative purposes, two sets of beams are shown; other number of beams or sets of beams may be used. The first set of beams may include a right-side shorter beam 171A and a left-side shorter beam 171B. The second set of beams may include a right-side longer beam 172A and a left-side longer beam 172B.

In some embodiments, for example, the right-side shorter beam 171A may be generally C-shaped, and may connect the right-side bar 161 (e.g., at approximately 25 or 33 percent of its length measured from the right-front wheel 153) with the front side of the right wall 114 of basket 110. Similarly, the left-side shorter beam 171B may be generally C-shaped, and may connect the left-side bar 162 (e.g., at approximately 25 or 33 percent of its length measured from the left-front wheel 154) with the front side of the left wall 115 of basket 110.

For example, the right-side longer beam 172A may be generally S-shaped, and may connect the front end of the right-side bar 161 with the right wall 114 of basket 110 (e.g., at approximately 30 or 35 percent of the length of the right wall 114 measured from the front side wall 111). Similarly, the left-side longer beam 172B may be generally S-shaped, and may connect the front end of the left-side bar 162 with the left wall 115 of basket 110 (e.g., at approximately 30 or 35 percent of the length of the left wall 115 measured from the front side wall 111).

In some embodiments, each one of the beams 171A, 171B, 172A and 172B may include one or more joints or pivot brackets. For demonstrative purposes, each one of the beams 171A, 171B, 172A and 172B is shown with one pivot bracket; yet in some embodiments, each one of the beams 171A, 171B, 172A and 172B may include two or more joints or pivot brackets, for example, in order to increase the flexibility of collapsing or expanding the cart 100.

In some embodiments, for example, the right-side shorter beam 171A may have a pivot bracket 181A, which allows the right-side shorter beam 171A to fold or collapse. The pivot bracket 181A may be in an extended position, in which the right-side shorter beam 171A is fully extended; or may be in a closed position, in which the right-side shorter beam 171A is folded or collapsed, partially or substantially entirely. In some embodiments, the right-side shorter beam 171A may optionally include more than one pivot bracket 181A.

Similarly, the left-side shorter beam 171B may have a pivot bracket 181B, which allows the left-side shorter beam 171B to fold or collapse. The pivot bracket 181B may be in an extended position, in which the left-side shorter beam 171B is fully extended; or may be in a closed position, in which the left-side shorter beam 171B is folded or collapsed, partially or substantially entirely. In some embodiments, the left-side shorter beam 171B may optionally include more than one pivot bracket 181B.

In some embodiments, the right-side longer beam 172A may have a pivot bracket 182A, which allows the right-side longer beam 172A to fold or collapse. The pivot bracket 182A may be in an extended position, in which the right-side longer beam 172A is fully extended; or may be in a closed position, in which the right-side longer beam 172A is folded or collapsed, partially or substantially entirely. In some embodiments, the right-side longer beam 172A may optionally include more than one pivot bracket 182A.

Similarly, the left-side longer beam 172B may have a left-side pivot bracket (not shown), which allows the left-side longer beam 172B to fold or collapse. The left-side pivot bracket may be in an extended position, in which the left-side longer beam 172B is fully extended; or may be in a closed position, in which the left-side longer beam 172B is folded or collapsed, partially or substantially entirely. In some embodiments, the left-side longer beam 172B may optionally include more than one pivot bracket.

In some embodiments, a portion of the right-side longer beam 172A may optionally pass through a portion of the pivot bracket 181A of the right-side shorter beam 171A. Similarly, a portion of the left-side longer beam 172B may optionally pass through a portion of the pivot bracket 181B of the left-side shorter beam 171B. In some embodiments, the right-side longer beam 172A may be connected to the right-side shorter beam 171A through a joint or a pivot bracket; and similarly, the left-side longer beam 172B may be connected to the left-side shorter beam 172B through another joint or pivot bracket.

In some embodiments, the bottom side of the bottom wall 111 of basket 110 may have an upside-down U-shaped bridge element 116 (or "n" shaped bridge element) connected thereto. The bridge element 116 may be able to move back and forth, along a portion of the elongated axis of basket 110, over one or more guideways or rails 117 (e.g., two rails 117 as shown). In some embodiments, the bridge element 116 may be used in order to protect the trunk of a vehicle once the basket 110 is placed thereon; and the motion of the bridge element 116 over the rails 117 may allow a controlled and scratch-free sliding motion of the basket 110 into the trunk of the vehicle. In some embodiments, the width of the bridge element 116 (e.g., from the right side to the left side) may be smaller or slightly smaller than the width of the basket 110, such that bridge element 116 may be smaller or slightly smaller, in its long dimension, than the length of front axle 155. For example, in some embodiments, the width of the bridge element 116 may be approximately 5 percent smaller, 10 percent smaller, 15 percent smaller, 20 percent smaller, 30 percent smaller, 40 percent smaller, or 50 percent smaller than the width of the basket 110. In other embodiments the width of the bridge element 116 may be similar or substantially identical to the width of the basket 110. In other embodiments, the width of the bridge element 116 may be greater or slightly greater than the width of the basket 110, for example, approximately one percent greater, two percent greater, three percent greater, five percent greater, ten percent greater, or the like. Other suitable size ratios may be used.

In some embodiments, the rails 117 may be connected to the basket 110, for example, underneath the basket 110. In other embodiments, the rails 117 may be connected to the chassis 150. In some embodiments, the rails 117, or at least a portion thereof, may be substantially parallel or generally parallel to a long axis of the basket 110; may be substantially parallel or generally parallel to the longest dimension of the basket 110; may be substantially perpendicular to the rear side wall 113 and/or to the front side wall 112; may extend from the rear side wall 113 (or from a position relatively close to the rear side wall 113) to the front side wall 112 (or to a position relatively close to the front side wall 112); may be substantially parallel or generally parallel to the ground; may be substantially perpendicular or generally perpendicular to the front axle 155 and/or to the rear axle 156; may be substantially parallel or generally parallel to the right-side bar 161, or to the left-side bar 162, or to a line or a bar connecting the right-front wheel 153 with the right-rear wheel 151, or to a line or a bar connecting the left-front wheel 154 with the left-rear wheel 152; or may be otherwise suitably positioned.

Optionally, one or more guiding wheels 118-119 may be located at the front side of the basket 110, to allow smoother and substantially scratch-free and/or friction-free sliding motion of the basket 110 into the trunk of the vehicle. In some embodiments, sliding surfaces or other sliding components or guiding components may be used, instead of or in addition to the guiding wheels 118-119.

In some embodiments, cart 110 may be implemented such that the distance between the ground and the bottom wall 111 of basket 110 ground may be higher, or slightly higher (e.g., approximately 5 or 10 or 15 or 20 percent higher) than a typical and/or average height of a trunk of a car. For example, in some embodiments, data may be collected in order to determine the average or typical height from the ground of trunks of top-selling or most-common vehicles (e.g., Toyota Camry, Toyota Corolla, Honda Accord, GMC Impala, Ford Taurus, or the like), and the collected and analyzed data may be used in order to determine the height from the ground to the bottom wall 111 of basket 110 (e.g., approximately 70 centimeters in Toyota Camry, approximately 73 centimeters in Toyota Corolla, approximately 76 centimeters in GMC Malibu, or the like).

In some embodiments, the height from the ground of the bottom wall 111 of basket 110 may be fixed and pre-defined, for example, based on typical and/or average heights from the ground of trunks (or edges of trunks, which are higher than the bottom of the trunk). In other embodiments, cart 100 may include a mechanism or one or more components which allow the user to modify the height from the ground of basket 110, for example, by further extending or by partially collapsing one or more of the beams (e.g., beams 171A, 171B, 172A and/or 172B), or using other suitable height-changing mechanisms, height-increasing mechanisms, or height-reducing mechanisms.

In some embodiments, the user may push the cart 100 towards the open trunk of the vehicle, such that the front side of the basket 110 extends over the edge of the trunk. Then, the user may further delicately push or slightly maneuver the cart 100 such that the bridge element 116 is above the edge of the trunk. The user holds the handle 120, and collapses or folds the beams 171A, 171B, 172A and 172B, such that the beams 171A, 171B, 172A and 172B become collapsed and folded beneath the basket 110 and in proximity to the basket 110, or such that the 171A, 171B, 172A and 172B become substantially parallel to the bottom wall 111 (or in a small angle relative to the bottom wall 111), in contrast to being substantially perpendicular to the bottom wall 111 when the cart 100 is erect. The cart 110 is now temporarily held and balanced in place, for example, by the bridge element 116 which is held by the trunk edge, and by the handle 120 which is held by the user. The user may now slightly lift the handle 120, which is connected to the basket 110, and may thereby slide gently the basket 110 forward into the trunk, as the bridge element 116 slides backwards over the rails 117. Once the bridge element 116 traverses the entire length of the rails 117 (e.g., which may be corresponding substantially to the entire length of the basket 110), the user slightly further lift the handle 120 and may push the portion of basket 110 which is still outside the trunk, into the trunk; optionally utilizing the guiding wheels 118-119 which may allow a smooth and scratch-free motion within of the basket 110 within the trunk. Once the rear side wall 113 traverses the edge of the trunk, and the entire basket 110 is located beyond the edge of the trunk, the user may delicately lower the basket 110 using the handle 120, such that the basket 110 (and the chassis 150 which is collapsed and folded underneath it) lies within the trunk. It is noted that the basket 110 may remain in a substantially horizontal position during the entire insertion process, or at a relatively low angle (e.g., approximately 10 or 20 degrees relative to the ground), such that items within the basket 110 remain therewith and do not "spill out" of the basket 110 during the insertion process. It is further noted that in some embodiments, the wheels 151-154 of cart 110 may be implemented such that they do not interfere with folding of cart 100; for example, once cart 100 is folded, wheels 151-154 may be protruding externally (e.g., sideways) to basket 110, or may be beneath basket 110.

A substantially reversed order of operations may be used for removal of the cart 100 from the trunk of the vehicle. The user opens the trunk, and holds the handle 120 of the cart 100. The user lifts the handle 120, and pulls the basket 110 upward and backward (towards the user), such that the bridge element 116 is placed on the edge of the trunk. The guiding wheels 118-119 may assist the user to perform a smooth and scratch-free backward pulling motion. The user than proceeds to pull backwards the basket 110, such that the bridge element 116 slides forward over the rails 117. The upside-down U-shape of the bridge element 116 operates as a brake to prevent the user from accidentally pulling back the basket 110 beyond the edge of the trunk prior to unfolding or extending the folded chassis 150. Once the basket 110 (or a major portion thereof) is external to the trunk, the chassis 150 is extended or unfolded to be in an erected position, in order to support the weight of the basket 110 and its contents once the entire basket 110 is pulled backward out of the trunk.

Figure 3:
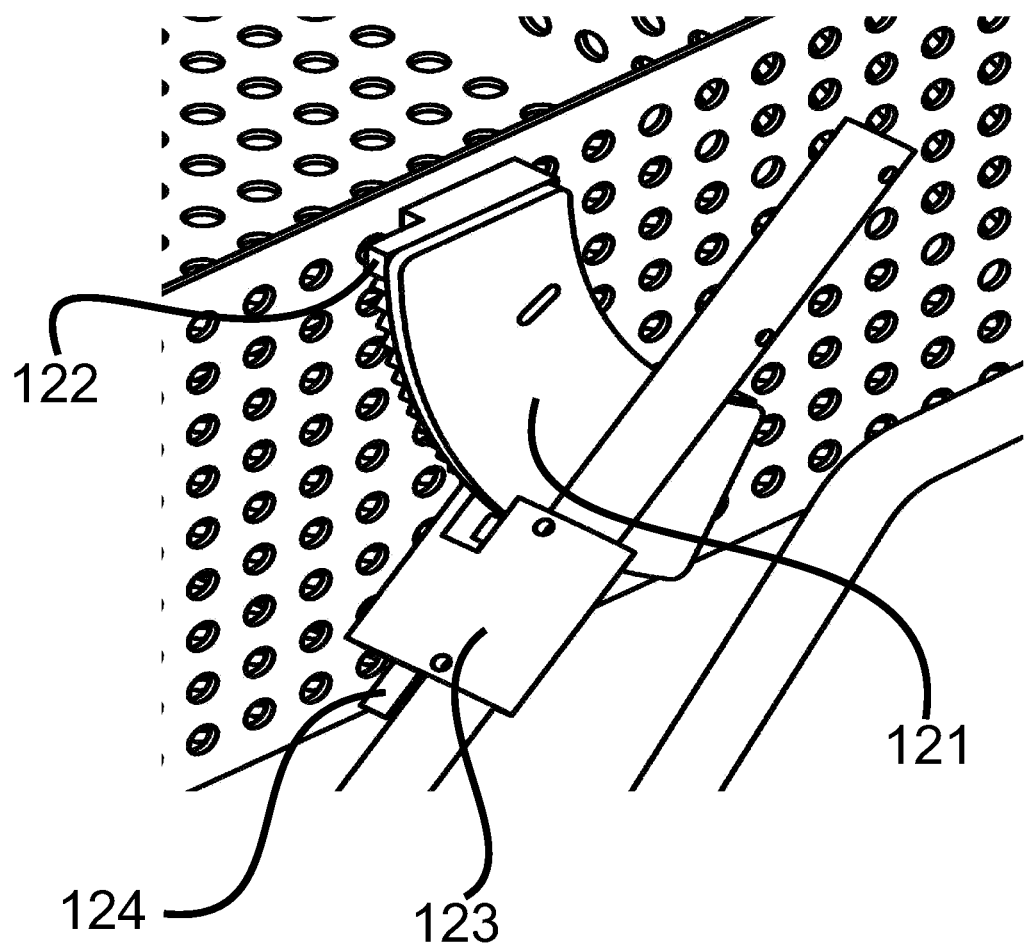
FIG. 3 is a schematic illustration of a three-dimensional isometric view of a portion of the cart, showing in greater detail a multi-step locking mechanism, in accordance with some demonstrative embodiments of the present invention.

Reference is now made to FIG. 3, which is a schematic illustration of a three-dimensional isometric view of a portion of cart 100, showing in greater detail a multi-step locking mechanism 121, in accordance with some demonstrative embodiments.

In some embodiments, due to differences between the heights of trunks of various vehicles, cart 100 may include the multi-step locking mechanism 121 which allows the user to lock the chassis 150 of the cart 100 to accommodate the height of the particular vehicle trunk of the user. This allows the user to take out the cart 100 (e.g., substantially empty of any stored items) out of his vehicle trunk; to lock the cart 100 on a particular height; to utilize the cart 100 by filling it with items; and to return with the cart 100 to the vehicle, while the height of cart 100 is maintained due to the multi-step locking mechanism 121 and accommodates the height of the particular vehicle trunk of the user. In some embodiments, this may avoids a situation in which the cart 100 has a relatively large height (e.g., to accommodate the highest of common vehicle trunks), which may result in a "free fall" of possibly several centimeters when the cart 100 is folded into the car; the multi-step locking mechanism 121 thus avoids such "free-fall", as well as safety concerns and user concerns associated therewith. In some embodiments, the multi-step locking mechanism 121 may further provide stability to cart 100, for example, along the horizontal axis, thereby improving the durability and/or the performance of the chassis 150 and its components.

In some embodiments, the multi-step locking mechanism 121 may include, for example, a rigid clip or sleeve 123, a sliding pole 124, and a set of teeth or ratchets 122. In some embodiments, for example, the rigid sleeve 123 may provide strength and horizontal stability; the sliding pole 124 may be able to slide downward along the set of teeth or ratchets 122, such that a sliding upward is not available or not easily available due to a locking provided by the sliding pole 124 in the upward direction. The length of the set of teeth or ratchets 122 may allow a variety of locking positions, thereby providing a variety of heights into which the cart 100 may be locked.

Referring now back to FIGS. 1A-1C and 2A-2C, in some embodiments, cart 100 may include a cable 125 to facilitate the folding of the cart 100. For example, the user may arrive with the cart 100 to her vehicle; the user may place the cart 100 such that the basket 110 extends into the open trunk, and such that the bridging element 116 is placed above or on top of panel of the trunk; the user may unlock the locked chassis 150, and may pull back the cable 125 in order to pull-up and fold the chassis 150 into a folded position under the basket 110. The cable 125 may be connected to a non-returning rolling mechanism 126 and may end with a pull handle 127, similar to or resembling (from a visual point of view, and/or from an external point-of-view) a cable and rolling mechanism of a lawn mower starter: for example, pulling of the handle 127 rotates an internal rolling component (e.g., a round or circular drum-shaped unit) which in turn rolls-up the cable 125, which in turn pulls up the folding components of the chassis 150. In some embodiments, the rolling mechanism 126 includes two rolling components that share a common axis or axle. For example, a first rolling component is a "user roller", having a spiral spring and a free return mechanism; the first rolling component operates, upon the user pulling of the handle 127, to rotate around the common axel and squeeze the spring; when the user releases the handle 127, the first rolling component returns to its default position due to the power of the spring. As a result of the common axel, the rotation of the first rolling component also rotates the second rolling component, for example, a "legs roller" which may be a cylinder having a non-return mechanism. This split mechanism allows the user to practice several relatively short pulling operations in order to perform a full collapse operation. In some embodiments, the user may apply multiple pulls to handle 127 in order to completely fold the folding components of chassis 150. In some embodiments, the folding process may commence at the particular height in which the cart 100 is positioned, e.g., based on the multi-step locking mechanism 121.

In some embodiments, cart 100 may be implemented or manufactured by taking into account, for example, the average, the mean, or the common dimensions and/or heights and/or characteristics of popular vehicles in a particular market for which the cart 100 is intended; and by taking into account an average, a mean or a common cumulative volume of shopping items (e.g., for implementing an appropriate volume of basket 110). Some implementations may emphasize safety of operation, ease of operation, ability to operate the cart 100 (e.g., including the ability to fold and unfold the cart 100) by utilizing a minimal amount of physical force (e.g., to accommodate senior citizens), and the elimination of damage or scratches to the vehicle or its trunk.

In some embodiments, the chassis 150 may be implemented using multiple bars and beams, having multiple joints or pivot brackets. In some embodiments, each bar or beam (or a set of bar and beam) may support a pair of wheels (e.g., a front wheel and a corresponding rear wheel). In some embodiments, each bar or beam may be anchored to one or more (e.g., to two) anchoring points, in order to allow flexible folding. In some embodiments, bars or beams that are located at the right and left sides of the cart 100, may be interconnected using one or more horizontal axles, in order to increase the stability of the cart 100 and the chassis 150, and to avoid an instable "shaking" of the cart 100 sideways. In some embodiments, such bars and beams may be implemented to minimally protrude beyond the basket 110, in order to allow a small form factor of the cart 100 once folded.

In some embodiments, cart 100 may be implemented in order to allow convenient folding of cart 100 into a collapsed or folded cart 100 having a relatively-small form factor. For example, the rear wheels 151-152 (and the horizontal rear axle 156 connecting them) may fold towards the rear side of the cart 100, such that upon folding of cart 100 they are located behind the basket 110 and/or externally to basket 110. In some embodiments, a gap 199 may be introduced into rails 117, dividing each one of rails 117 into two rail-portions separated by the gap 199. The gap 199 may be implemented as a cavity able to accommodate the horizontal front axle 155 upon folding of cart 100. The gap 199 may be sufficiently small to allow the bridge element 116 to be able to continuously glide or move along the two rail-portions of each rail 117, including over the gap 199. Other suitable implementations may be used.

In some embodiments, cart 100 may be implemented using suitable dimensions and/or angles in order to allow stacking and/or nesting of multiple carts, or of multiple chassis components (e.g., if the basket 110 is detachable from the chassis 150). In some embodiments, for example, chassis 150 may be implemented to have a front side which is narrower and/or smaller then the rear side of chassis 150, in order to facilitate stacking or nesting of multiple units of chassis 150.

In some embodiments, other suitable combinations of basket, chassis, beams or bars, and wheels may be used. For example, in some embodiments, the basket 110 may be sufficiently strong and/or rigid to directly connect with a collapsible or foldable set of bars and/or beams, substantially without a chassis or through a relatively small or light-weight chassis. In some embodiments, the bridge element 116 may be connected to other suitable portions of the cart 100, for example, to the basket 110, to the bottom of basket 110, underneath the basket 110, in front of the basket 110, to the chassis 150, to one or more of the bars and/or beams of cart 100, to multiple components of cart 100, or the like. Other suitable implementations may be used.

In some embodiments, cart 100 may be implemented using other mechanisms. For example, in some embodiments, basket 110 may be detachable from chassis 150, and a particular mechanism may be used (e.g., instead of the folding mechanism described above) for safe insertion of basket 110 into a trunk of a vehicle. For example, a sliding mechanism may include a first sliding member attached to basket 110, and/or a second sliding member attached to chassis. The chassis may include a collapsible or extendable track or rail which guides the basket 110 (once detached) safely into the trunk of the vehicle. The basket 110 may include one or more rollers or gliding wheels which allow the basket 110 to move smoothly along its trail into the trunk. One or more connectors may be used to attach the basket 110 to the chassis 150, and to selectively detach (by the user) the basket 110 from the chassis 150. For example, when the user wishes to transfer the basket 110 into the vehicle trunk, the user pulls the rail from the chassis 150 towards the car trunk; the user unlocks the basket 110 (namely, detaches the basket 110 from the chassis 150 by releasing one or more clips or locks of connectors); and the user pushes the basket 110 along the extended rail. After the safe landing of the basket 110 in the vehicle trunk, the user returns the rail back to its original folded place. In contrast, when the user wishes to transfer the basket 110 from the vehicle trunk to be attached to the chassis 150 which stands outside of the vehicle, the user pulls the rail from the chassis 150 into to the vehicle trunk, and then pushes the basket 110 towards the chassis 150 along the rail. When the basket 110 reaches the rear end on the chassis 150, the basket 110 is locked, for example, manually by the user, or automatically due to a locking mechanism or a clip or other component of connectors which auto-activates once the basket 110 reaches the rear end of the chassis 110; and the rail may then be put back to its original folded state. In some embodiments, other suitable implementations may be used.

Figure 4A:
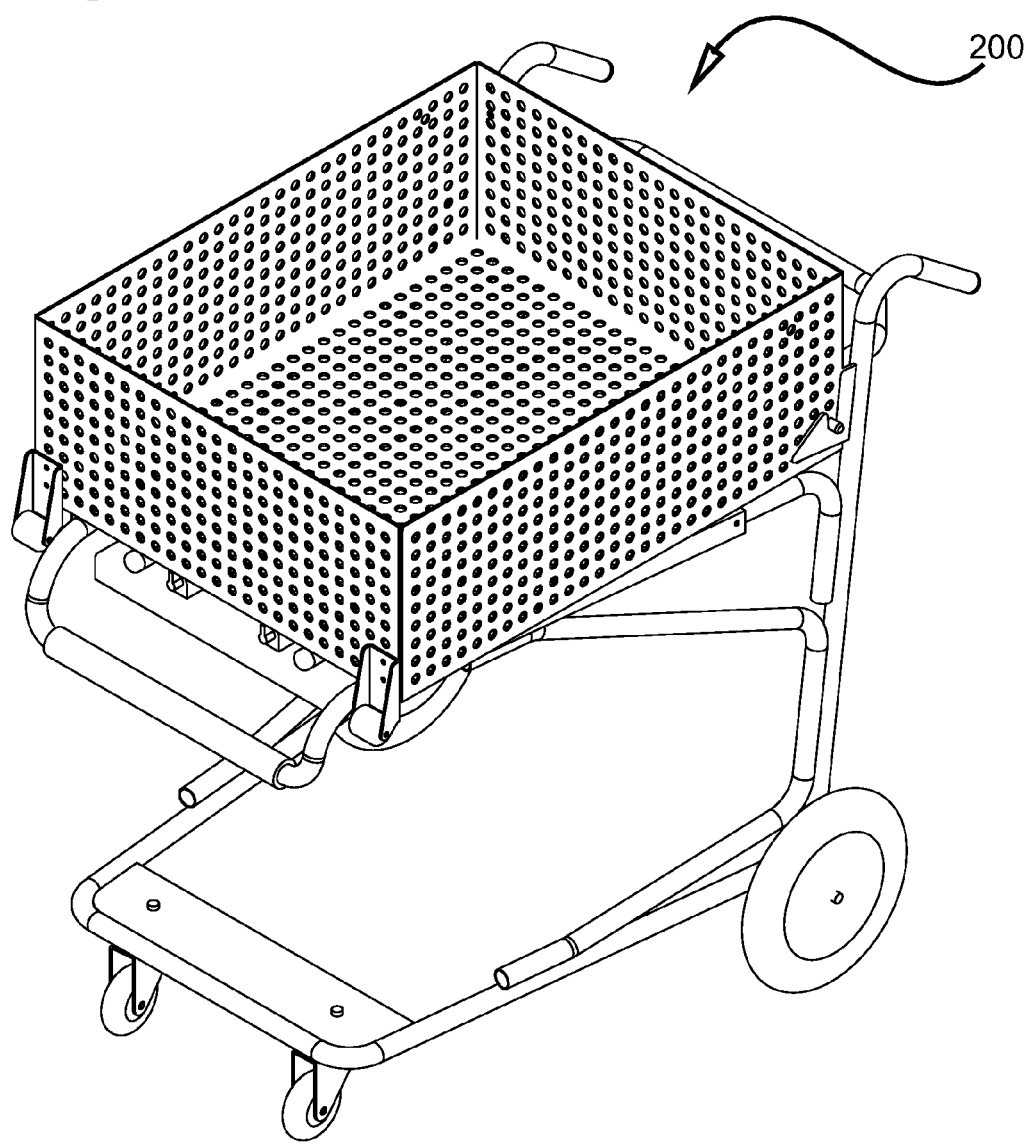
FIG. 4A is a schematic illustration of a three-dimensional isometric top-view of another cart in an unfolded state, in accordance with some demonstrative embodiments of the present invention.
Figure 4B:
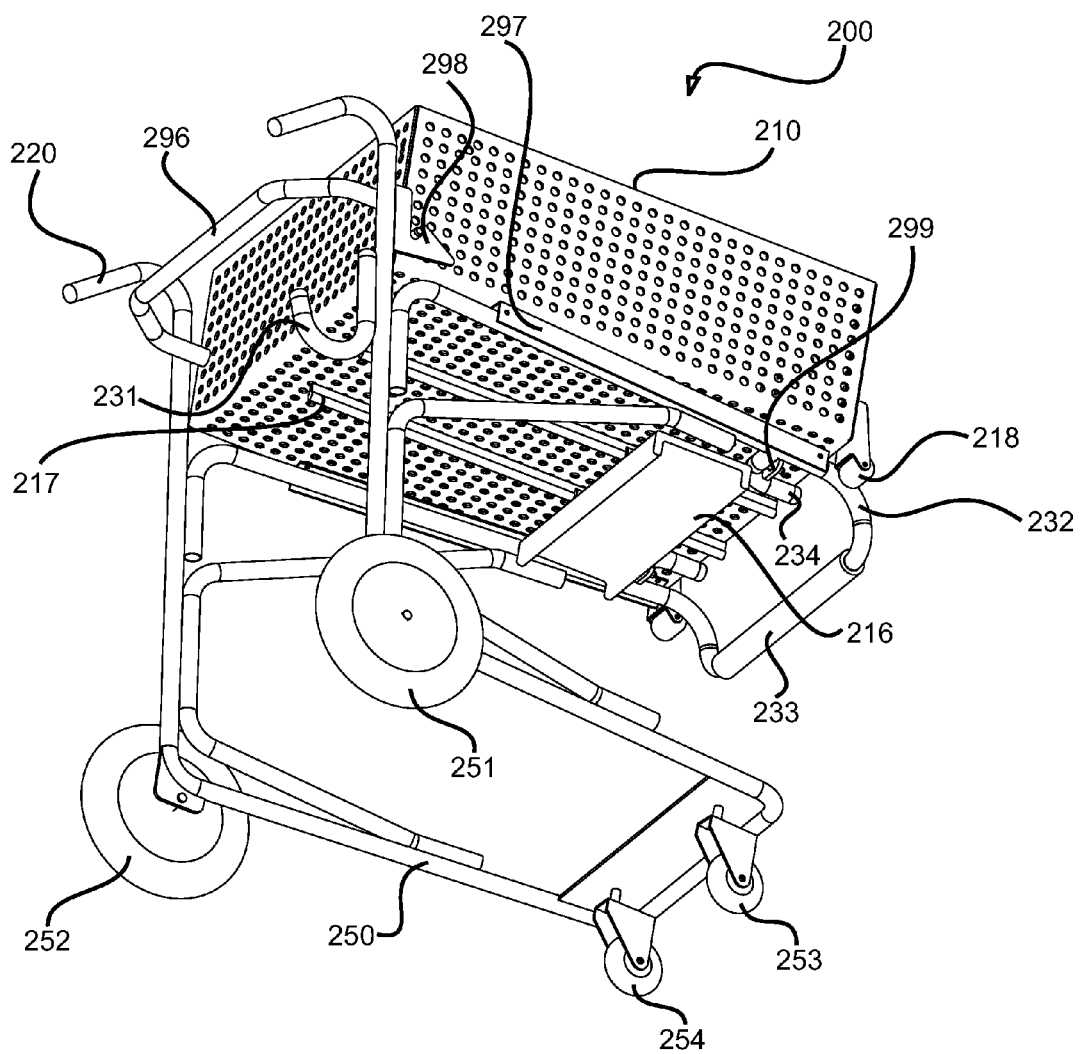
FIG. 4B is a schematic illustration of a three-dimensional isometric bottom-view of the cart in an unfolded state, in accordance with some demonstrative embodiments of the present invention.
Figure 4C:
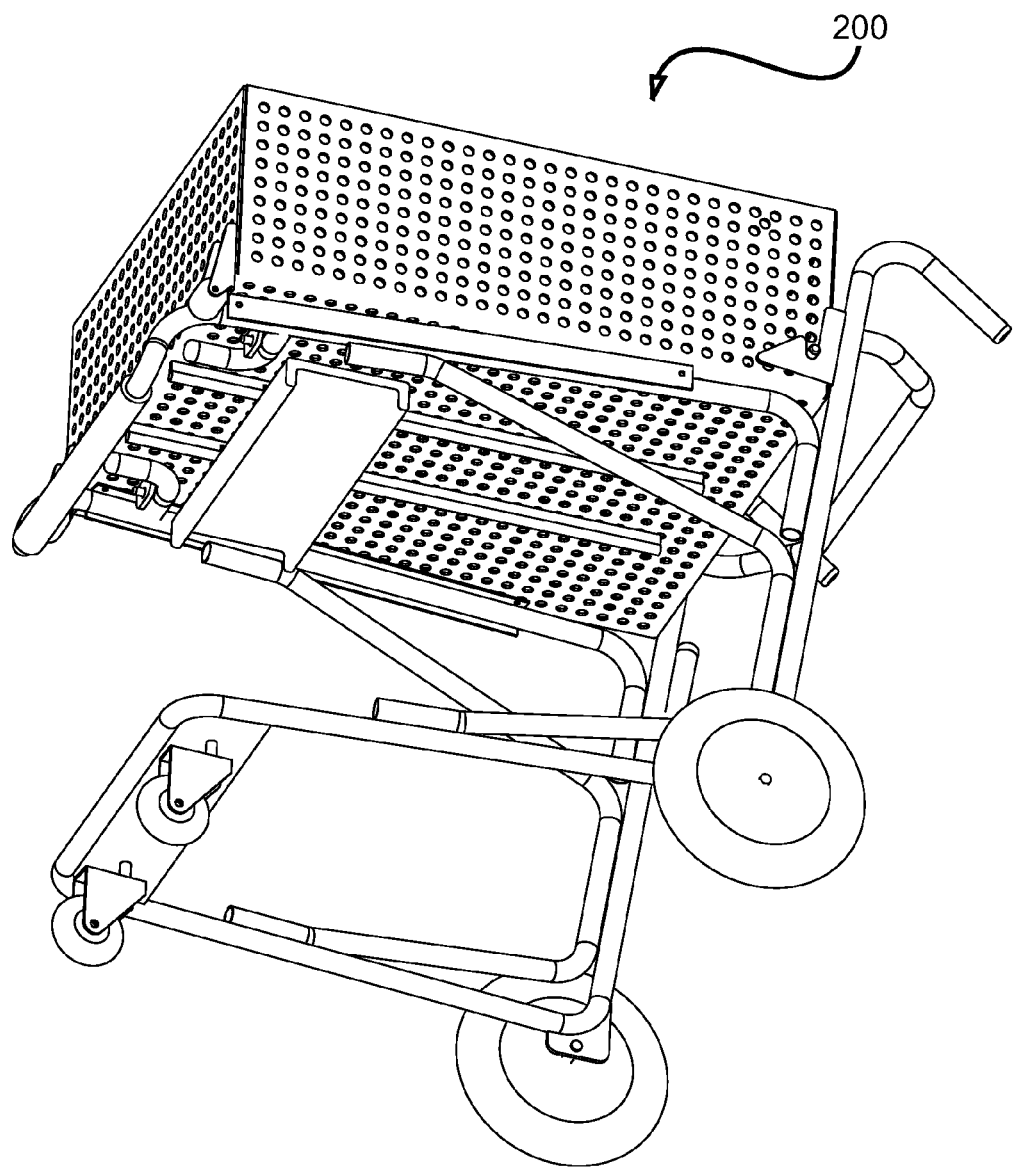
FIG. 4C is a schematic illustration of another three-dimensional isometric bottom-view of the cart in an unfolded state, in accordance with some demonstrative embodiments of the present invention.
Figure 4D:
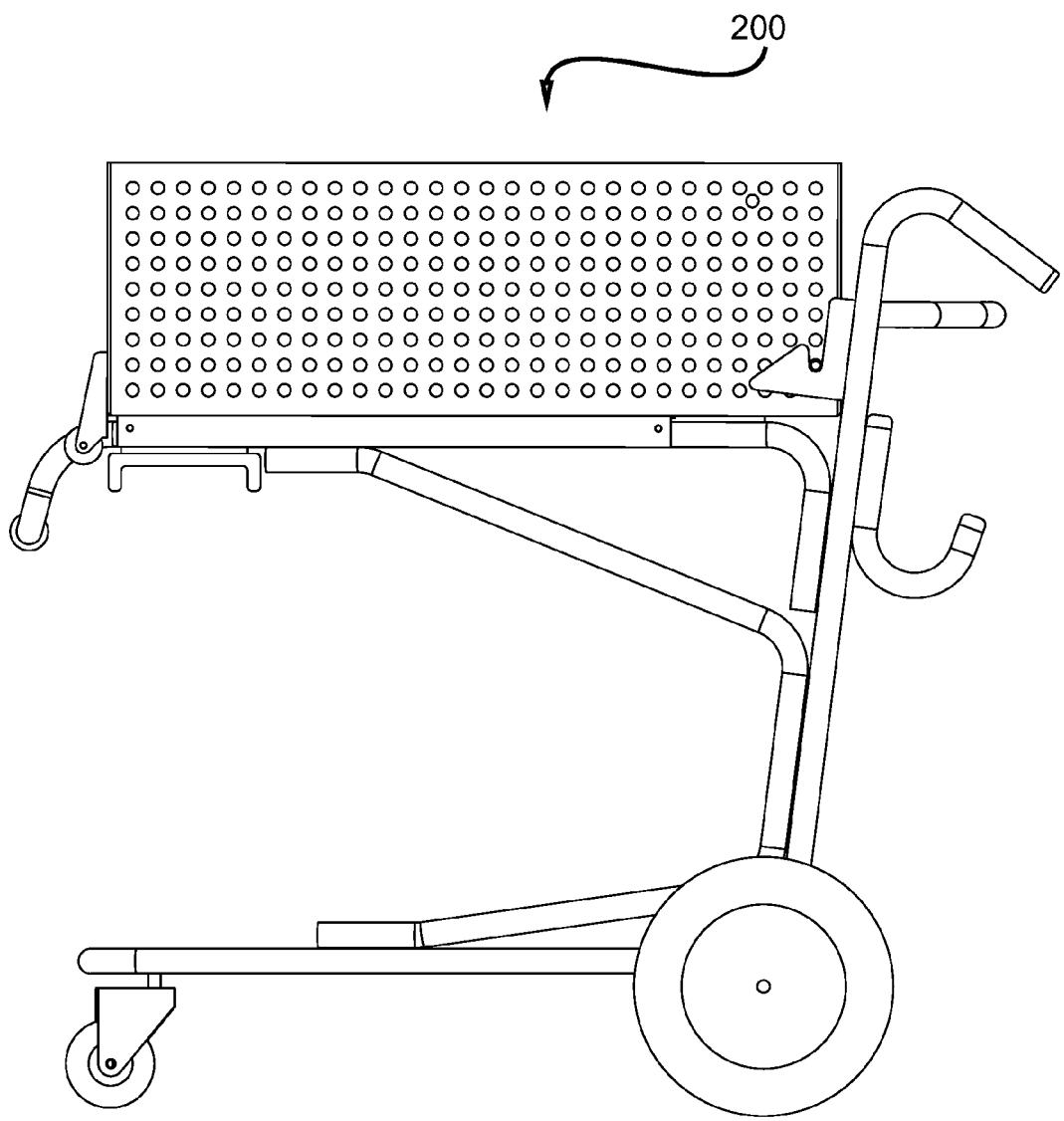
FIG. 4D is a schematic illustration of a side-view of the cart in an unfolded state, in accordance with some demonstrative embodiments of the present invention.
Figure 4E:
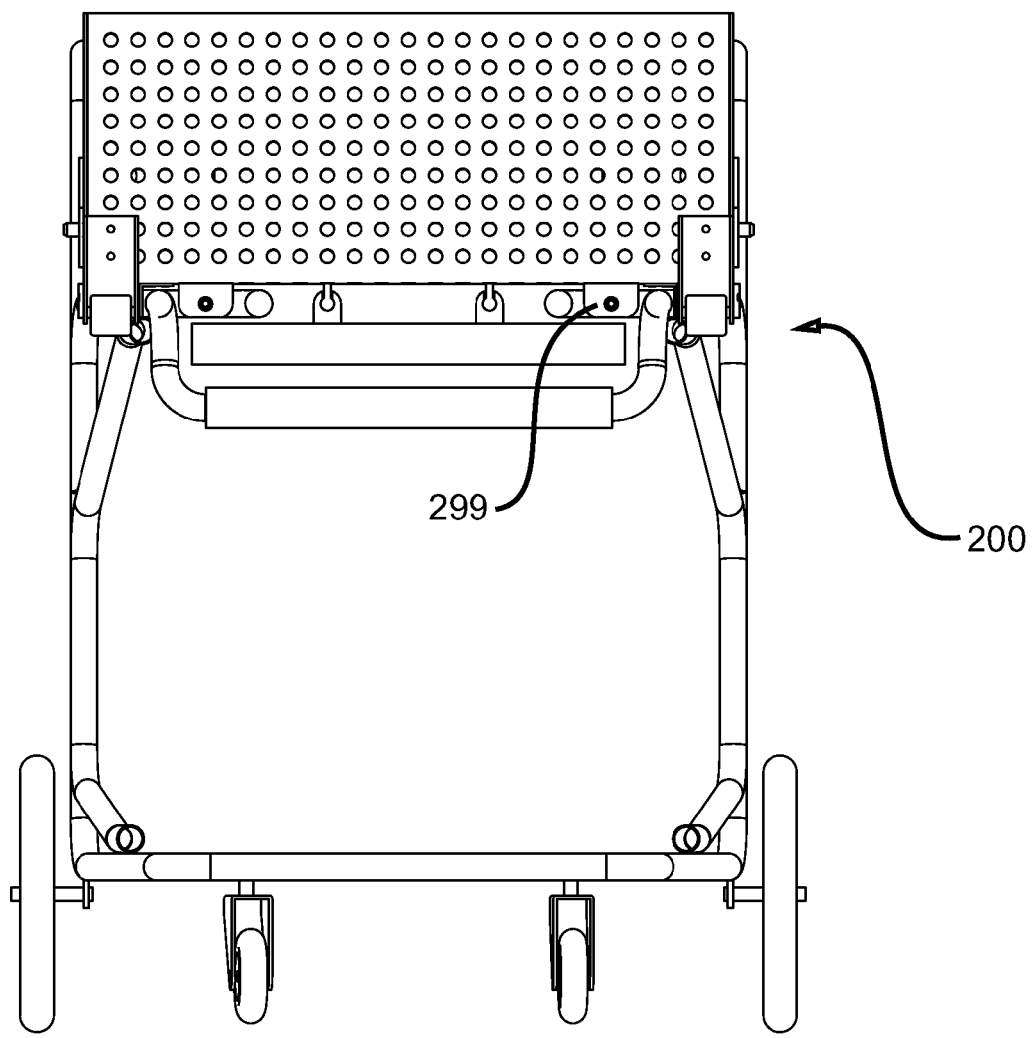
FIG. 4E is a schematic illustration of a front-view of the cart in an unfolded state, in accordance with some demonstrative embodiments of the present invention.
Figure 4F:
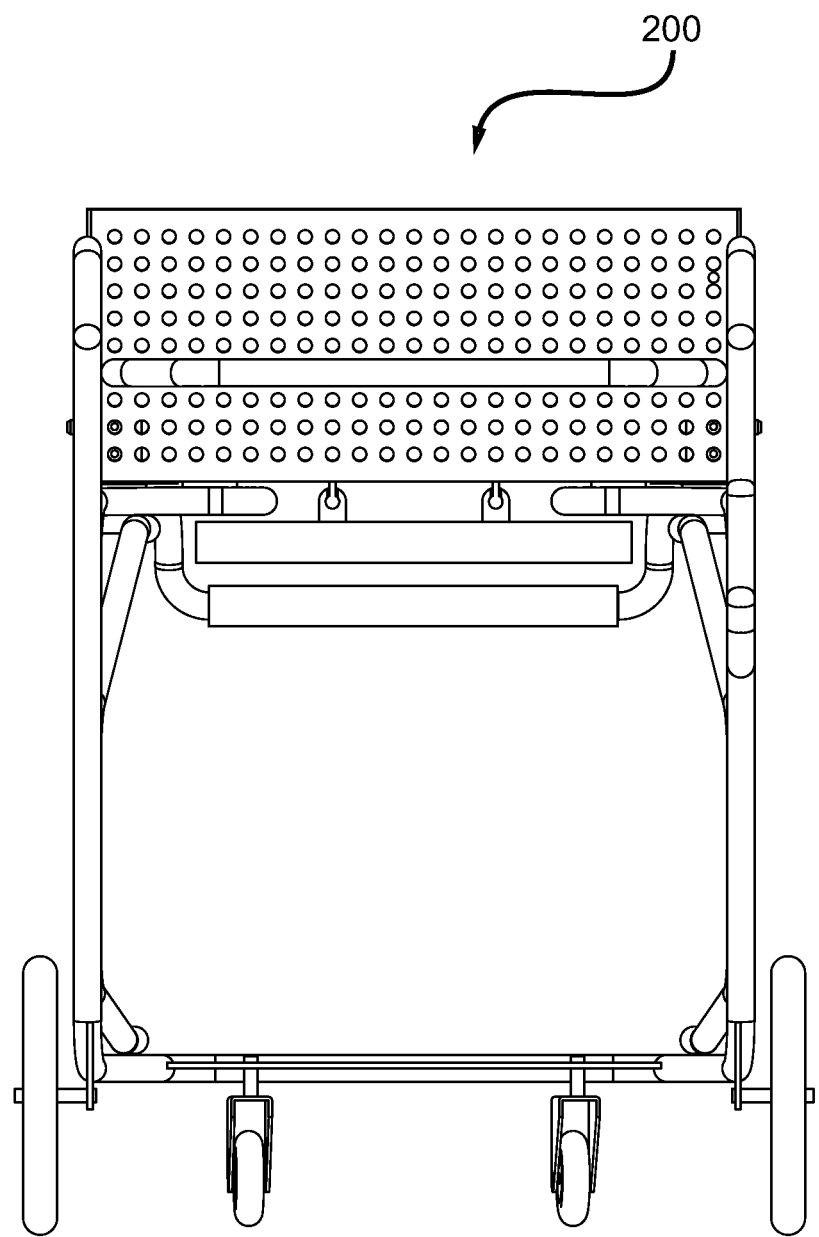
FIG. 4F is a schematic illustration of a rear-view of the cart in an unfolded state, in accordance with some demonstrative embodiments of the present invention.

Reference is now made to FIG. 4A, which is a schematic illustration of a three-dimensional isometric top-view of a cart 200 in an unfolded state, in accordance with some demonstrative embodiments; to FIG. 4B, which is a schematic illustration of a three-dimensional isometric bottom-view of cart 200 in an unfolded state, in accordance with some demonstrative embodiments; to FIG. 4C, which is a schematic illustration of another three-dimensional isometric bottom-view of cart 200 in an unfolded state, in accordance with some demonstrative embodiments; to FIG. 4D, which is a schematic illustration of a side-view of cart 200 in an unfolded state, in accordance with some demonstrative embodiments; to FIG. 4E, which is a schematic illustration of a front-view of cart 200 in an unfolded state, in accordance with some demonstrative embodiments; and to FIG. 4F, which is a schematic illustration of a rear-view of cart 200 in an unfolded state, in accordance with some demonstrative embodiments.

Cart 200 may include components which may be similar to the components of cart 100 described above, for example, a basket 210 and a chassis 250. In accordance with some embodiments, in cart 200, the basket 210 is attachable and detachable from chassis 250 (e.g., using one or more connectors, clips or locks).

In some embodiments, basket 210 and chassis 250 may include one or more front-side connectors 299, as well as one or more rear-side connectors 298, allowing the user of cart 200 to attach basket 210 to chassis 250, and to detach or release or separate basket 210 from chassis 250. Connectors 298 and 299 may be of a common type or of different types. For example, connectors 298 and/or 299 may include a connection mechanism in which a pin, a tooth, or a protrusion is insertable to (and removable from) a corresponding hole, recess, tunnel, cavity, corner holder, or other suitable member; as well as other suitable attachment/detachment mechanisms or locking/unlocking mechanisms.

In some embodiments, basket 210 and/or chassis 250 may include one or more guiding rails 297 or other suitable guiding components, in order to guide and/or to facilitate the insertion of the basket 210 into its corresponding place on top of chassis 250. For example, the guiding rails 297 may guide the basket 210 (e.g., when pushed towards the chassis 250 or along the chassis 250) towards the center of the chassis 250 and/or towards the rear-side connectors 298.

In some embodiments, chassis 250 includes a set of bars and beams, as well as four wheels 251-254; other suitable number of wheels may be used. In some embodiments, rear wheels 251-252 may be larger, or significantly larger (e.g., at least 50 percent larger), than front wheels 253-254; this may improve the stability of cart 200, and/or may allow efficient pulling backwards of cart 200 (e.g., onto a stair, a set of stairs, a ramp, a pavement, or the like). Chassis 250 may further include one or more handles 220, as well as a hook 231 for hanging a bag or purse.

In some embodiments, cart 200 may be implemented using suitable dimensions and/or angles and/or characteristics in order to allow stacking and/or nesting of multiple carts, or of multiple chassis components (e.g., once the basket 210 is detached from the chassis 250). In some embodiments, for example, chassis 250 may be implemented to have a front side which is narrower or smaller then the rear side, in order to facilitate stacking or nesting of multiple units of chassis 250.

The bottom side of basket 210 may include, or may be connected to, one or more tracks or rails 217, on which an upside-down U-shaped bridge element 216 may be connected and may be movable thereon.

A user may utilize cart 200 by placing items inside the basket 210 (e.g., in a store or a supermarket), and may push the cart 200 from the checkout point to the user's vehicle. The user may open the trunk of the vehicle, and may gently push the cart 200 forward until the front side of cart 200 reaches the elevated edge of the vehicular trunk. In some embodiments, chassis 250 may include a reaching bar 232, for example, located at the front of chassis 250 and under the plane of bridge element 216. The reaching bar 232 may block the user of cart 200 too hard into the vehicle, and may indicate to the user that the edge of the chassis 250 reached the edge of the vehicular trunk. In some embodiments, one or more portions of the reaching bar 232 may be covered or coated with a sleeve 233, for example, made of plastic or foam or a non-rigid material, which may absorb force applied by the user who may push the cart 200 forward towards the trunk, and/or may avoid scratching or damaging the vehicle upon contact between the chassis 250 and the vehicle.

In some embodiments, cart 200 may be implemented, for example, such that when bridge element 216 is located slightly higher than the trunk edge of the vehicle, or slightly higher than an average or common height of vehicular trunks. For example, once the reaching bar 232 touches the vehicle or its trunk, the bridge element 216 may be located above the edge of the vehicular trunk. The user may detach the basket 210 from the chassis 250 (or vice versa), using the suitable clips, locks or other connectors of cart 200. Optionally, the user may assist the basket 210 to drop gently a few centimeters, such that bridge element 216 is mounted on the edge of the vehicular trunk. At this point in time, the basket 210 is still held by the chassis 250 (from which basket 210 was already detached), and by the bridge element 216 which lays on the edge of the vehicular trunk.

Then, the user pushes forward the basket 210, applying force in a forward direction, while maintaining the bridge element 216 static and non-moving. In some embodiments, cart 200 may include two separate handles 220 (e.g., in contrast with the single horizontal handle 120 discussed above), in order to facilitate the access of the user to the basket 210 and to facilitate the pushing forward of the basket 210 without obstruction by the handles 220 (e.g., the user optionally standing between the two handles 220). In some embodiments, cart 200 may include a set of handles, for example: two separate side-handles 220; as well as a horizontal handle or a "n" shaped handle or a central handle 296, which may be slightly narrower than the distance between the two separate side-handles 220, and may have chamfered corners or rounded corners or diagonally-cut corners, in order further facilitate the user's access to the basket 210, and/or to facilitate the user-controlled lifting and/or releasing of basket 210, and/or to further facilitate the guiding or centering of the basket 210 relative to the rear side of chassis 250 (e.g., further to the guiding provided by the guiding rails 297). Other suitable handle combinations may be used.

Due to the rails 217, basket 210 glides or slides forward towards and/or into the trunk; during this forward motion of basket 210, the bridge element 216 remains substantially static and non-moving relative to the trunk. Optionally, one or more guiding wheels 218 may be connected to the bottom-front section of basket 210, and may help the user to produce a smooth and scratch-free guiding of the detached basket 210 into the trunk.

In some embodiments, optionally, chassis 250 may be implemented using a suitable set of beams and/or bars, for example, one or more "L" shaped or "n" shaped support bars 234, which may support the detached basket 210 during its gliding into the trunk, and to ensure that the detached basket 210 does not fall to the ground (e.g., through a vertical "cavity" within the chassis 250.

Once the rear end of the rails 217 reaches the bridge element 216, the user may finalize the insertion of the basket 210 into the vehicular trunk. For example, the user may slightly lift the rear side of the basket 210 by a few centimeters (e.g., to release the bridge element 216 from the edge of the trunk); the user may gently push forward the basket 210, thereby guiding the basket 210 (using the guiding wheels 218) a few centimeters forward to traverse the trunk edge; and the user may then gently lower the rear end of the basket 210 until the entire basket 210 rests firmly within the trunk.

Upon placement of the basket 210 within the trunk, the user may handle the chassis 250 which is outside the trunk. In some embodiments, the chassis 250 may be non-collapsible or non-foldable, and the user may return the chassis 250 to the shop, or the user may push the chassis 250 to a designated storage place for chassis units (e.g., optionally nesting multiple chassis units). In other embodiments, chassis 250 may be collapsible or foldable, for example, using one or more joints or pivot brackets (e.g., as described above), and the user may fold or collapse the chassis 250 and may then place the folded chassis 250 inside the trunk or inside the vehicle's passenger cabin.

In some embodiments, removal of the basket 210 from the vehicular trunk may be performed using a set of reversed operations. In some embodiments, for example, the user may lift the rear end of the basket 210, and may pull it back a few centimeters, in order to position the bridge element 216 over the edge of the trunk. The user may then pull back the basket 210 relative to the static bridge element 216, and the basket 210 may move outward using the rails 217. Once the front side of the rails 217 reaches the bridge element 216, the user connects or attaches the basket 210 to the chassis 250 located outside the trunk and underneath the pulled-back basket 210; and optionally, the user slightly lifts the front side of the basket 210 in order to release the bridge element 216 from the trunk edge. Other suitable operations or sets of operations may be used.

In some embodiments, the rear end of basket 210 may include, or may be connected to, a gripping handle to facilitate the lifting or lowering of the rear end of basket 210. In some embodiments, the top portion of chassis 250 may include bars and beams that are substantially horizontal or substantially parallel to the ground; in other embodiments, bars and beams in the top portion of chassis 250 may be diagonal or slightly diagonal relative to the ground (e.g., going down towards the front side of the chassis 250, at an angle of 10 degrees), for example, in order to accommodate insertion of the basket 210 into low-height trunks, and/or in order to allow nesting of multiple chassis units.

In some embodiments, basket 210 (or basket 110 described above) may be implemented to include sub-baskets or other sub-containers, e.g., to allow orderly placement or storage or grouping of various items (e.g., fruits and vegetables, or chilled items, or frozen items), and/or to allow convenient and selective partial removal of one or more sub-containers independently of the removal of other sub-containers.

Figure 5:
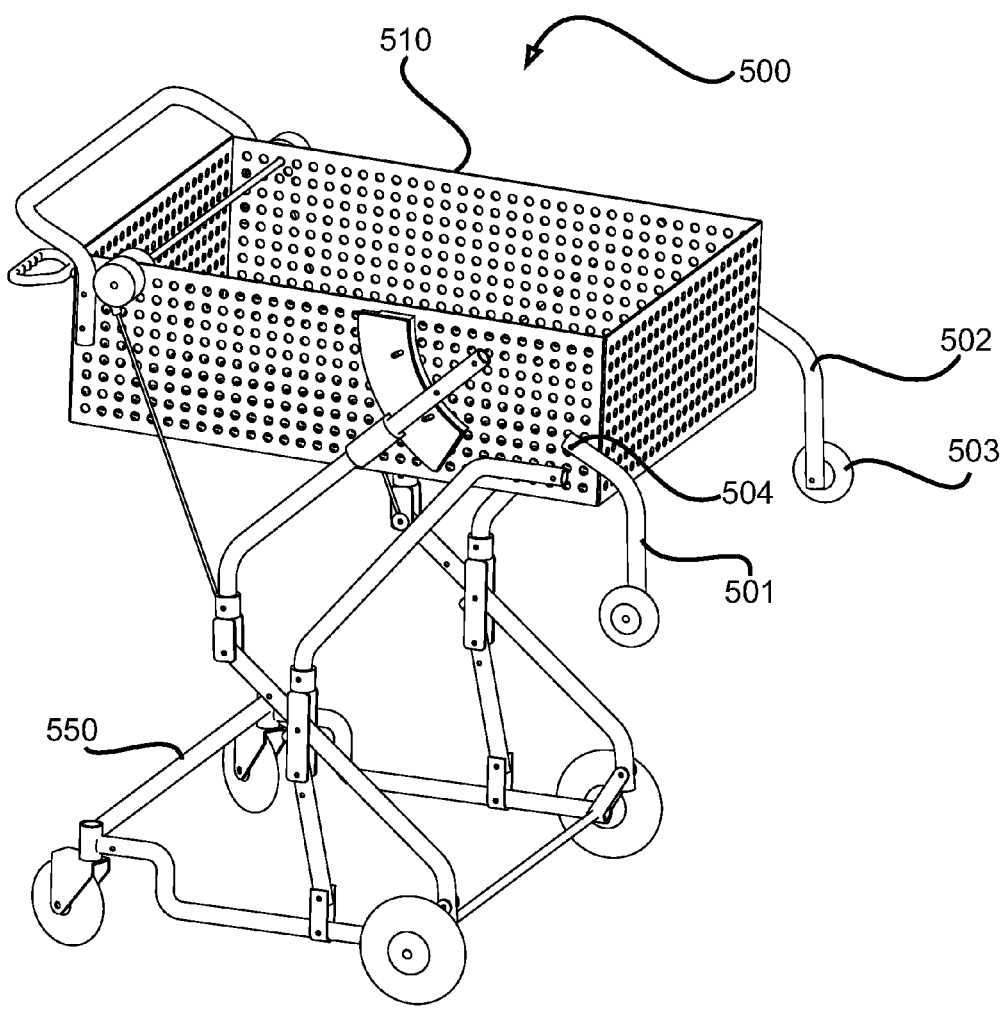
FIG. 5 is a schematic illustration of a three-dimensional isometric top-view of another cart in an unfolded state, in accordance with some demonstrative embodiments of the present invention.

FIG. 5 is a schematic illustration of a three-dimensional isometric top-view of a cart 500 in an unfolded state, in accordance with some demonstrative embodiments. Cart 500 and its components may be generally similar to cart 100 of FIG. 1A and its components.

Cart 500 may include a trunk penetration component 501 (or other trunk invasion component) which may be used in addition to a bridge element or instead of a bridge element. Cart 500 includes a basket 510 and a chassis 550 (e.g., a collapsible or foldable chassis). For demonstrative purposes, cart 500 is shown without a bridge element, and with a trunk penetration component 501 implemented using two curved legs 502 extending from the front side of the basket 510, or from the bottom-front side of basket 510. In other embodiments, a single leg, or three or more legs, may be used; for example, one central leg may be used, or two side-legs may be used as shown, or other suitable combinations may be used. In still other embodiments, the legs need not be curved, and may be substantially linear, may be diagonal (e.g., extending diagonally downward and forward from the basket 510), may be S-shaped, may be L-shaped, or the like. In some embodiments, the one or more legs 502 may terminate with one or more wheels 503, in order to allow smooth and substantially scratch-free and/or friction-free sliding motion of the basket 510 into the trunk of the vehicle (e.g., upon collapsing or folding of the cart 500 and/or of the chassis 550). In some embodiments, the one or more legs 502 may be rotatable or retractable using a hinge 504, in order to allow the folding backwards (e.g., towards the basket 510) of the one or more legs 502 upon complete insertion of the cart 500 into the vehicular trunk; and optionally allowing the one or more legs 502 to enter, partially or entirely, into one or more corresponding cavities or recesses or leg-holders, which may be included in basket 510 or externally to basket 510 in order to contain or hold the one or more legs 502. Other suitable mechanisms may be used for invasion or penetration of vehicular trunks, and/or for allowing smooth insertion of the collapsible cart 500 into the vehicular trunk.

Reference is now made to FIGS. 6A-6J which are schematic illustrations of a cart 600, in accordance with some demonstrative embodiments.

Figure 6B:
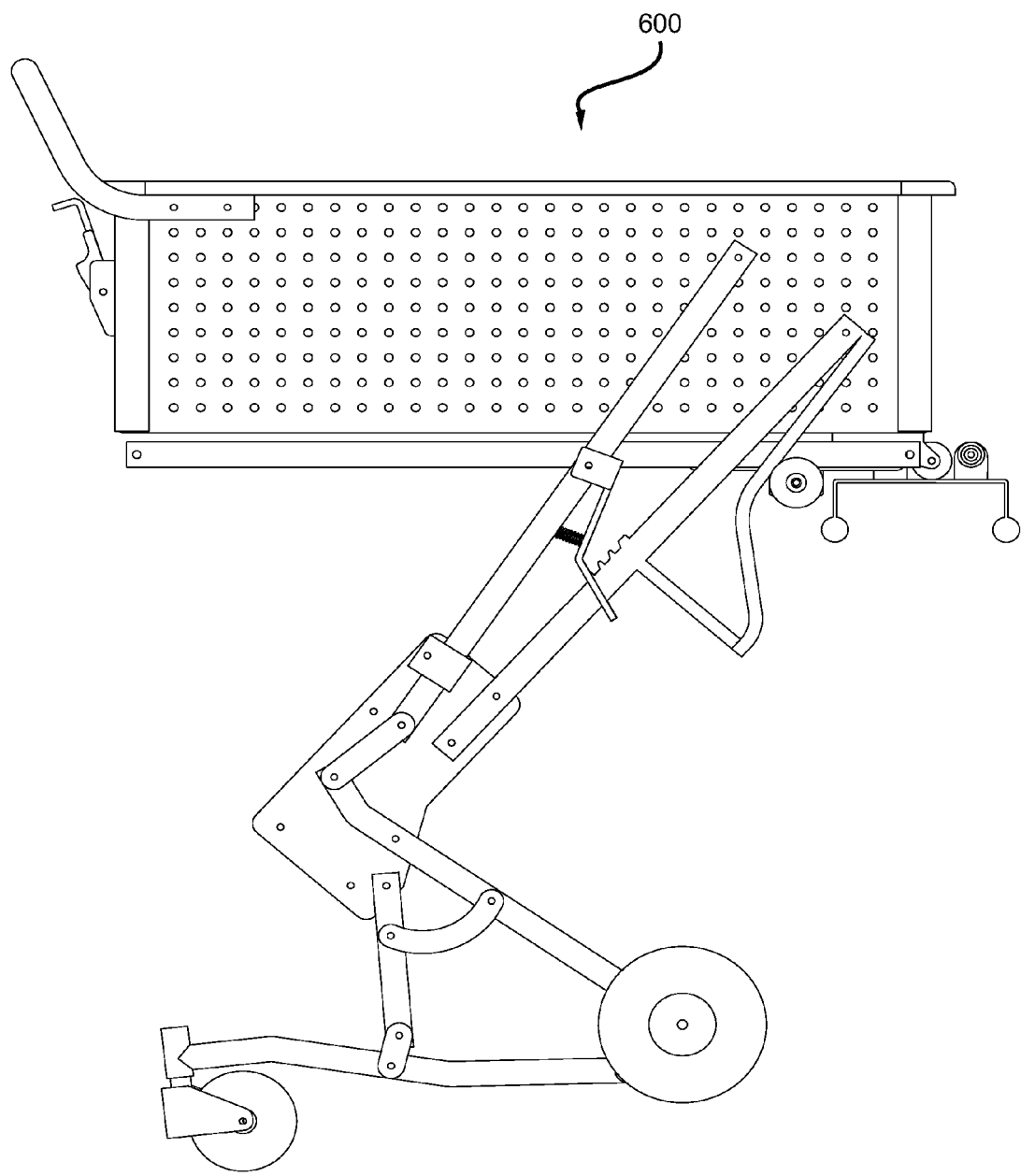
Figure 6C:
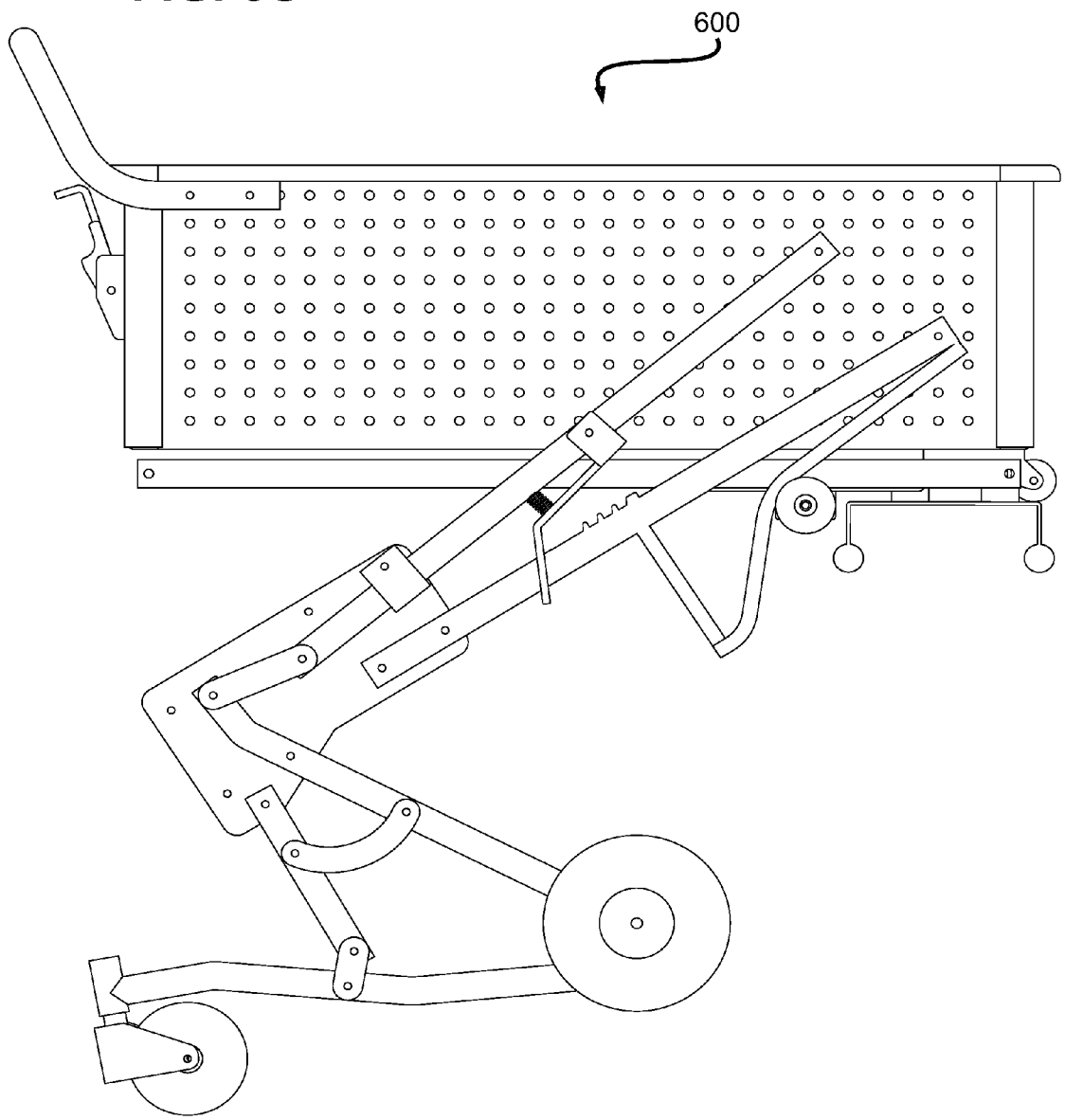
Figure 6D:
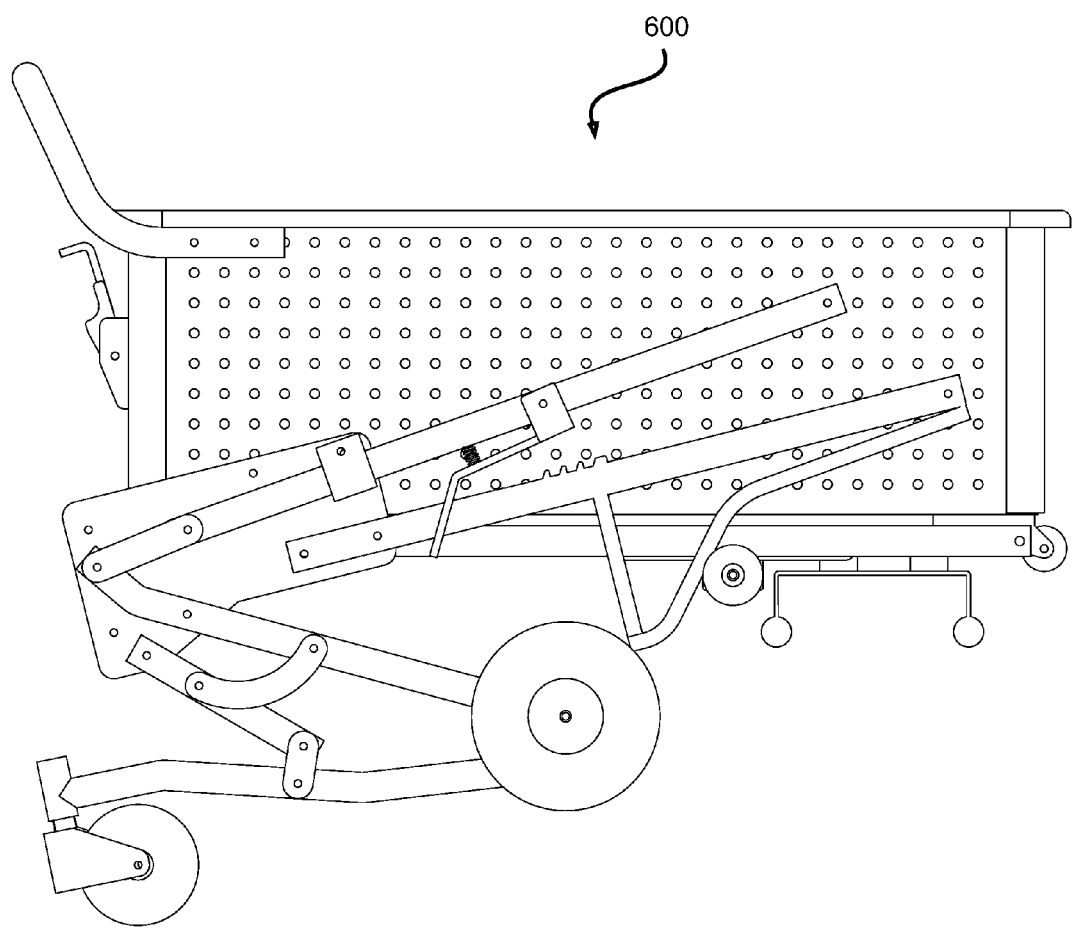
Figure 6E:
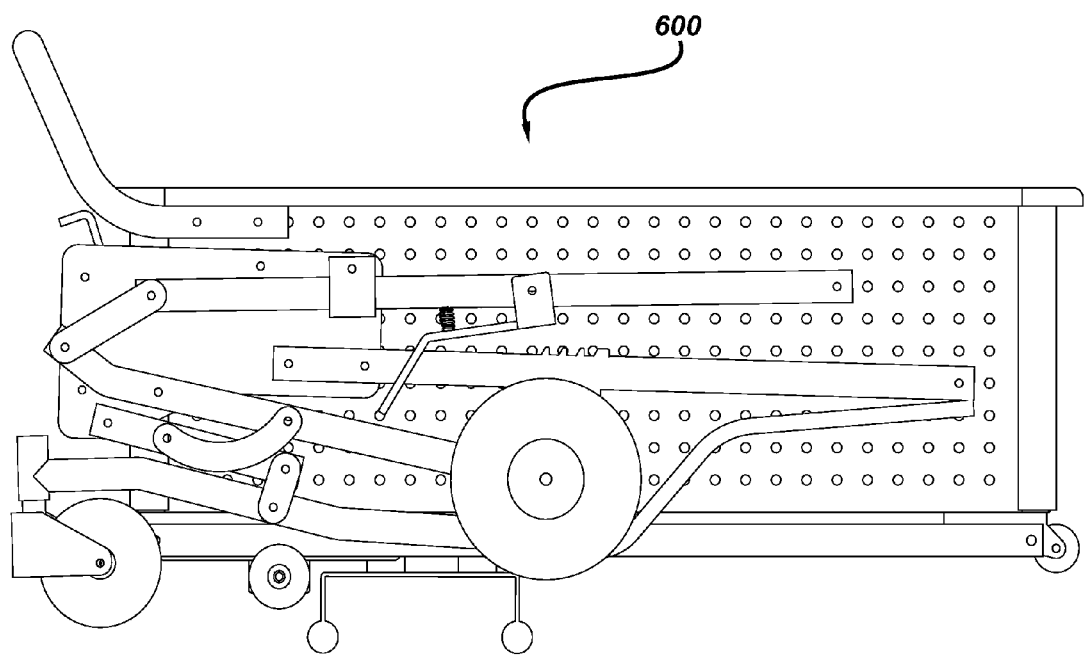

Particularly, FIGS. 6A-6E are schematic side-view illustrations of the cart 600 depicting a series of states of the cart 600 during a folding process of cart 600, ranging from a fully-open or fully-erect state (FIG. 6A) to a fully-collapsed or fully-folded state (FIG. 6E). Five stages of folding are shown in FIGS. 6A-6E for demonstrative purposes; other number of stages may be used; and in some embodiments, the folding or unfolding process may be a substantially continuous process which does not include discrete stages.

Figure 6F:
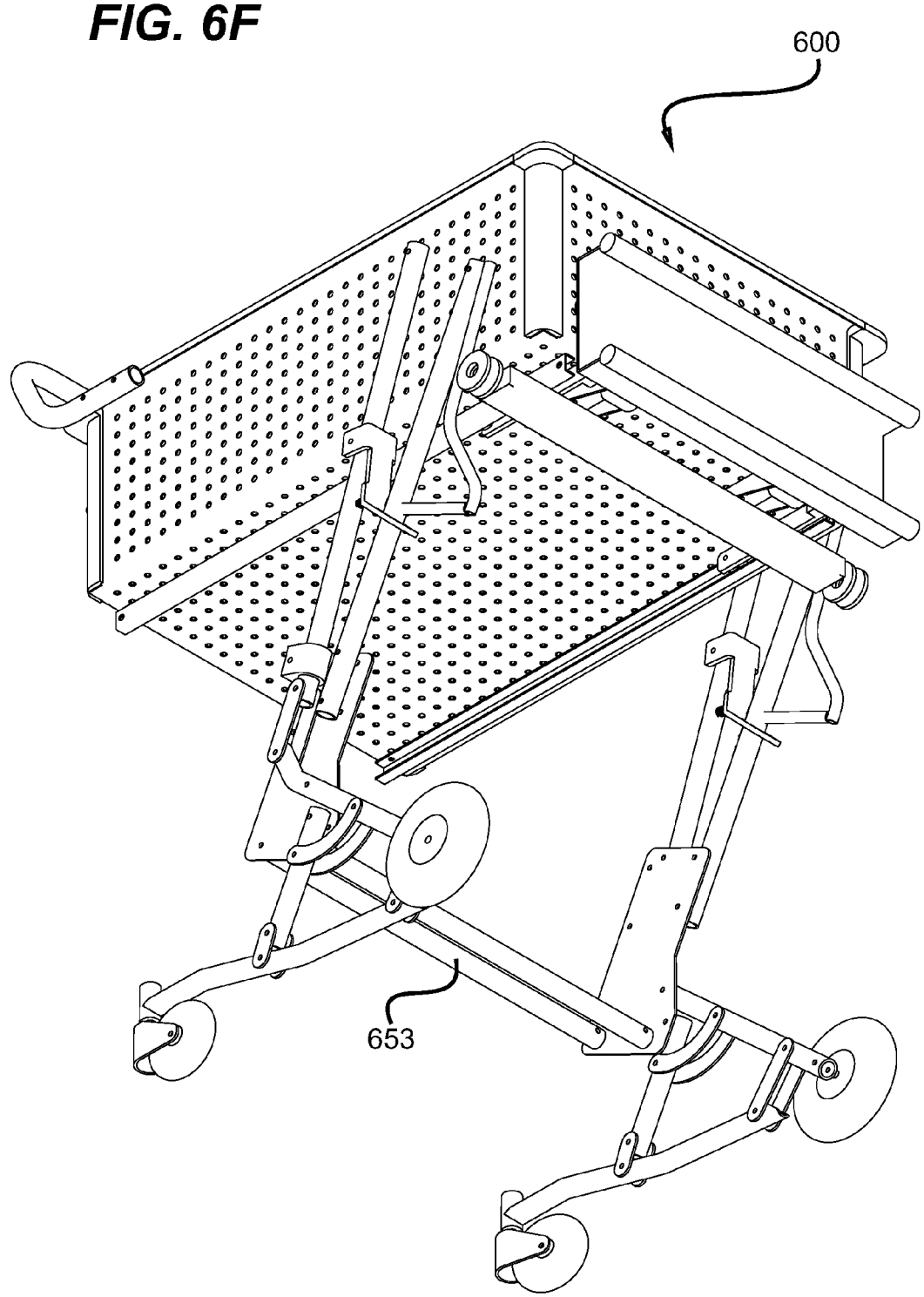
Figure 6G:
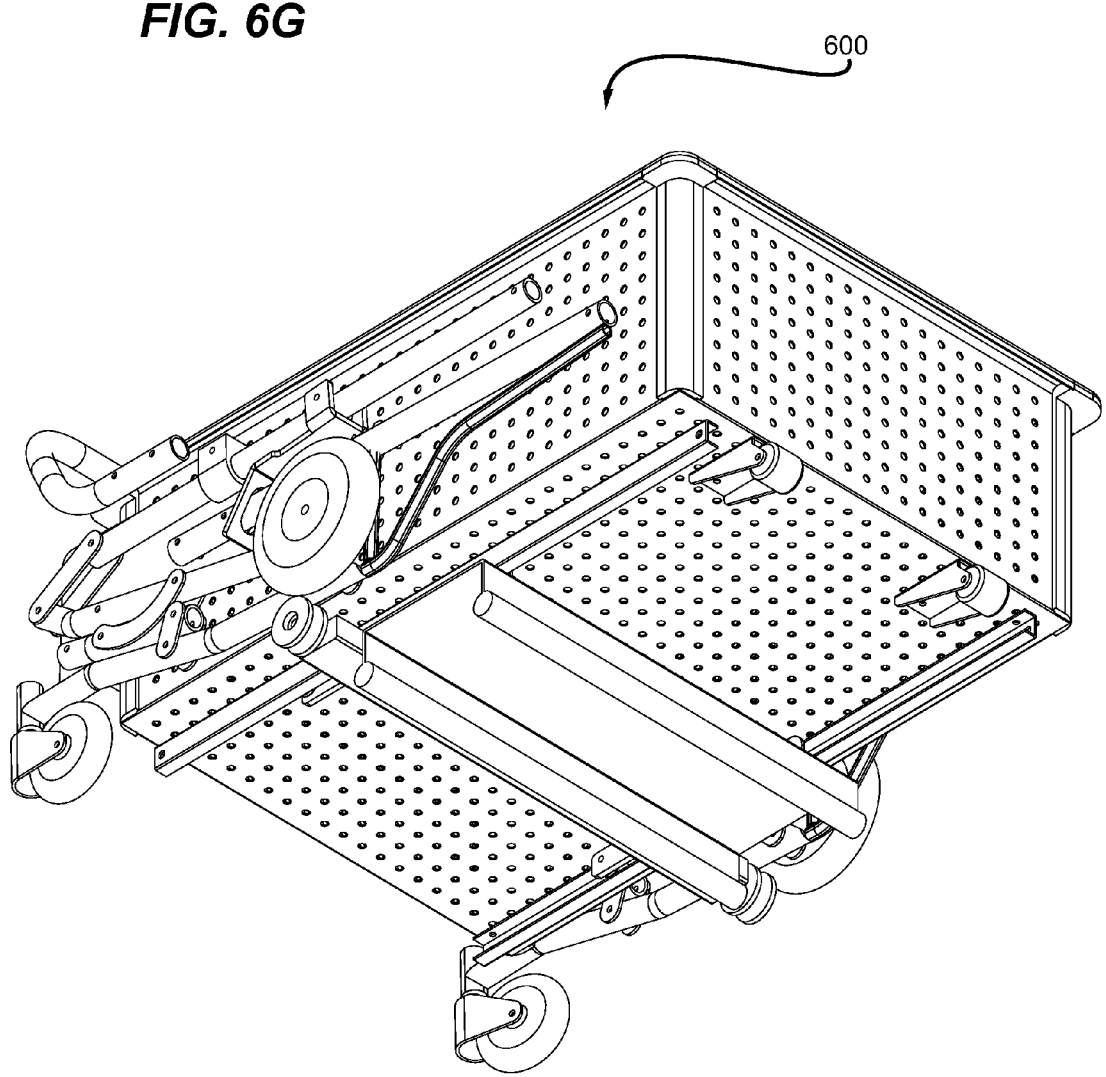
Figure 6H:
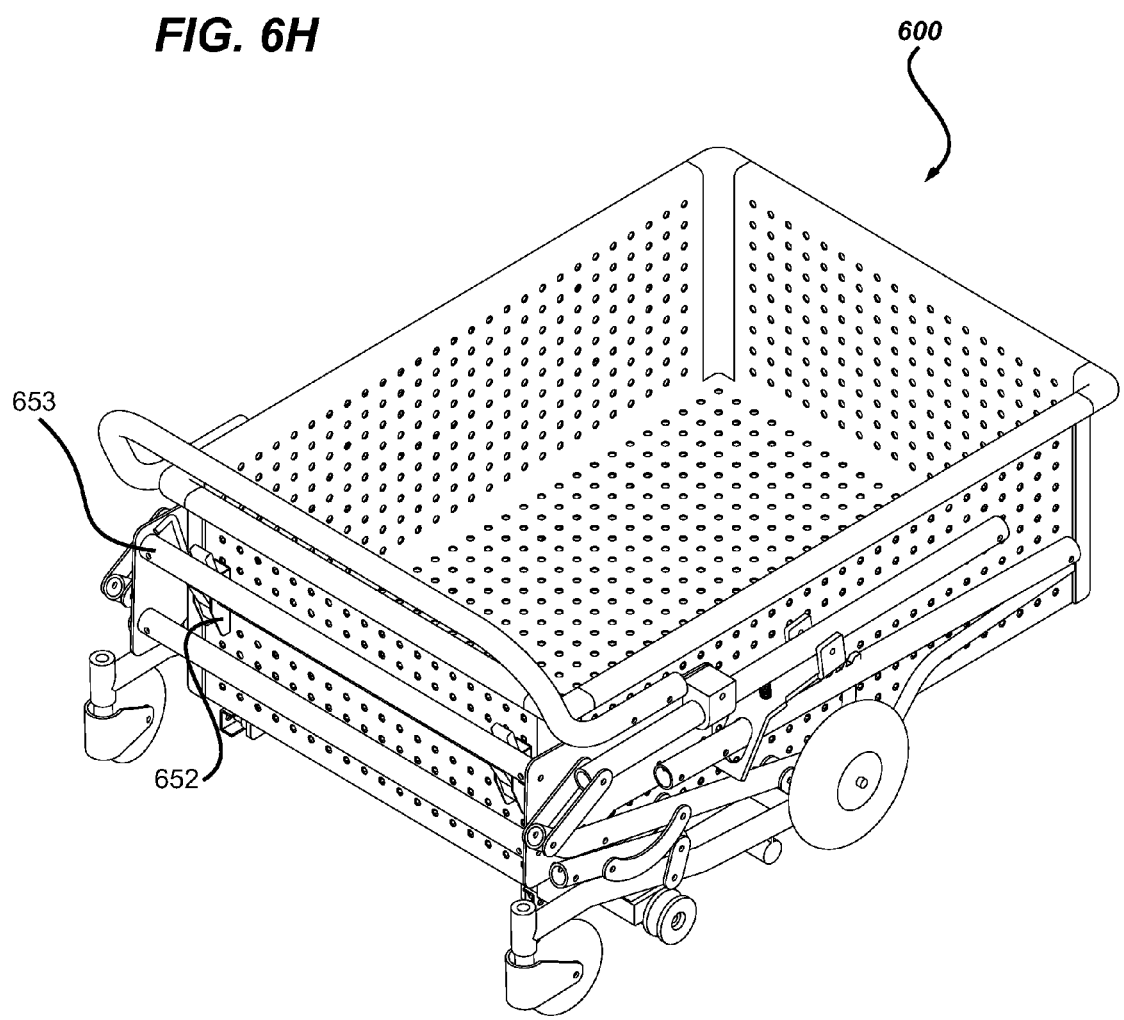
Figure 6I:
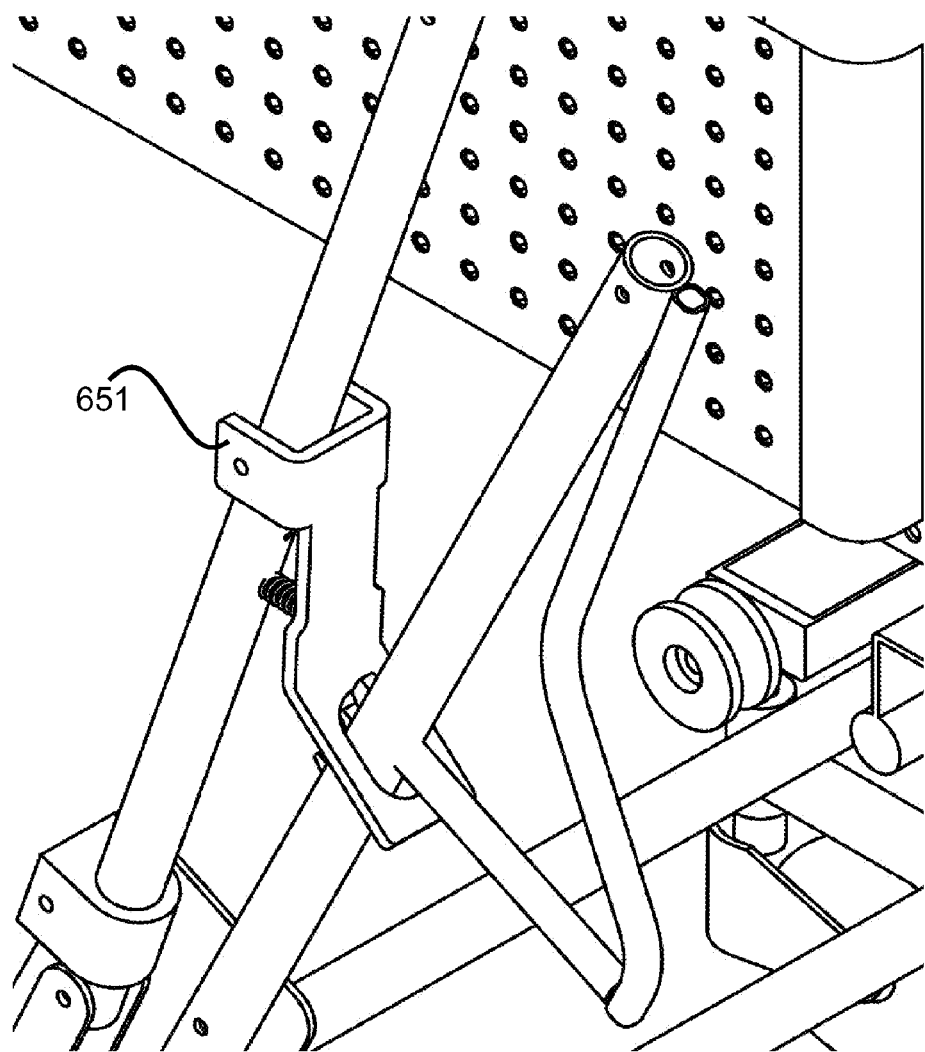
Figure 6J:
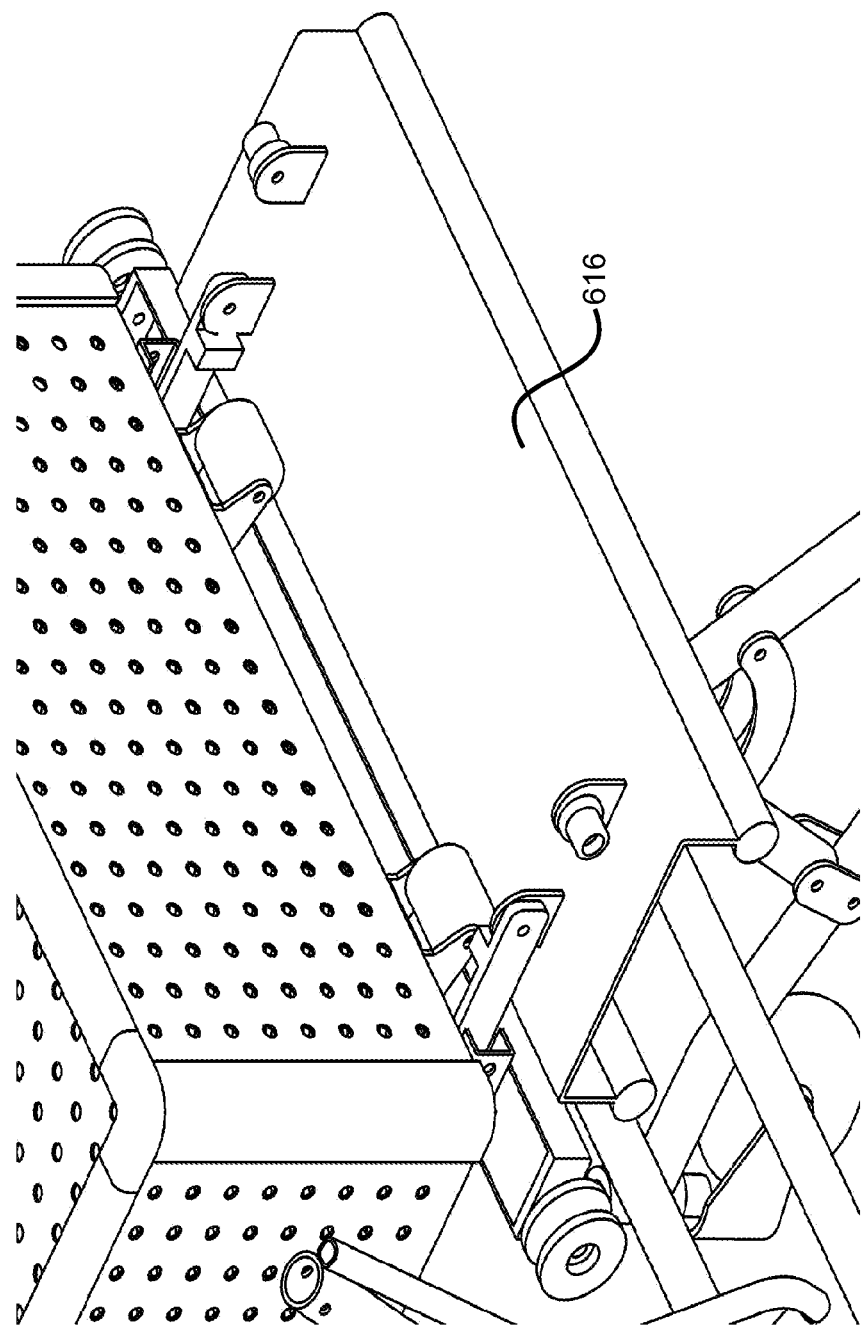

Additionally, FIG. 6F is a schematic illustration of a three-dimensional isometric view of cart 600 in a fully-open state; whereas FIG. 6G is a schematic illustration of a three-dimensional isometric bottom view of cart 600 in a fully-folded state, and FIG. 6H is a schematic illustration of a three-dimensional isometric top view of cart 600 in a fully-folded state. Furthermore, FIGS. 6I and 6J show a closer view of particular regions and/or components of cart 600.

In some embodiments, cart 600 and its components, or some of its components, may be generally similar to cart 100 of FIG. 1A and its components.

Cart 600 may include a mechanism allowing substantially complete folding of legs 670 of cart 600 or of the entire chassis of cart 600, e.g., upon insertion of the cart 600 into a trunk of a vehicle. The mechanism may further allow complete unfolding of the legs 670 or the entire chassis of cart 600 upon pulling-out or removal of the cart 600 from the trunk of the vehicle.

In some embodiments, the folding/unfolding mechanism of cart 600 may allow cart 600 to be completely folded and inserted into a trunk of a vehicle.

In some embodiments, cart 600 includes a bridge element 616, which may move backwards upon insertion of the cart 600 into a vehicular trunk. The movement of the bridge element 616 backwards, towards the user of the cart 600, may be utilized in order to lift and/or fold the legs 670 of cart 600 and/or the chassis of cart 600. In some embodiments, the movement of the bridge element 616, which is harnessed into lifting or folding the legs 670 or the chassis, may be restricted, for example, based on the position of the front wheel(s) of the cart 600. For example, in some embodiments, cart 600 may be constructed such that the front wheel(s) of cart 600 become completely folded or lifted prior to reaching the edge of the vehicular trunk, to avoid a collision of the front wheel(s) with the rear of the vehicle.

In some embodiments, the bridge element 616 may be constructed in order to maintain a relatively low volume, for example, by using bridge rails that have a relatively low profile or low height, allowing the bridge element 616 to smoothly move back and forth within a "U"-shaped profile provided by such bridge rails.

In some embodiments, once the bridge element 616 reaches the front end of the rails, the front portion of the upside-down "U"-shaped bridge element 616 may be raised upward in order to accommodate the slightly-higher edge of the vehicular trunk edge or the vehicular bumper. For example, in some embodiments, the bridge element 616 may be able to change its angular position, and the user may operate the cart 600 such that initially the bridge element 616 is substantially horizontal or parallel to the ground, whereas towards the end of the cart-folding process the bridge element 616 is slanted or is positioned diagonally or at an angle relative to the ground. In some embodiments, for example, the bridge element 616 may include, or may be located in proximity to, one or more wheels: for example, a front bridge-wheel 661 may be located at the front of the bridge element 616 and/or on top of the front portion of the bridge element 616, and may allow the bridge element 616 to change its angle upon reaching the front end of the bridge rails, in order to adapt to the height of the vehicular bumper or trunk edge. The front bridge-wheel 661 may further provide balance to the bridge elements 616 as the bridge element 616 moves backwards. Additionally or alternatively, a back bridge-wheel 662 may be located at the rear side of the bridge element 616, for example, between the bridge element 616 and the top portion of the legs 670, and allows (together with a folding-process regulator 654 folding of the legs 670 upon backward movement of the bridge element 616.

In some embodiments, cart 600 may include a folding mechanism which operates by utilizing direct force or indirect force which is applied by the backward-moving bridge element 616 onto the legs 670 or chassis of the cart 600, and/or by utilizing other force(s) which may be applied in other suitable direction(s) (e.g., downward, upward, horizontally, vertically, diagonally, in response to a pull, in response to a push, or the like). Optionally, the legs 670 or chassis of the cart 600 may include, or may be adjacent to, the folding-process regulator 654, for example, a metal member or a metal profile able to control or regulate the rate or the speed of folding.

In some embodiments, cart 600 may include one or more locking mechanisms in order to ensure that a folded cart remains folded and does not unfold by itself, and/or in order to ensure that an unfolded cart remains unfolded and does not collapse or fold by itself. In some embodiments, for example, an open-state locking mechanism 651 and/or a closed-state locking mechanism 652 may be included in cart 600. For example, in some embodiments, the closed-state locking mechanism 652 may include a connecting pole 653 which may be located at the lower portion of the cart 600 and which connects the right-side legs 670 of the cart 600 with the left-side legs 670 of the cart 600. The connecting pole 653 may provide stability to the cart 600; and may be held or trapped by the closed-state locking mechanism 652 in order to keep the legs 670 of the cart 600 in a folded position, for example, until the holding or trapping is manually released by the user and/or until the user voluntarily unfolds the legs 670 or chassis of cart 600.

Reference is made to FIGS. 7A-7D, which are schematic illustrations of a cart 700 in accordance with some demonstrative embodiments of the present invention. Cart 700 may include one or more components which may be generally to components discussed above with reference to the previous drawings. For example, cart 700 may include a basket 701, a chassis 702 (which may be fully or partially foldable or collapsible), legs 710 (which may be fully or partially foldable or collapsible), wheels 703, a bridge element 704 (or other suitable vehicular trunk penetration component or element) able to move underneath or via one or more rails 705, and one or more front-side basket-gliding wheel(s) 709 (e.g., to assist the user in smoothly gliding the basket 701 into or within a vehicular trunk).

Optionally, cart 700 may include a legs-retracting mechanism 708 for moving or retracting a top-side or a top-part or other region of legs 710, from being at a front side on a side-panel of cart 700, towards being at a rear side or back side on a side-panel of cart 700, and/or vice versa in the opposite direction. For example, legs-retracting mechanism may include one or more channels or tunnels or guiding tubes or rails 707, on which (or, in which) a top portion of legs 710 may move or slide or glide, and/or, on which the legs-retracting mechanism 708 may move or slide or glide. This may allow the user to push cart 700 into a vehicular trunk, such that legs 710 may fold or collapse, partially or entirely, together with legs 710 (or a top portion thereof, or legs 710 in their entirety) moving backward as to avoid blocking of the penetration of cart 700 into the vehicular trunk, or, to allow easier or improved entrance of cart 700 into the vehicular trunk.

Figure 7C:
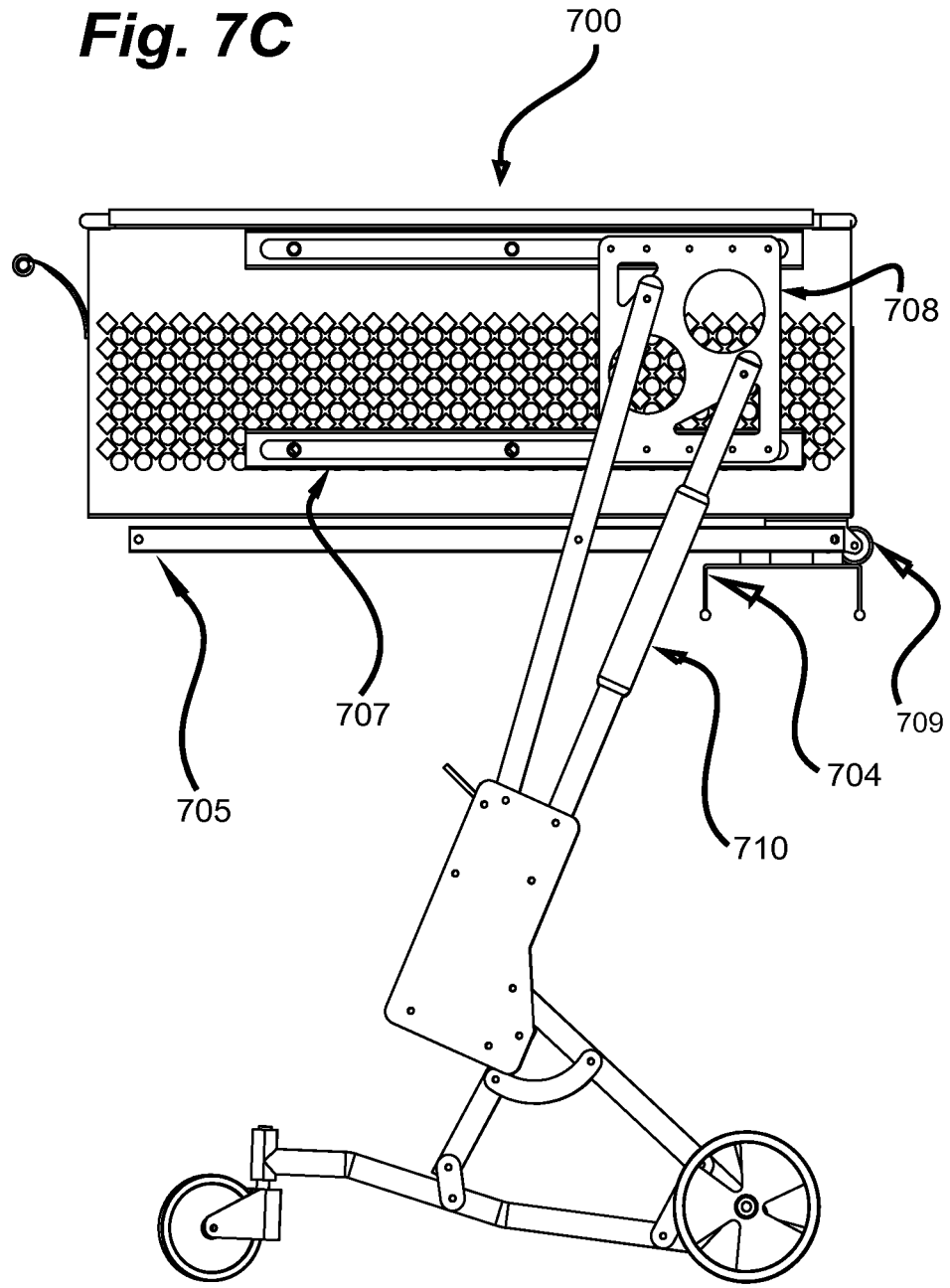

Particularly, FIGS. 7A and 7B show an isometric view of cart 700 such that bridge element 704 is shown in a gliding position; FIG. 7C shows a right-side view of cart 700 such that bridge element 704 is shown in a gliding position; and FIG. 7D shows an isometric view of cart 700 such that bridge element 704 is shown in a ready position, e.g., diagonally slanted and ready to engage with a tip or edge or panel or protrusion of a vehicular trunk. In accordance with the present invention, bridge element 704 may be able to move along more than one vector or dimension; for example, bridge element 704 may be able to glide or slide generally horizontally or generally parallel to the ground or floor (e.g., bridge element being connected or suspended underneath rails 705); and bridge element 704 may be able to glide or slide diagonally or upwards along a curved or arched track, prior to and/or during insertion of cart 700 into a vehicular trunk; and optionally, bridge element 704 may be able to reach a substantially vertical position, being substantially perpendicular or generally perpendicular to the ground or floor, during an insertion process of cart 700 (or of basket 701) into the vehicular trunk.

Figure 8C:
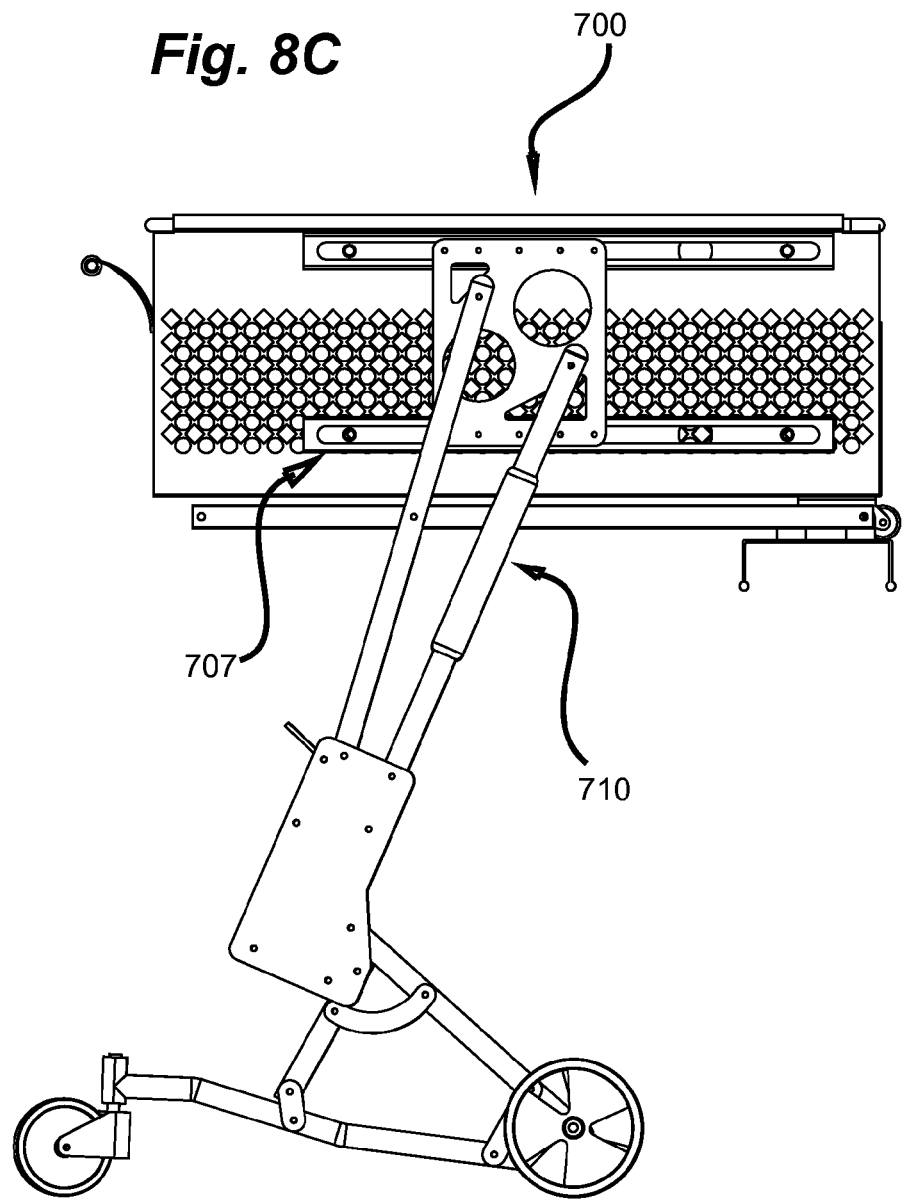
Figure 8D:
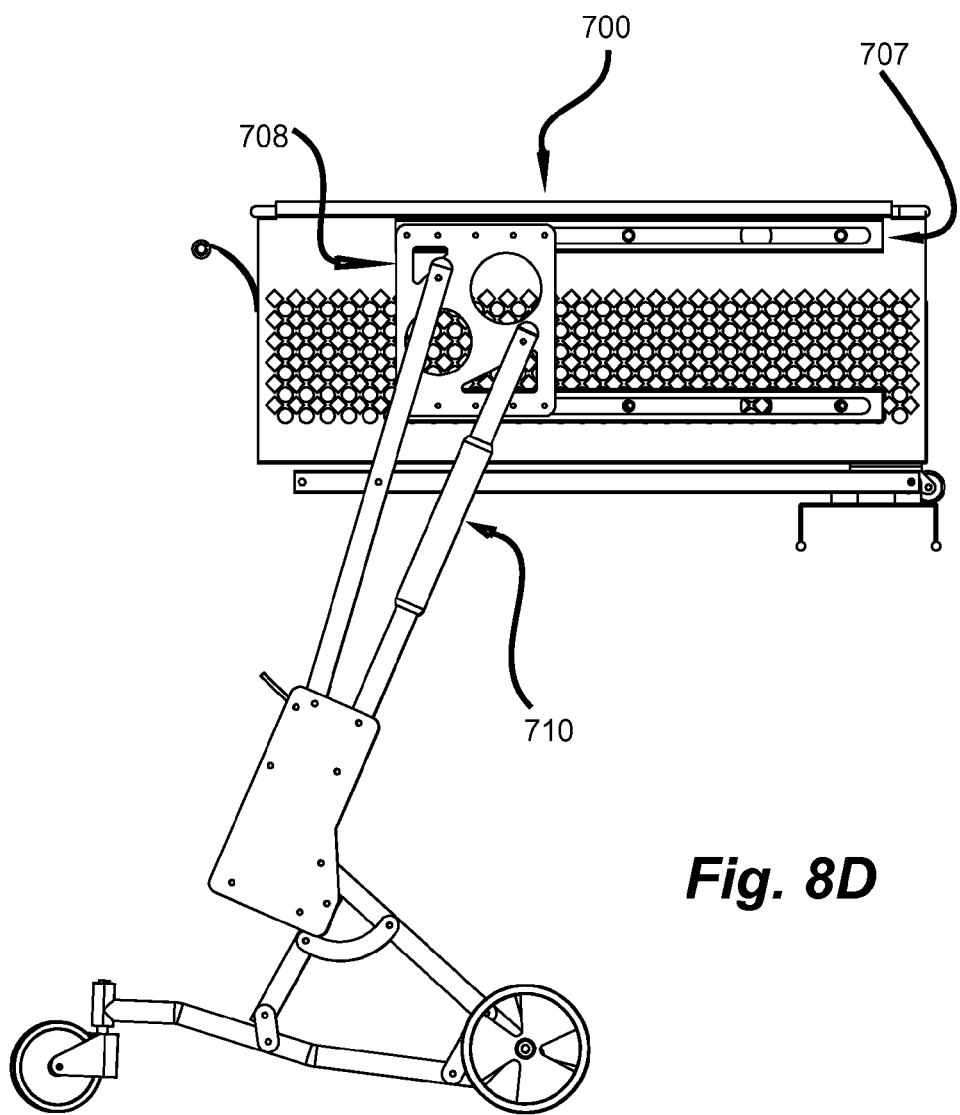

Reference is made to FIGS. 8A-8D, which are schematic illustrations of four states of cart 700 in accordance with some demonstrative embodiments of the present invention. FIGS. 8A-8D demonstrate retraction of legs 710, and/or retraction of mechanism 708, along one or more rails 707. Particularly, FIG. 8A shows a first (non-retracted) state, in which the top portion of legs 710 is located at a front side of a side panel of basket 701; FIG. 8B shows a second (partially retracted) state, in which the top portion of legs 710 is located approximately one third of the full length of rails 707 away from the front side of a side panel of basket 701; FIG. 8C shows a third (partially retracted) state, in which the top portion of legs 710 is located approximately two thirds of the full length of rails 707 away from the front side of a side panel of basket 701; and FIG. 8D shows a fourth (fully retracted) state, in which the top portion of legs 710 is located at a rear side of a side panel of basket 701. Although four demonstrative states are shown for demonstrative purposes, the gliding or movement of legs 710 within or on rails 707 may be continuous or non-discrete, or may be discrete while having other number of states or phases.

In some embodiments, optionally, cart 700 may have a structure which may generally resemble a "Z" shape or a zigzag shape. For example, basket 701 may be generally rectangular or box-shaped, and may be positioned generally horizontally or generally parallel to the ground or floor. Chassis 702 (or, at least, beams that connect wheels 703) may be generally horizontally or generally parallel to the ground or floor. Between basket 701 and chassis 702, there may be located diagonal or slanted legs 710 (or suitable beams or poles), which may be partially or entirely foldable or collapsible. Legs 710 may run diagonally, or may remain diagonal or slanted relative to basket 701 and/or to the ground or floor, during one or more stages (or during all stages) of the folding or unfolding of legs 710, and/or during one or more stages (or during all stages) of retracting or sliding of the top portion of legs 710 (and/or of mechanism 708) along basket 701. In some embodiments, optionally, slanted or diagonal legs 710 may not extend backward all the way to be positioned above the two rear wheels 703 of cart 700; but rather, optionally, slanted legs 710 may extend up to a point located between the rear wheels and the front wheels, e.g., located approximately at the center or the middle of the distance between the front and back wheels, or located approximately one third (or one quarter, or one fifth) of such distance away from the rear wheels and towards the front wheels. Such structure of cart 700 may optionally contribute to balance and/or stability and/or rigidity of cart 700, and/or to the ability to efficiently fold and unfold cart 700.

In some embodiments, optionally, legs 710 may include two diagonal legs on each side (right side and left side) of basket 701; such that a first leg extends to end at a top portion of mechanism 708 (and/or near a top area of basket 701), whereas a second leg extends to end a center or lower portion of mechanism 708 (and/or near a center or top area of basket 701). Such structure of cart 700 may optionally contribute to balance and/or stability and/or rigidity of cart 700, and/or to the ability to efficiently fold and unfold cart 700.

In some embodiments, basket 701 may be connected to wheels 703 and/or to chassis 702 only through legs 710 and mechanism 708, and not through four generally-vertical legs or beams which may be used in a conventional cart. In some embodiments, basket 701 may be connected to mechanism 708, which in turn may be connected to diagonal legs 710, which in turn may extend diagonally from a top-front portion of cart 700 to a rear-bottom portion of cart 700 (or, to a rear-central portion of cart 700). In some embodiments, optionally, each one of wheels 703 may be connected only to a generally-horizontal chassis 702, and/or to a diagonal or slanted leg (which may be foldable or collapsible, entirely or partially); and each one of wheels 703 may not be connected to any other beam or pole, and particularly not to a generally-vertical elongated beam or leg that extends vertically and upwardly towards basket 701.

Figure 9A:
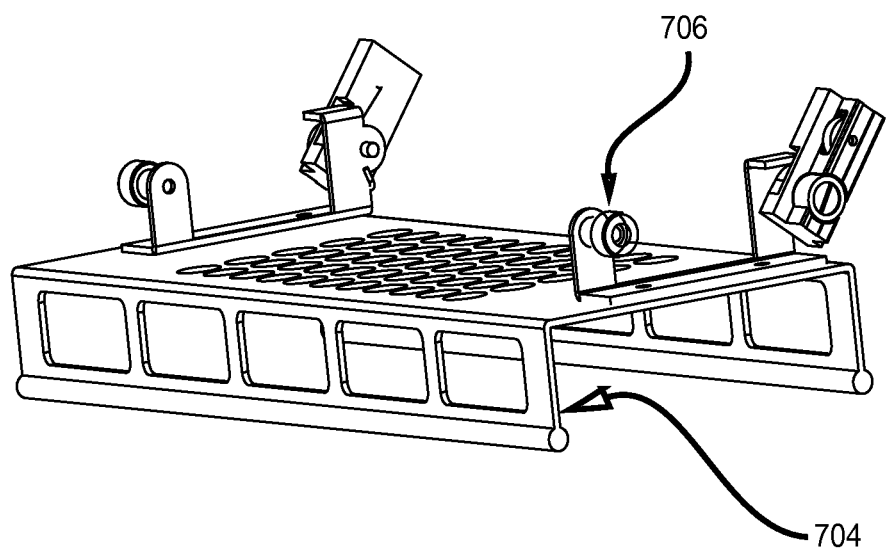
FIG. 9A is a schematic illustration of bridge element, in accordance with some demonstrative embodiments of the present invention.
Figure 9B:
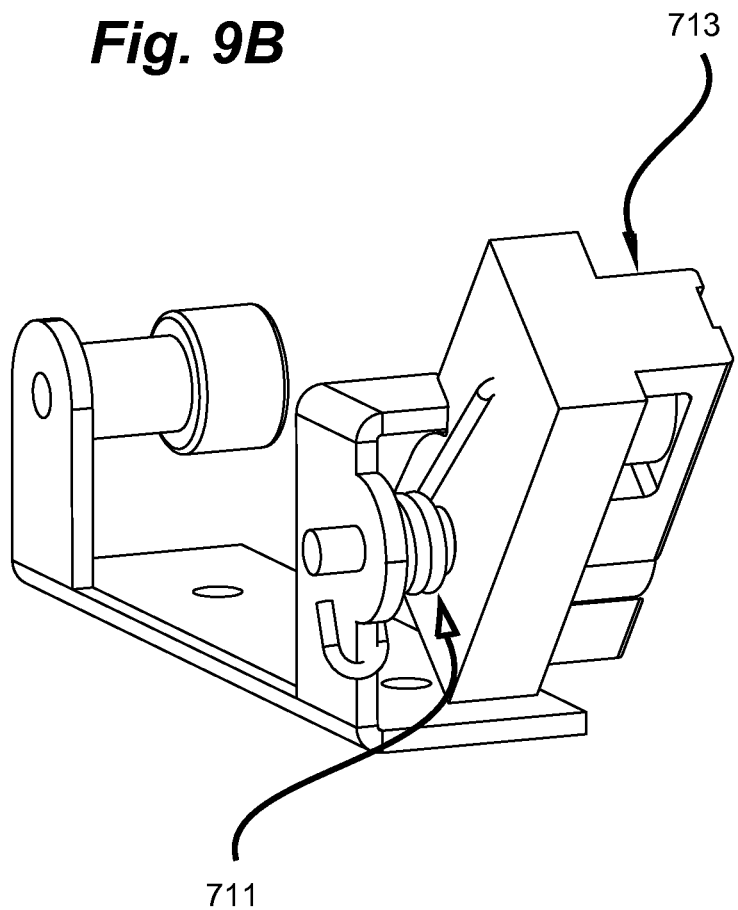
FIG. 9B is a schematic illustration of a bridge rail interface, in accordance with some demonstrative embodiments of the present invention.

Reference is made to FIG. 9A, which is a schematic illustration of bridge element 704, as well as to FIG. 9B, which is a schematic illustration of a bridge rail interface 713, in accordance with some demonstrative embodiments of the present invention. Bridge element 704 may include, or may be connected to, front wheel(s) 706 and optionally a spring mechanism 711 (or coil, or other elastic mechanism or element) which may assist in pushing bridge element 704 upward and/or downward, or which may assist in gliding or sliding or turning or slanting the bridge element 704 for the purpose of engaging with the vehicular trunk.

Figure 9C:
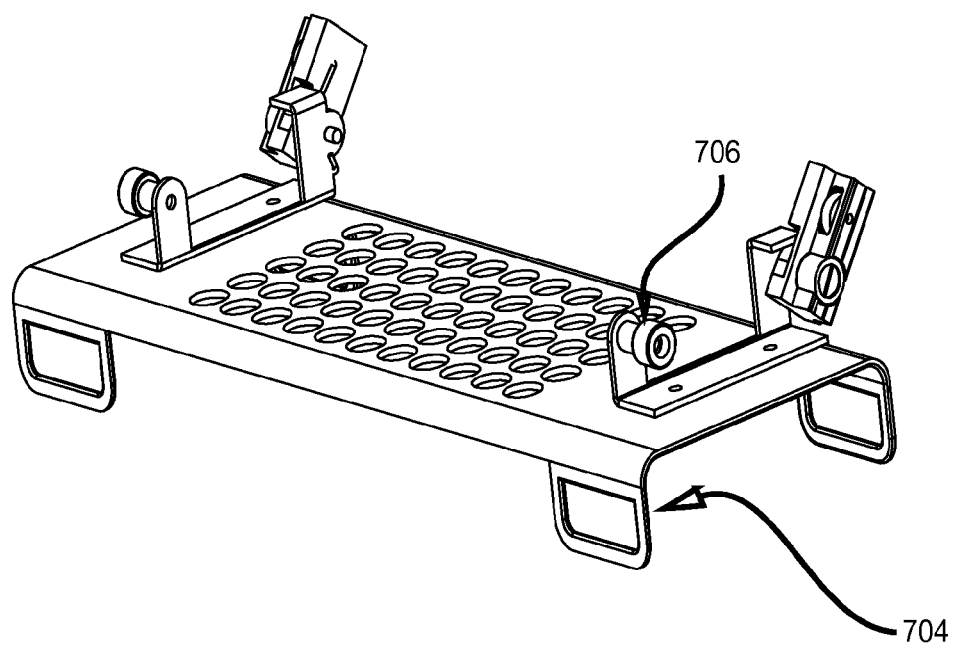
FIGS. 9C and 9D are schematic illustrations of other implementations of the bridge element, in accordance with some demonstrative embodiments of the present invention.
Figure 9D:
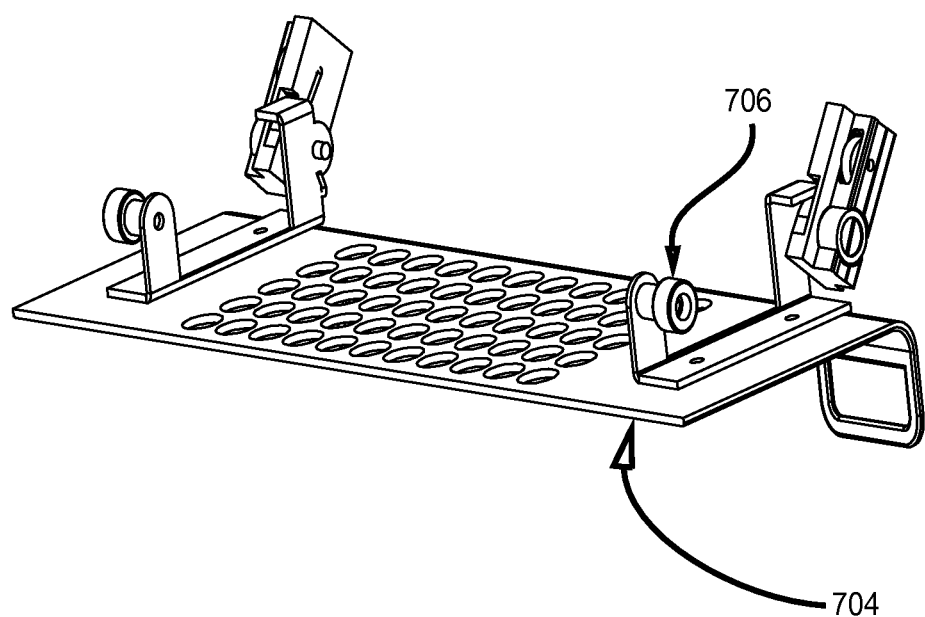

Reference is made to FIGS. 9C and 9D, which is a schematic illustration of other implementations of bridge element 704, in accordance with some demonstrative embodiments of the present invention. Particularly, bridge element 704 as depicted in FIG. 9C may include four smaller side panels which descend vertically at four corners of bridge element 704, instead of having two full-length side panels which are depicted in bridge element 704 of FIG. 9A. Furthermore, bridge element 704 as depicted in FIG. 9D may include only two smaller side panels (or one full-length side panel) which descend vertically at two corners of bridge element 704, instead of having two full-length side panels which are depicted in bridge element 704 of FIG. 9A. In some embodiments, optionally, bridge element 704 may be modular, and may include a mechanism or may be used in conjunction with a user-implemented technique which may convert bridge element 704 among two or more states or structures, e.g., among a full U-shaped bridge element 704 (shown in FIG. 9A), and/or a table-shaped or bed-shaped or stool-shaped bridge element 704 (shown in FIG. 9C, having a large horizontal panel and four small vertical panels in its four corners), and/or an L-shaped bridge element 704 (shown in FIG. 9D, having two small vertical panels in two corners along the bridge element longest axis). For example, bridge element 704 may be modular or switchable among such configurations, by using one or more pivoting panels or legs, which may rotate through or about an axis or pivot, or by allowing insertion and/or removal of a side-panel of bridge element 704 through one or more connectors or channels or panel-holders or other attachment-detachment mechanisms.

Reference is made to FIGS. 10A and 10B, which are schematic illustrations of a right-side view and an isometric view, respectively, of another implementation of cart 700, in accordance with some demonstrative embodiments of the present invention. In the demonstrative implementation shown, rails 706 may be generally horizontal or generally straight, but may end, in their front-side ending, with a curved portion 712 or arched portion or other non-horizontal portion which may gradually extend from being horizontal to being slanted or vertical. The curved portion 712 of rails 706 may allow bridge element 704 to slide or glide diagonally upward, on the curve or arch of the curved portion 712, before or during or after the insertion process of cart 700 (or of basket 701) into a vehicular trunk.

Although portions of the discussion herein may relate, for demonstrative purposes, to rails (e.g., rails 705 or 707) or other channels which may be generally parallel to the longest axis of the basket (or of the cart, or of the chassis), the present invention may include other types of rails or channels, which, for example, may run perpendicular to (or slanted relative to) the longest axis of the basket (or the cart, or the chassis). In some embodiments, for example, basket 701 may be able to enter a vehicular trunk such that the smallest panel of basket 701 (e.g., the front-side vertical panel of basket 701) firstly enters the vehicular trunk (prior to entrance of other panels or walls of basket 701), in a front-loading or front-penetrating orientation; whereas, in other embodiments, for example, a side-loading or side-penetrating orientation may be used, and basket 701 may be able to enter a vehicular trunk such that a side panel of basket 701 (e.g., the right-side vertical panel of basket 701, or the left-side vertical panel of basket 701) firstly enters the vehicular trunk (prior to entrance of other panels or walls of basket 701).

The present invention may include a restraining device or mechanism, or a motion-preventing or motion-limiting device or mechanism, which may be able to restrain or limit or eliminate motion or movement or shifting or spinning, of the basket and/or the cart (or, of the cart in a folded state or in a collapsed state), once the basket and/or cart are stored within a vehicular trunk (e.g., when the entire cart, in a collapsible state, is collapsed and stored within the trunk, and such that no parts of the cart are stored outside of the trunk).

The restraining device may be located in the part of the cart that is the close to the trunk door or trunk lid; such as, at the rear-side panel of the basket, or near the rear-side panel of the basket, or near the handle(s) that are connected at the back side of the cart and allow a user to push the cart. The restraining device may be implemented as a thin strip or strap, with thick edge or rod on one side and with a connection to the cart (or the basket) on the other side. The connection to the cart can be permanent or fixed, connection, or may be a temporary connection which a user may attach and detach, selectively.

Once the folded cart is entirely inside the vehicular trunk, the restraining device may be placed on the edge of the trunk, facing towards the external side of the vehicle, or facing outwardly from the vehicular trunk; such that a portion of the strip or strap is located on or over the edge of the vehicular trunk, on top of the trunk edge, exactly on the horizontal panel onto which the lid of the trunk is intended to close down. When closing the trunk lid or door, the trunk lid or door would pinch or grip or hold the strap(s) of the restrain device, such that the strap(s) of the restrained device would be "trapped" or caught or gripped between the trunk lid and the trunk edge; thereby locking the thick element or the rod outside of the trunk, and preventing the stored cart (or basket) from moving or shifting when the car moves or stops or accelerates or decelerates or turns.

The restraining device may be formed of one or more strips or straps of fabric, or other suitable material(s), with one side connected to the cart; whereas the other side (the thick side or the rod) may be formed of hard rubber, or metal, or wood, or plastic, or other rigid material(s).

The restraining mechanism may thus allow efficient and simple use; a car-friendly restraining solution that does not require any modification to the car or the trunk, and does not require any installation of any part (fixedly or temporarily) to the car, and does not require any locking element to be fixedly attached to the car; and does not require modification of the shopping cart and/or the vehicle, or any fixed installation process.

Figure 11D:
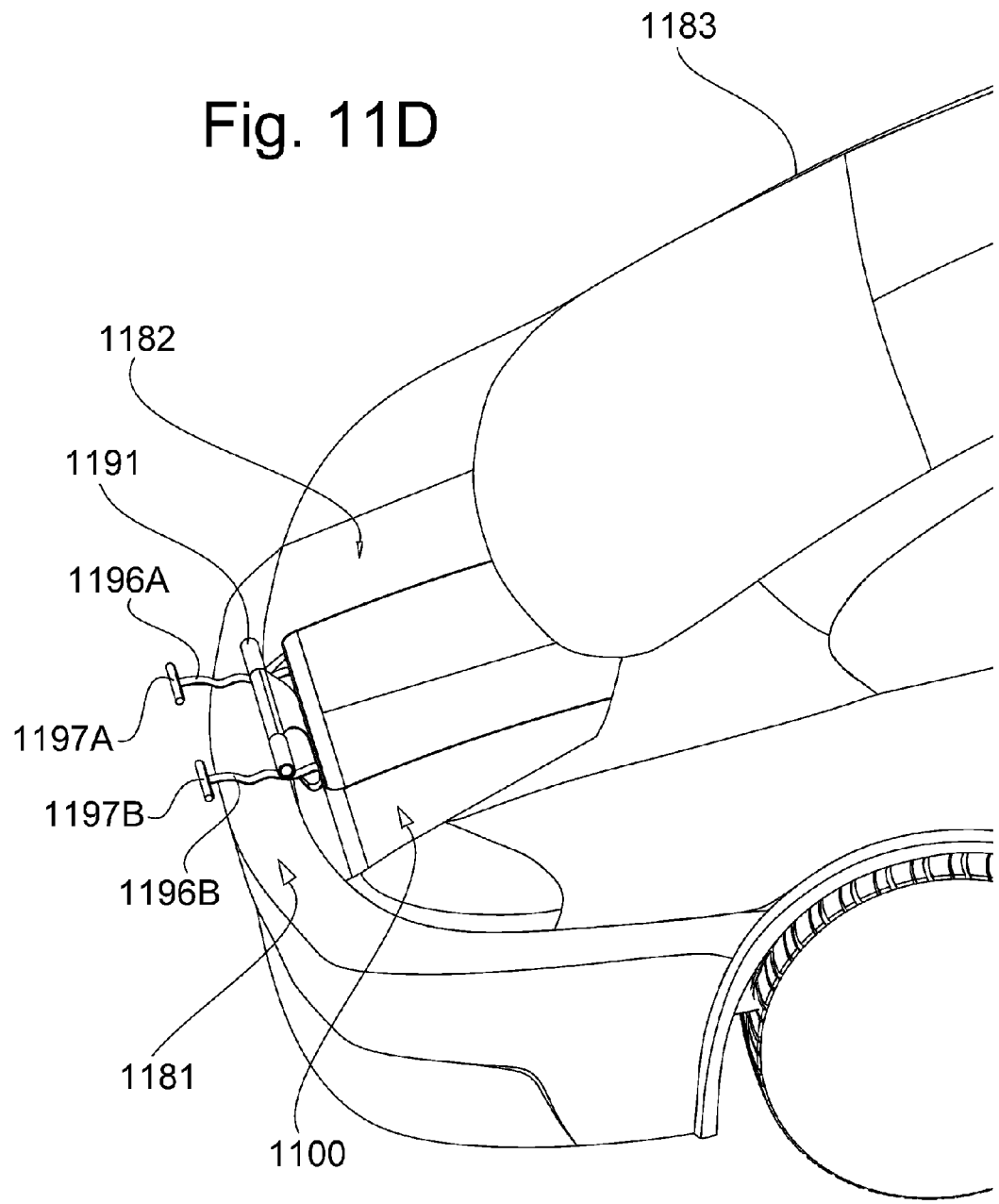
Figure 11F:
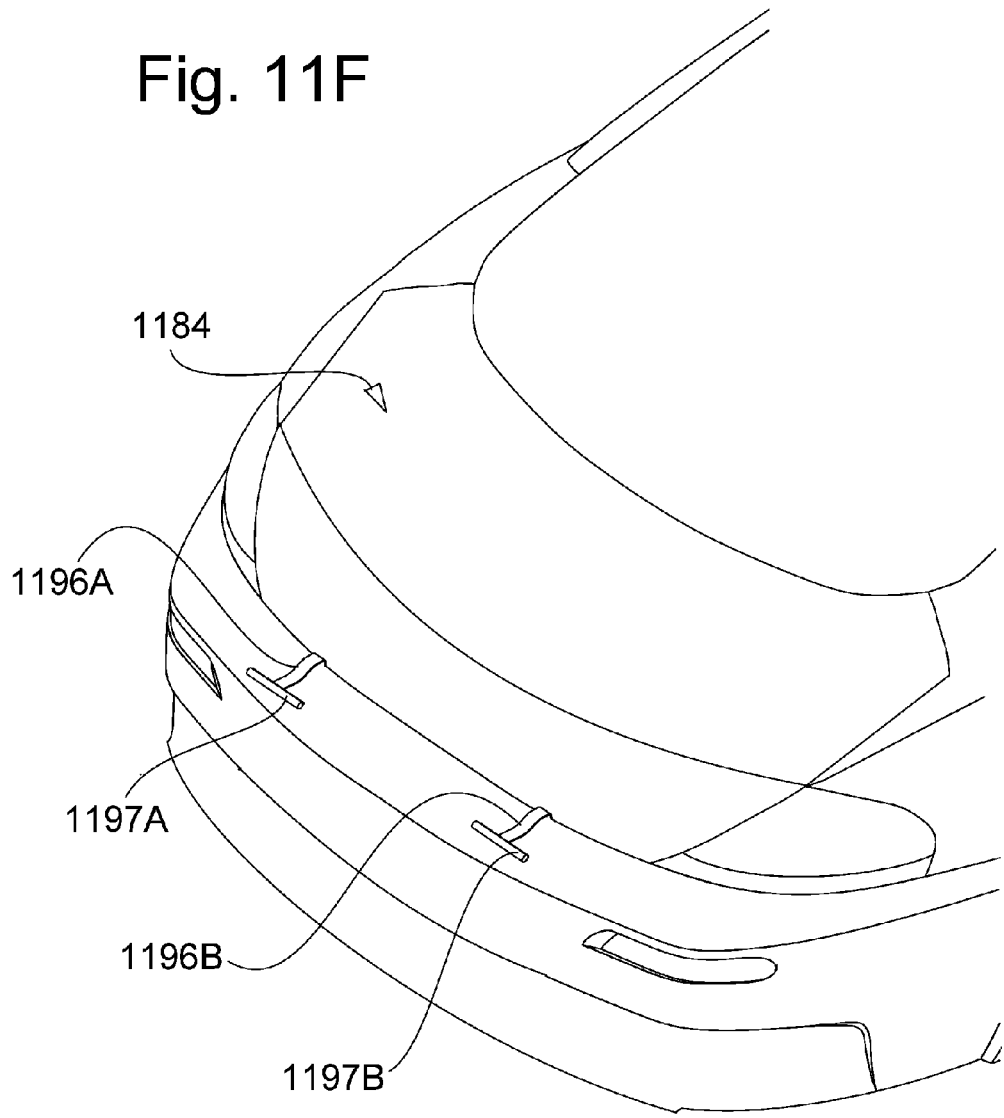
Figure 11G:
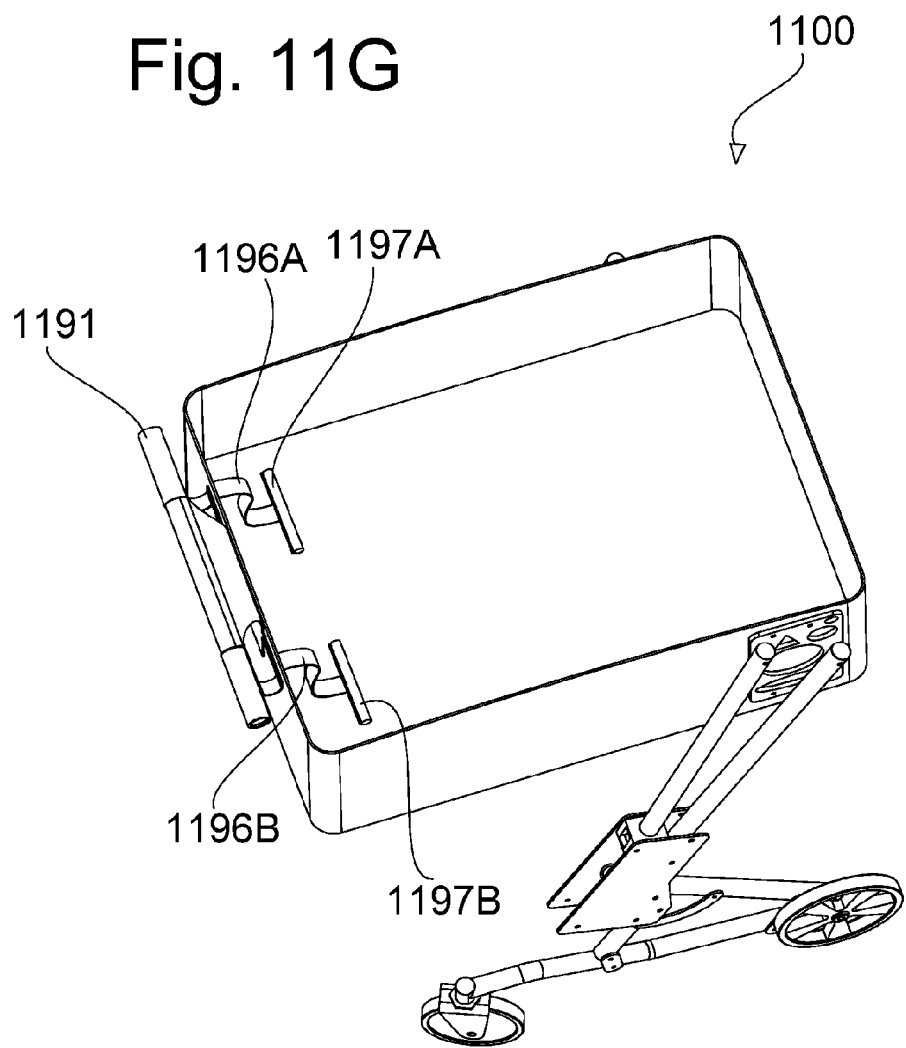

The restraining mechanism may be implemented using one or more flexible strips or straps, which may be connected (e.g., generally perpendicularly) to one or more rigid rods. For demonstrative purposes, two strips 1196A and 1196B may be connected to a single unified rod 1197, as shown in FIG. 11A and FIG. 11B; or, two strips 1196A and 1196B may be connected to two separate rods 1197A and 1197B, respectively, as shown in FIG. 11C, FIG. 11D, FIG. 11E, FIG. 11F, FIG. 11G and FIG. 11H. Optionally, a single flexible strip may be used, connected to a single rigid rod. Optionally, a "flexible" strap or strip may be a rigid-flex or rigid-flexible element, or may have some portions or regions which are flexible or rigid-flex, as well as portions or regions that are rigid or rigid-flex. Other suitable mechanisms or materials or elements may be used.

Reference is made to FIGS. 11A-11H, which are schematic illustrations demonstrating a cart 1100 having a motion preventing mechanism or a restraining mechanism, in accordance with some embodiments of the present invention. Cart 1100 may be foldable or collapsible, and may be folded or collapsed or otherwise compacted, thereby allowing placement of the entire cart 1100 within a vehicular trunk. Cart 1100 may comprise a motion preventer element 1195, which may be used in order to secure the cart 1100 to a vehicle or to the vehicular trunk, such that the cart 1100 would not shift or move or spin or budge or rotate when the vehicle moves or accelerates or decelerates.

In a demonstrative implementation, the motion preventer element 1195 may be connected or attached to the side of the cart 1100 which is closest to the user who pushes the cart 1100; or, to the side of the cart 1100 that is the closest to the opening of the vehicular trunk once the cart 1100 is inserted to the vehicular trunk. For example, the motion preventer element 1195 may comprise one flexible strap or strip, or two flexible straps or strips, or multiple flexible straps or strips; for example, denoted 1196A and 1196B; which may be attached (e.g., generally perpendicularly) to a rigid restraining rod 1197 (or to two rigid restraining rods 1197A and 1197B). It is clarified that reference herein to "restraining rod" 1197, may similarly relate to "multiple restraining rods" (such as, to restraining rods 1197A and 1197B); or vice versa. Similarly, reference herein to a single flexible strap or strip, may relate to multiple straps or strips (such as, strips 1196A and 1196B); or vice versa. The restraining rod(s) 1197 (or 1197A-1197B), for example, may be generally parallel to the short dimension or the short axis of the cart 1100 or of its basket.

As demonstrated in FIGS. 11A and 11B, the motion preventer element 1195 may be non-activated, or "loose", while the cart 1100 is in use externally to the vehicle 1183. For example, restraining rod 1197 may be loosely or freely hanging within the cart 1100, as demonstrated in FIG. 11A. Alternatively, restraining rod 1197 may be loosely or freely hanging outside of cart 1100 (or outside of its basket), as demonstrated in FIG. 11B.

As demonstrated in FIG. 11C and/or FIG. 11D and/or FIG. 11E, the restraining rod(s) 1197A and/or 1197B (or, the single restraining rod 1197 shown in FIG. 11A or FIG. 11B) may be moved backwards in a curved motion or a backward motion, manually by a user, once the cart 1100 is placed inside a vehicular trunk 1182 of a vehicle 1183, or during or prior to such placement, or after such placement; such that the strap(s) 1196A and/or 1196B (or a single strap, if only one such strap is used) would extend outwardly across the edge 1181 of the vehicular trunk 1182, and such that the restraining rod(s) 1197A and/or 1197B (or, the single restraining rod 1197 if only one such rod is used) may be located externally to the vehicular trunk 1182. Then, as demonstrated in FIG. 11F, the vehicular trunk 1182 may be closed (the closed vehicular trunk is denoted 1184 in FIG. 11F), exactly gripping or pressing forcefully on top of the one or more strap(s) 1196A and/or 1196B (or, on the single strap, if only one such strap is used) which may thus be partially-internal and partially-external relative to the closed vehicular trunk 1184.

For example, the restraining rod 1197 may be pulled backwards, such that restraining rod 1197 would be located externally to the vehicular trunk 1182 upon closure of the vehicular trunk 1182; and such that the vehicular trunk 1182 would rigidly press onto the one or more straps 1196A and/or 1196B, thereby preventing movement (or reducing movement) of cart 1100 within the vehicular trunk 1182. When the vehicular trunk 1182 is closed, each one of the straps 1196A and 1196B (or, at least one of the two straps) may be generally parallel to the long axis of the vehicle 1183, or may be generally parallel to the long dimension of the vehicle 1183; or may be generally perpendicular to the long dimension of the vehicular trunk 1182 (or to the long axis of the vehicular trunk 1182); or may be generally perpendicular to the restraining rod 1197 which is external to the vehicular trunk 1182. When the vehicular trunk 1182 is closed, approximately 33% or 50% or 60% of the length of each strap 1196A and/or 1196B may be within the closed vehicular trunk 1182; whereas, the remaining 67% or 50% or 40% of the length of each strap 1196A and/or 1196B (respectively) may be external to the closed vehicular trunk 1182.

In some embodiments, the straps 1196A and/or 1196B may be formed of an unsmooth material, or may comprise non-smooth surface(s) or uneven surfaces, in order to improve the grip and restraint that the vehicular trunk places on the strap(s) 1196A and/or 1196B, thereby improving the restraining of cart 1100 which may be achieved. The straps 1196A and/or 1196B may be formed of fabric, cloth, polymer, plastic, metal, metal chain(s), elastic, flexible material, rigid or non-flexible material, semi-flexible material, chain, material other than chain, rigid-flex material, or other suitable materials.

Figure 12A:
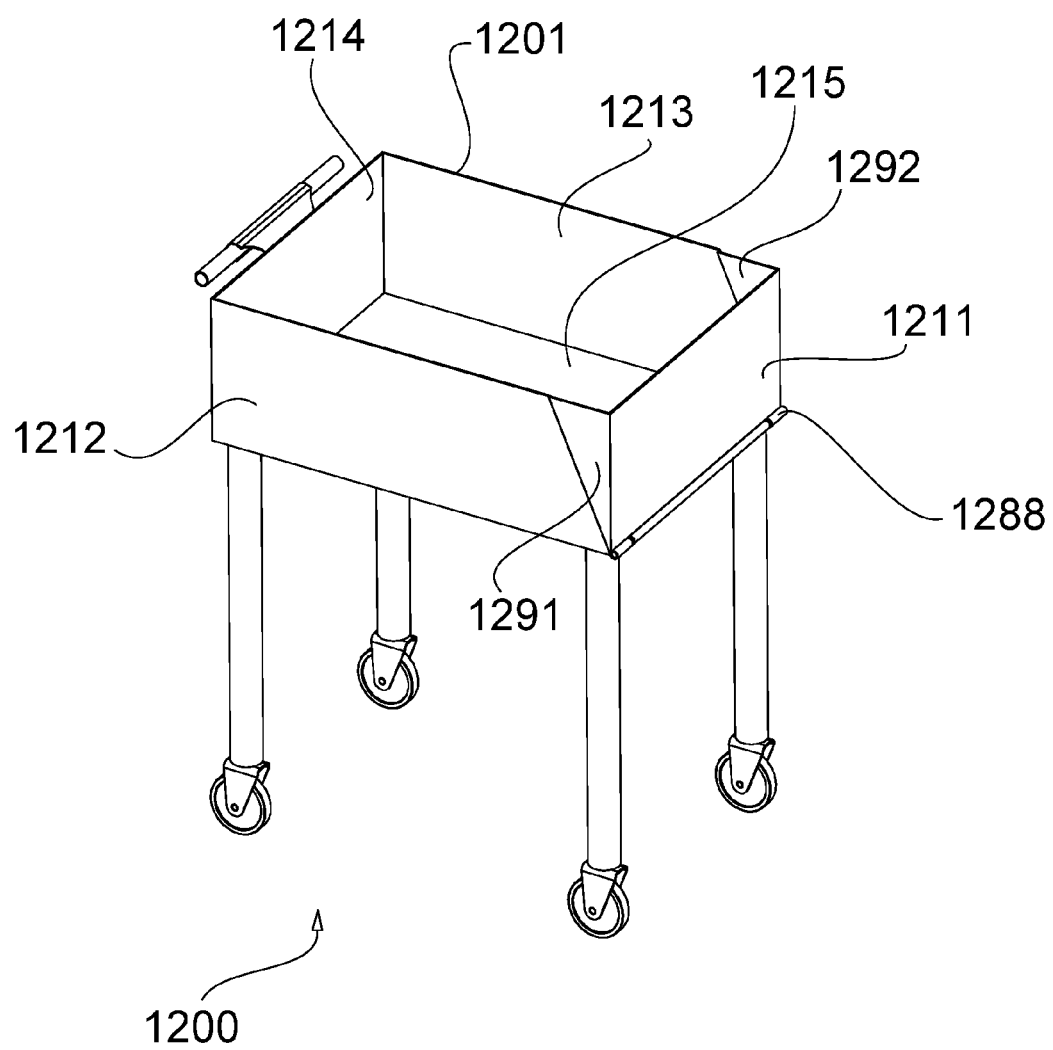
FIGS. 12A-12C are schematic illustrations of a partially-folding basket of a cart, in accordance with some demonstrative embodiments of the present invention.
Figure 12B:
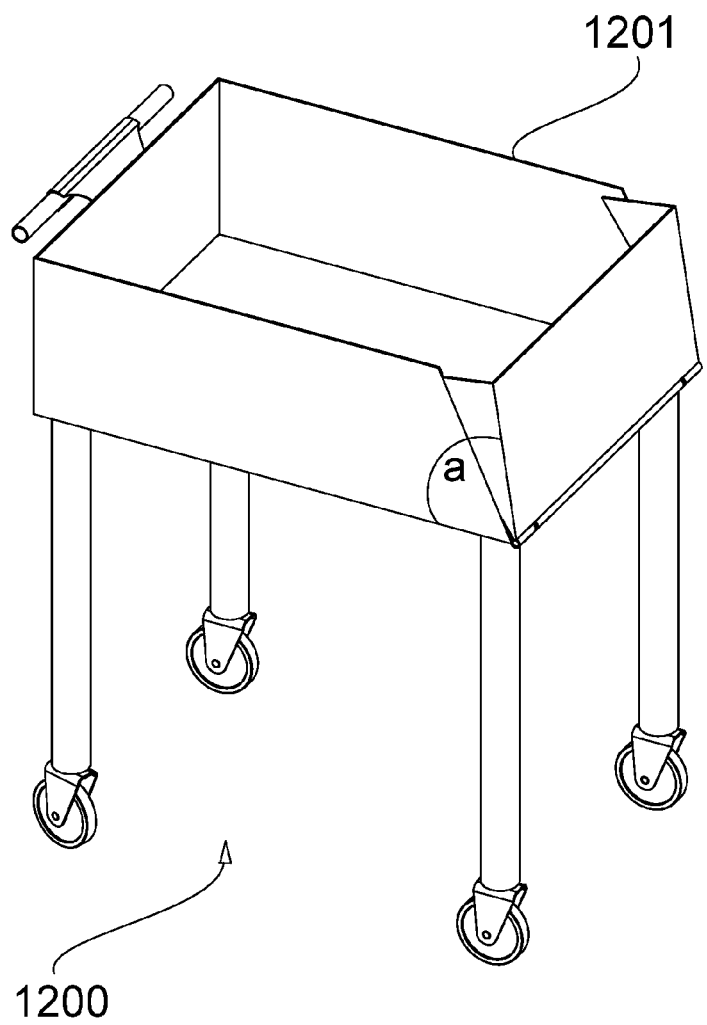
Figure 12C:
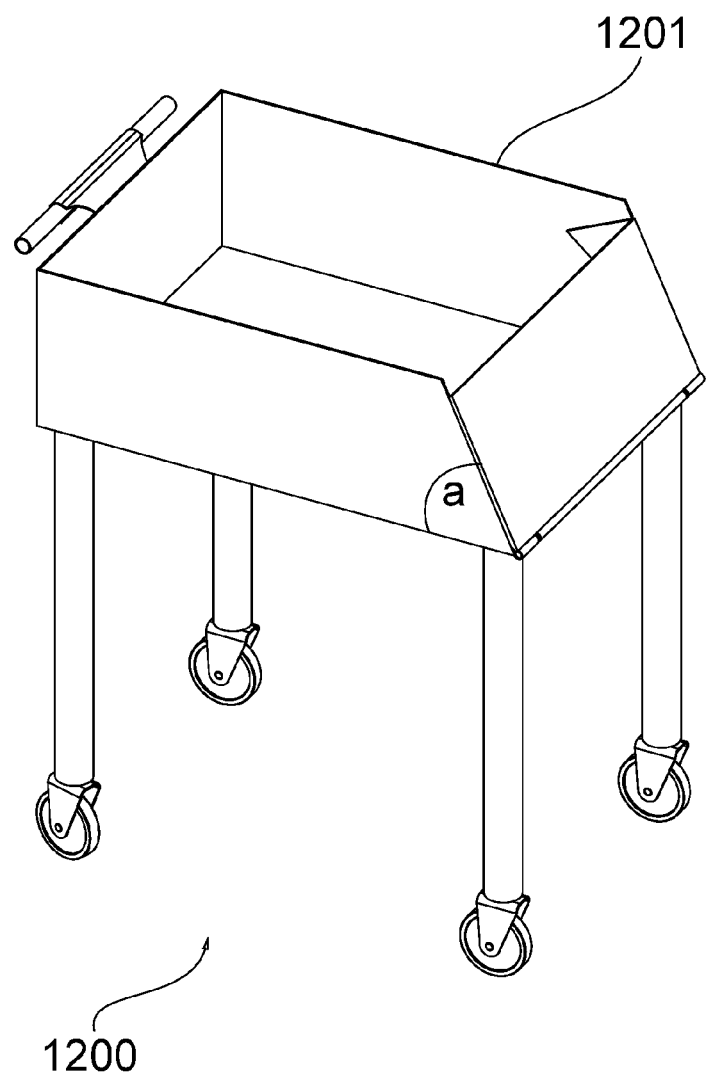
Figure 12D:
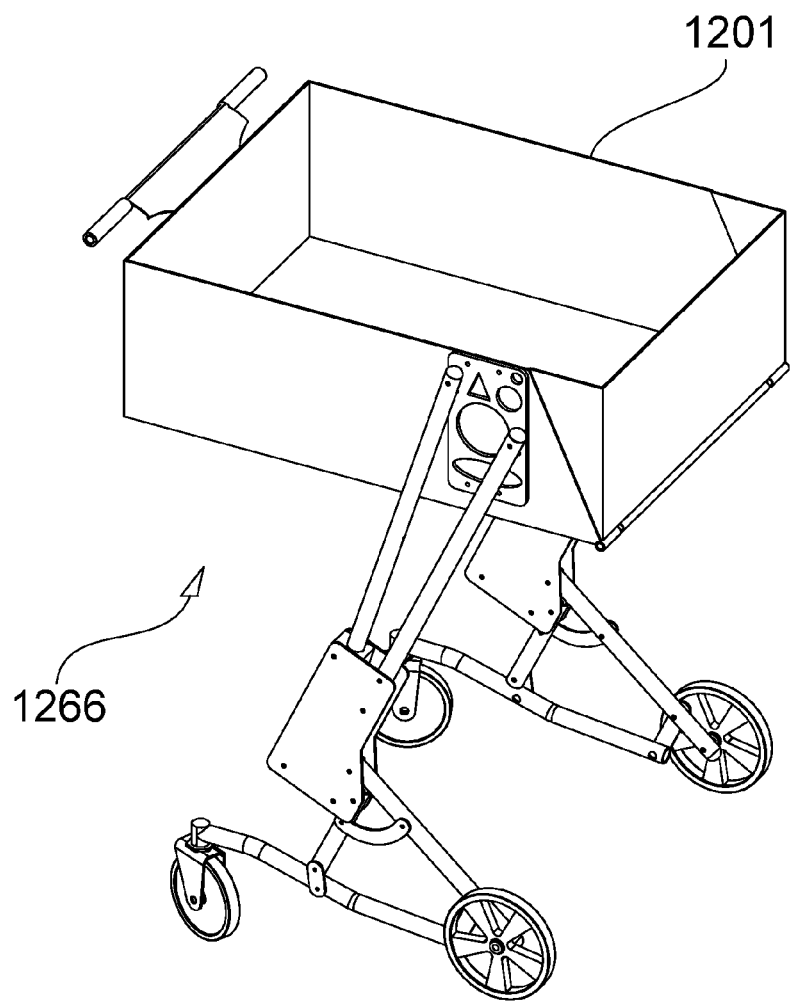
FIG. 12D is a schematic illustration of a cart comprising a partially-folding basket, in accordance with some demonstrative embodiments of the present invention.

Reference is made to FIGS. 12A-12C, which are schematic illustrations of a partially-folding basket 1201 of a cart 1200, in accordance with some demonstrative embodiments of the present invention. Reference is also made to FIG. 12D, which is a schematic illustration of a foldable or collapsible cart 1266 comprising such partially-folding basket 1201. It is clarified that the partially-folding basket 1201 may be utilized in conjunction with various types of carts or shopping carts, which may be folding or non-folding, collapsible or non-collapsible, configured for disassembly or not configured for disassembly, or the like.

As demonstrated in FIGS. 12A-12C, the partially-folding basket 1201 may have multiple states or positions, which may be selectively modified by the user in a discrete manner or in a gradual (e.g., smooth) manner For example, FIG. 12A demonstrates the partially-folding basket 1201 in a fully-extended position or state, such that the basket 1201 is generally box-shaped or cuboid shape; and such that a front-side panel 1211 of basket 1201 is generally perpendicular relative to the right-side vertical panel 1212 of basket 1201, and such that the front panel 1211 of basket 1201 is generally perpendicular relative to the left-side vertical panel 1213 of basket 1201, and such that the front panel 1211 of basket 1201 is generally perpendicular relative to the bottom-side panel 1215 of basket 1201, and such that the front panel 1211 of basket 1201 is generally parallel to the rear-side vertical panel 1214 of basket 1201. This fully-extended position of basket 1201 may allow the user to utilize the maximum capacity or storage volume of basket 1201.

As demonstrated in FIGS. 12B and 12C, the front-side panel 1211 may be gradually folded down to become slanted or angular, or to become non-perpendicular relative to the bottom-side panel 1215, or to become non-perpendicular relative to the right-side vertical panel 1212 and/or the left-side vertical panel 1213, or to become non-parallel (or slanted) relative to the rear-side vertical panel 1214. In some embodiments, the angle denoted "a" may be, for example, user-modified in the range of 90 degrees to 45 degrees; or may be set to, for example, 90 degrees, or 80 degrees, or 75 degrees, or 70 degrees, or 66 degrees, or 60 degrees, or 50 degrees, or 45 degrees, or other suitable ranges of degrees between or among said degree values.

In some embodiments, the partial folding of the front-side panel 1211 may be achieved by using a suitable mechanical folding mechanism, for example, one or more hinges 1288 or axis elements which may be located at the bottom front side of basket 1201. Optionally, one or more "flaps" 1291-1292 or similar flap elements or protrusions, may always remain attached to the front-side panel 1211, and may be slightly internal to the right-side vertical panel 1212 and to the left-side vertical panel 1212 (respectively), in order to allow controlled and smooth partial-folding of the front-side panel 1211 from its original vertical position to its slanted or angular position.

In some embodiments, a right-side view (or cross-section) and/or a left-side view (or cross-section) of the basket 1201, in its fully extended position, may be generally box-shaped; whereas, a right-side view and/or a left-side view of the basket 1201 in its partially-folded or maximally-folded position may be trapezoid or trapezium; such that, the lower-side base of the trapezoid may be the bottom-side panel of 1215 of the basket; and such that the front-side panel 1211 may be a slanted leg of the trapezoid; and such that the rear-side panel 1214 may be a non-slanted (e.g., vertical) leg of the trapezoid; and such that a surface corresponding to the top area of the basket 1201 may correspond to a generally-vertical non-slanted upper-side base of the trapezoid.

It is noted that the partially-folding basket 1201 of the present invention, may be in direct contrast (with regard to structure and/or function) relative to an "upside down trapezoid" shape which some conventional shopping carts may have. For example, some conventional shopping carts may be shaped like an upside-down trapezoid, such that the upper-side base of the trapezoid-shaped right-side cross-section (or left-side cross-section) is longer than the lower-side base of the trapezoid-shaped right-side cross-section (or left-side cross-section), in order to allow efficient nesting or stacking of shopping carts at a supermarket. In direct contrast, the basket 1201 of the present invention (and similarly, the cart 1200 of the present invention) may be structured such that, the upper-side base of the trapezoid-shaped right-side cross-section (or left-side cross-section) is shorter than the lower-side base of the trapezoid-shaped right-side cross-section (or left-side cross-section), in order to allow efficient placement of the basket 1201 in a partially-closed position within a vehicular trunk, which may have a complementing "cave" or storage shape.

Reference is made to FIG. 12D, which is a schematic illustration of another cart 1266, incorporating the partially-folding basket, in accordance with some demonstrative embodiments of the present invention. Cart 1266 may be foldable or collapsible, for example, in order to allow compact storage and/or in order to allow insertion (in its entirety) into a vehicular trunk.

Figure 13A:
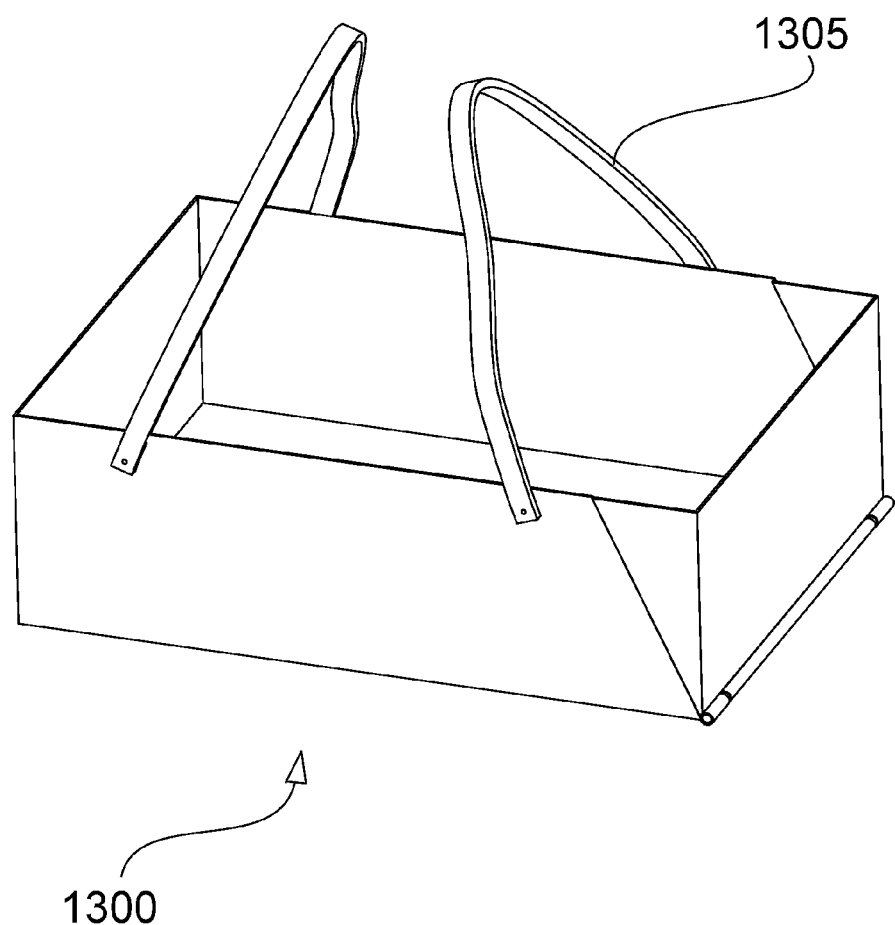
FIGS. 13A-13C are schematic illustrations of a stand-alone partially-folding basket, in accordance with some demonstrative embodiments of the present invention.
Figure 13B:
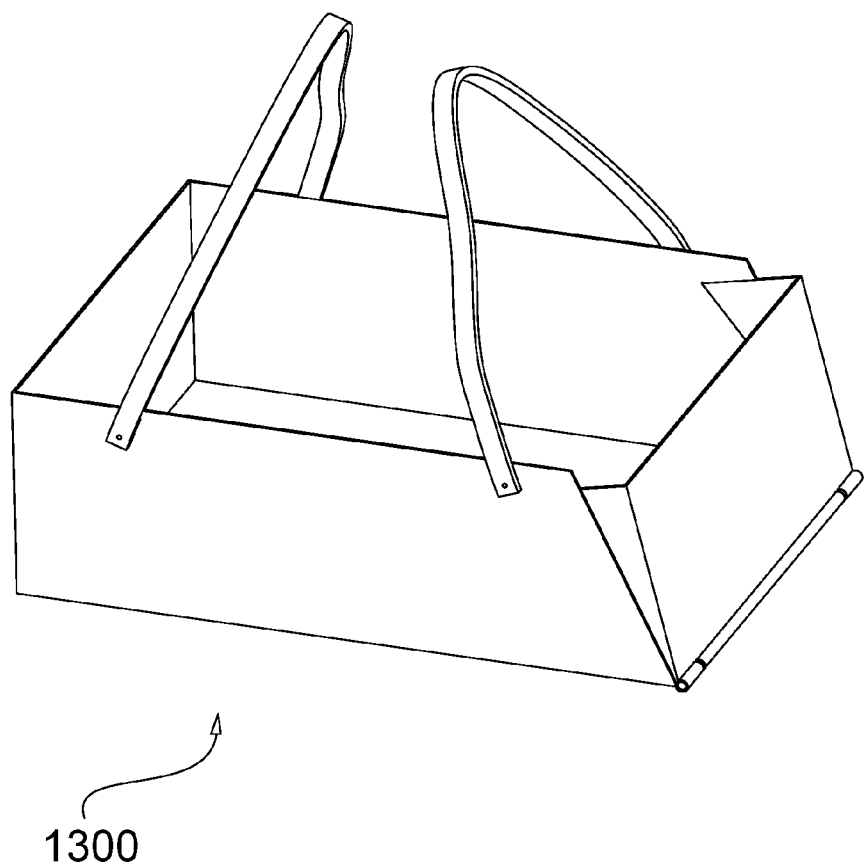
Figure 13C:
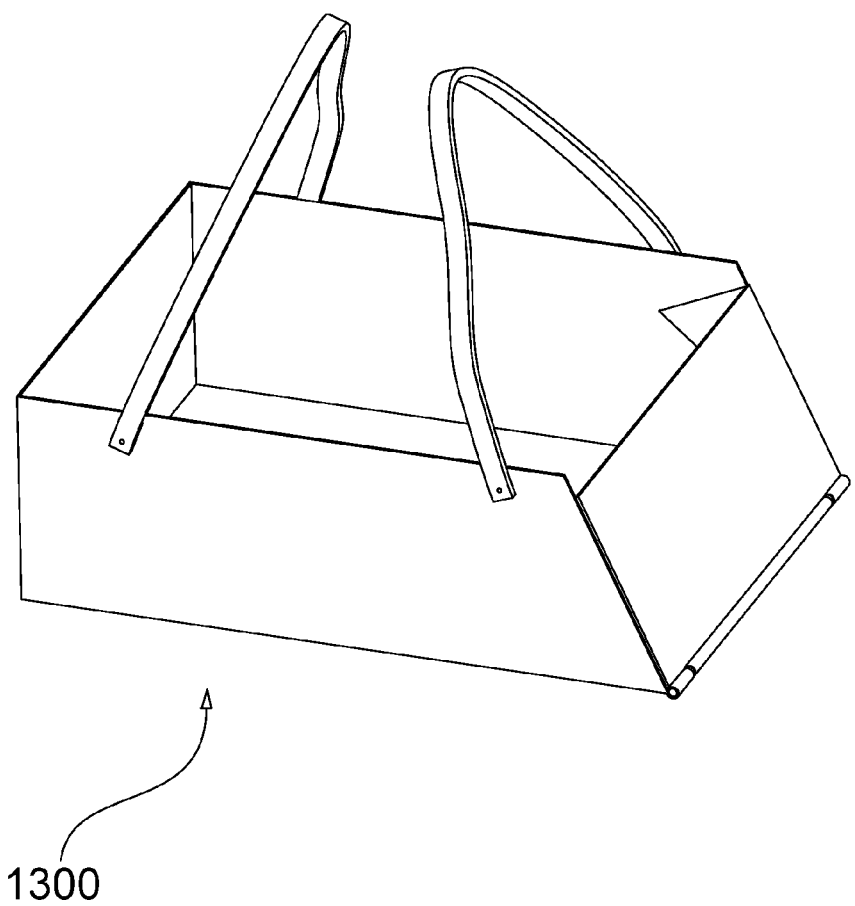

Reference is made to FIGS. 13A-13C, which are schematic illustrations of a stand-alone partially-folding basket 1300, in accordance with some demonstrative embodiments of the present invention. Basket 1300 may have its own handle or handles 1305, extending upwardly from the basket 1300; handles 1305 may be foldable, or fixed and non-foldable; may be formed of metal or wood or plastic, or may be formed of other rigid material, or may be formed of flexible material; or, the handles 1305 may be optional and need not necessarily be included, or may be detached from basket 1305. The properties and functions of partially-folding basket 1300, may be generally similar to those of partially-folding basket 1200; except that basket 1300 may not necessarily be attached to any cart or shopping cart, and may be hand-carried by a user, or may be placed onto or into a carrying device of a "frame" of a cart; such that basket 1300 may be an autonomous basket, independent of any particular shopping cart or cart, and not necessarily being connected to any wheels or cart-chassis.

The term "trapezoid" as used herein may include, a shape or structure or cross-section having a trapezoid-like shape, or a generally-trapezoid shape or structure; without necessarily being a perfect geometrical trapezoid; and including, for example, a generally-trapezoid shape having at least one rounded corner (instead of sharp corner), or having several (or all) rounded corners or smooth corners (instead of sharp corners).

Reference is made to FIG. 14A, which is a schematic illustration of or side-view of a conventional shopping cart 1401, demonstrating its upside-down trapezoid cross-section, such that the upper base 1411 of the trapezoid is longer than the lower base 1412 of the trapezoid, for nesting purposes of cart-within-cart. The front-side leg 1413 of the trapezoid is slanted from bottom-left to upper-right. The rear-side leg 1414 of the trapezoid is slanted from upper-left to bottom-right.

Reference is made to FIG. 14B, which is a schematic illustration of a side-view of a shopping cart 1402 in accordance with the present invention, demonstrating its trapezoid cross-section, such that the upper base 1421 of the trapezoid is shorter than the lower base 1422 of the trapezoid, for efficient storage within a vehicular trunk. The front-side leg 1423 of the trapezoid is slanted from upper-left to bottom-right. The rear-side leg 1424 of the trapezoid may be generally vertical (as shown), or may optionally be slanted.

Figure 15A:
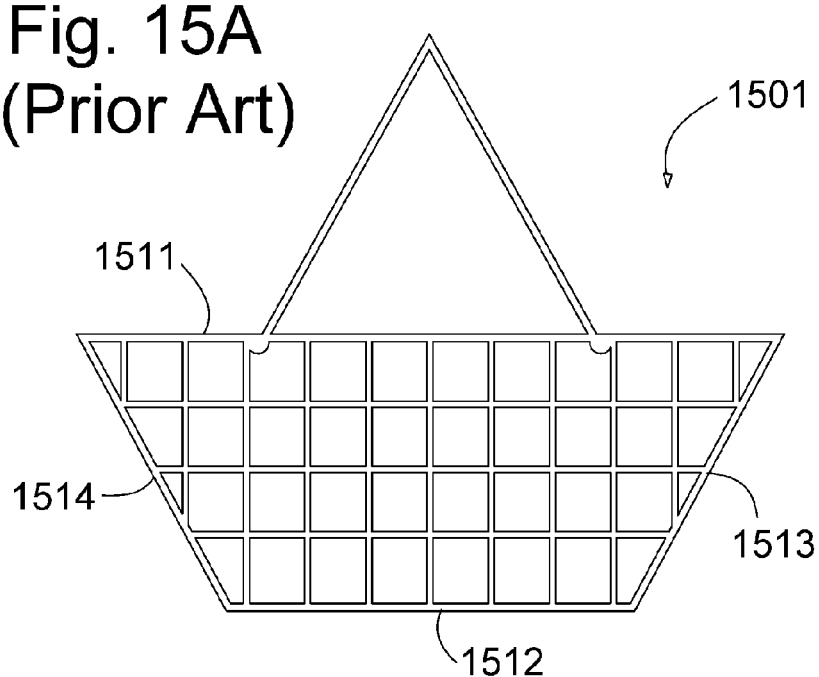
FIG. 15A is a schematic illustration of a side-view of a conventional prior-art shopping basket.

Reference is made to FIG. 15A, which is a schematic illustration of a side-view of a conventional shopping basket 1501, demonstrating its upside-down trapezoid cross-section, such that the upper base 1511 of the trapezoid is longer than the lower base 1512 of the trapezoid, for nesting purposes of basket-within-basket. The front-side leg 1513 of the trapezoid is slanted from bottom-left to upper-right. The rear-side leg 1514 of the trapezoid is slanted from upper-left to bottom-right.

Figure 15B:
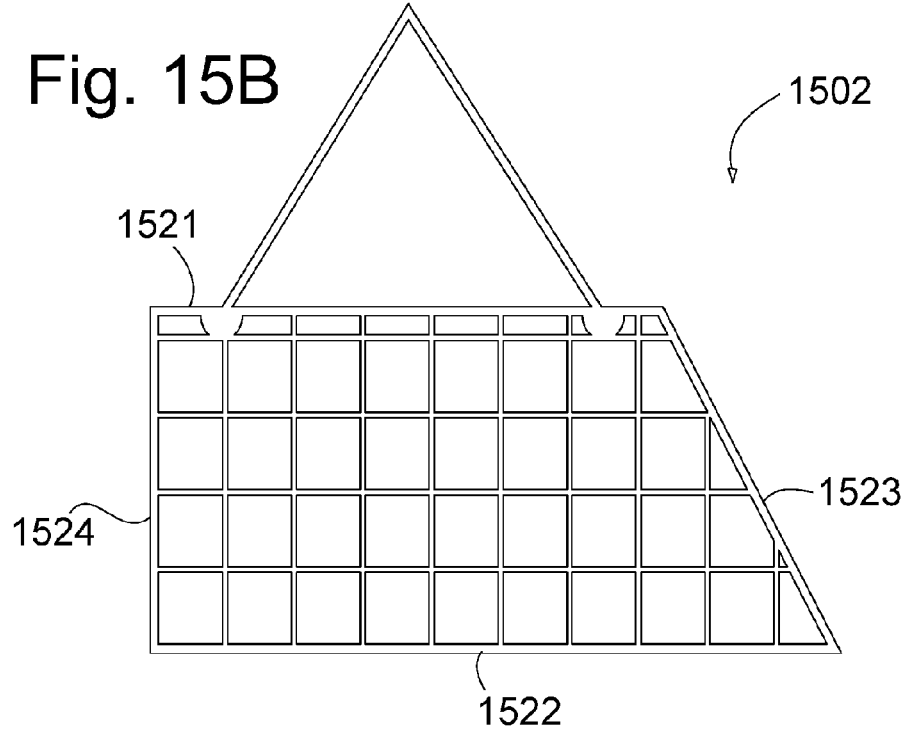
FIG. 15B is a schematic illustration of a side-view of a shopping basket, in accordance with some demonstrative embodiments of the present invention.

Reference is made to FIG. 15B, which is a schematic illustration of a side-view of a shopping basket 1502 in accordance with the present invention, demonstrating its trapezoid cross-section, such that the upper base 1521 of the trapezoid is shorter than the lower base 1522 of the trapezoid, for efficient storage of the basket 1502 within a vehicular trunk. The front-side leg 1523 of the trapezoid is slanted from upper-left to bottom-right. The rear-side leg 1514 of the trapezoid may be generally vertical (as shown), or may optionally be slanted.

It is noted that the "upside-down trapezoid" structure, of the basket of the present invention, and/or of the basket of the cart of the present invention, may allow increased storage capacity of the basket or cart; may allow improved storage or restrained placement of the basket and/or cart within a vehicular trunk; may allow insertion and/or placement of the basket and/or cart within a vehicular trunk by taking advantage of (or utilizing) a complementary-shaped or complementary-structured cave or cavern or hollow chamber (e.g., slanted or angular chamber) of the vehicular trunk.

In some embodiments, a cart may comprise: a basket mounted on top of a plurality of wheels; and a bridge element to engage with an edge of a vehicular trunk, wherein the bridge element is connected at a point located between said basket and said wheels, wherein the bridge element is moveable on one or more fixed rails that are connected within the cart underneath the basket substantially in parallel to an axis of the basket, wherein said rails are an integral part of said cart and are not attached to the vehicular trunk.

In some embodiments, the cart may comprise: a right-side rail located on a right side of the basket, in parallel to a long axis of the basket; a left-side rail located on a left side of the basket, in parallel to a long axis of the basket; a first set of one or more collapsible legs, connected to a first interface able to slide forward and backward on said right-side rail; a second set of one or more collapsible legs, connected to a second interface able to slide forward and backward on said left-side rail.

In some embodiments, the cart may comprise: a right-side rail located on a right side of the basket, in parallel to a short axis of the basket; a left-side rail located on a left side of the basket, in parallel to a short axis of the basket; a first set of one or more collapsible legs, connected to a first interface able to slide forward and backward on said right-side rail; a second set of one or more collapsible legs, connected to a second interface able to slide forward and backward on said left-side rail.

In some embodiments, the bridge element is movable horizontally on one or more rails along a long axis of the basket, and wherein the bridge element is further movable upwardly along a curved track extending from a front ending of said one or more rails.

In some embodiments, the bridge element is movable to reach a position extending beyond the full length of the basket, and wherein the bridge element is movable to reach a position in which the bridge element is slanted relative to a bottom panel of the basket.

In some embodiments, the cart may comprise: one or more gliding wheels connected at a bottom of a front end of the basket, to smoothly glide the basket on a bottom of the vehicular trunk; wherein the one or more gliding wheels that are connected at the front end of the basket, are located in an upper plane relative to location of the plurality of wheels on which the basket is mounted.

In some embodiments, the cart may comprise: a bridge element interface to enable a user to selectively modify a distance (e.g., vertical distance, diagonal distance, slanted distance, horizontal distance) between the bridge element and the basket.

In some embodiments, the cart may comprise: a chassis connecting the plurality of wheels; a first set of one or more collapsible beams, connecting in a slanted manner a right side of the basket with a right side of the chassis; and a second set of one or more collapsible beams, connecting in a slanted manner a left side of the basket with a left side of the chassis; wherein the basket is connected to the chassis through said first set and said second set of collapsible beams which are slanted relative to the basket and which are slanted relative to the chassis; wherein the first set of collapsible beams comprises one or more pivot brackets able to collapse said first set of collapsible beams; and wherein the second set of collapsible beams comprises one or more pivot brackets able to collapse said second set of collapsible beams.

In some embodiments, a height of the basket from the ground is user-modifiable by modifying an angle of one or more pivot brackets.

In some embodiments, the cart may comprise: a locking mechanism (for example, multi-step, or discrete, or gradual, or smooth, or ratchet-based, or other) adapted to lock the height from the ground of the basket at a particular height set by a user.

In some embodiments, the locking mechanism is lockable to disallow folding of the chassis, and is unlockable to allow folding of the chassis.

In some embodiments, the basket is detachably attached to said chassis through one or more connectors.

In some embodiments, the chassis comprises an extendable rail which is selectively extendable by a user beyond the full length of the basket; wherein the basket is adapted, upon its release from said chassis, to disconnect from the chassis and to glide along said extendable rail into said vehicular trunk.

In some embodiments, one or more rails are connected underneath the basket and are connected to said bridge element; the basket is detachable from the chassis; and the basket is forward-movable along said one or more rails and relative to said bridge element when said bridge element is positioned over the edge of said vehicular trunk.

In some embodiments, the cart may comprise: a restraining mechanism to restrain the basket to the vehicular trunk upon insertion of an entirety of said cart, in a folded state, into said vehicular trunk.

In some embodiments, the restraining mechanism may comprise: one or more restraining straps, extending backwards from said basket and adapted to be gripped by a closed lid of said vehicular trunk, to restrain said basket and to restrain said cart in the folded state, within the vehicular trunk; wherein the one or more straps restrain said basket and said cart in the folded state when the lid of the vehicular trunk is closed; wherein the one or more straps do not restrain said basket and said cart in the folded state when the lid of the vehicular trunk is open;

In some embodiments, the one or more straps are connected to a connecting rod, wherein the connecting rod is located externally to the vehicular trunk when the lid of the vehicular trunk is closed and when the lid of the vehicular trunk grips on the one or more straps; wherein, when the lid of the vehicular trunk is closed and grips on the one or more straps, each one of the one or more straps comprises: (a) a first strap-portion which is within the vehicular trunk, and (b) a second strap-portion which is trapped between the lid of the vehicular trunk and the edge of the vehicular trunk, and (c) a third strap-portion which is outside of the vehicular trunk.

In some embodiments, a front-side panel of the basket is partially foldable inwardly towards a rear-side panel of the basket; wherein the front-side panel of the basket is movable about a front-side hinge located at a front side of a bottom panel of said basket; wherein the front-side hinge enables the front-side panel to become slanted inwardly towards the rear-side panel of the basket.

In some embodiments, a right-side cross section of the basket comprises (a) the front-side panel of the basket, in a partially-folded slanted position, and (b) the rear-side panel of the basket, and (c) a bottom-side panel of the basket, and (d) a top open surface of the basket; wherein the right-side cross section of the basket is generally a trapezoid in which (i) the top open surface of the basket corresponds to an upper-side trapezoid base, (ii) the bottom-side panel of the basket corresponds to a bottom-side trapezoid base, and (iii) the lower-side trapezoid base is longer than the upper-side trapezoid base to enable said basket, in a partially-folded position, to be stored within a vehicular trunk having a complementary structure.

The terms "plurality" or "a plurality" as used herein include, for example, "multiple" or "two or more". For example, "a plurality of items" includes two or more items.

The word "comprising" as used herein includes, for example, the term "including at least but not limited to". The term "comprises" as used herein includes, for example, the term "includes at least but not limited to".

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the following claims are intended to cover all such modifications, substitutions, changes, and equivalents.

What is claimed is:

1. A cart for engaging an edge of a vehicular trunk, the cart comprising:
    a basket mounted on top of a plurality of wheels; and
    a bridge element located under a lower-front edge of the basket;
    wherein the bridge element is located between said basket and said wheels,
    wherein the bridge element is a tri-panel structure having a cross-section that is upside-down U-shaped, and comprises: (A) a front-side panel, which is generally perpendicular to (B) a top-side panel, which is generally perpendicular to (C) a rear-side panel;
    wherein the bridge element is moveable horizontally and generally-parallel to the ground, back and forth, from being under the lower-front edge of the basket to being under a lower-rear edge of the basket, on one or more fixed rails that are generally-horizontal and are generally-parallel to the ground,
    wherein said one or more fixed rails are connected within the cart underneath the basket substantially in parallel to an axis of the basket,
    wherein said one or more fixed rails are an integral part of said cart.

2. The cart of claim 1, further comprising:
    a right-side rail located on a right side of the basket, in parallel to an axis of the basket;
    a left-side rail located on a left side of the basket, in parallel to an axis of the basket;
    a first set of collapsible legs, connected to a first interface able to slide forward and backward on said right-side rail;
    a second set of collapsible legs, connected to a second interface able to slide forward and backward on said left-side rail.

3. The cart of claim 1, wherein the bridge element is movable to reach a position extending beyond the full length of the basket, and wherein the bridge element is movable to reach a position in which the bridge element is slanted relative to a bottom panel of the basket.

4. The cart of claim 1, comprising:
one or more gliding wheels connected at a bottom of a front end of the basket, to smoothly glide the basket,
wherein the one or more gliding wheels that are connected at the front end of the basket, are located in an upper plane relative to the location of the plurality of wheels on which the basket is mounted.

5. The cart of claim 1, further comprising: a bridge element interface to enable a user to selectively modify a distance between the bridge element and the basket.

6. The cart of claim 1, comprising:
a chassis connecting the plurality of wheels;
a first set of collapsible legs, connecting in a slanted manner a right side of the basket with a right side of the chassis; and
a second set of collapsible legs, connecting in a slanted manner a left side of the basket with a left side of the chassis,
wherein the basket is connected to the chassis through said first set and said second set of collapsible legs which are slanted relative to the basket and which are slanted relative to the chassis.

7. The cart of claim 6, wherein one or more rails are connected underneath the basket and are connected to said bridge element;
wherein the basket is detachable from the chassis; and
wherein the basket is forward-movable along said one or more rails and relative to said bridge element.

8. The cart of claim 1, wherein the top-side panel of the bridge element remains generally parallel to the ground when the bridge element moves horizontally on said one or more fixed rails from being under the lower-front edge of the basket to being under a lower-rear edge of the basket.

* * * * *